(12) United States Patent
Ogasawara et al.

(10) Patent No.: US 7,894,702 B2
(45) Date of Patent: Feb. 22, 2011

(54) METHOD AND APPARATUS OF OBTAINING DIRECTIVITY

(75) Inventors: Hidehiko Ogasawara, Tokyo (JP); Nozomu Ozaki, Kanagawa (JP); Seiji Wada, Kanagawa (JP); Toshiyuki Sekiya, Tokyo (JP); Ken Hayakawa, Kanagawa (JP); Kazuo Haraoka, Tokyo (JP); Shinji Sangawa, Tokyo (JP); Masaaki Hattori, Chiba (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 145 days.

(21) Appl. No.: 12/411,934

(22) Filed: Mar. 26, 2009

(65) Prior Publication Data

US 2009/0252025 A1    Oct. 8, 2009

(30) Foreign Application Priority Data

Mar. 27, 2008 (JP) ............................. 2008-084764
Sep. 11, 2008 (JP) ............................. 2008-234012

(51) Int. Cl.
    *G02B 6/00* (2006.01)
(52) U.S. Cl. ..................................... 385/147; 356/73.1
(58) Field of Classification Search ........................ None
    See application file for complete search history.

(56) References Cited

U.S. PATENT DOCUMENTS

| 5,822,475 A | 10/1998 | Hirota et al. | |
| 2005/0259935 A1* | 11/2005 | Hamada | ..................... 385/129 |

FOREIGN PATENT DOCUMENTS

| JP | 9-270753 | 10/1997 |
| JP | 10-123350 | 5/1998 |
| JP | 2005-195873 | 7/2005 |
| JP | 2005-215168 | 8/2005 |
| JP | 2005-215172 | 8/2005 |

OTHER PUBLICATIONS

Hiroki Ishida, et al., Performance Evaluation of Transmission System Using Optical Sheet Bus Technology, Transmission characteristic evaluation of the sheet shape optical data bus, Institute of Electronics, Information and Communication Engineers technology memoir, Institute of Electronics, Information and Communication Engineers, Sep. 17, 1999, OCS 99 (309), pp. 23-28.

* cited by examiner

*Primary Examiner*—Sung H Pak
(74) *Attorney, Agent, or Firm*—Oblon, Spivak, McClelland, Maier & Neustadt, L.L.P.

(57) ABSTRACT

A method of obtaining directivity in an optical waveguide includes the steps of falling incident light on surface of diffuse reflection members arranged at a center portion of the optical waveguide, generating a first table relative to an amount of emitted light that is acquired at a circumference of the optical waveguide by controlling at least one of an image control factor for changing an image of the incident light and a coordinate control factor for changing coordinates of the incident light with them being changed, and generating a second table relative to a pattern of the light which is incident to the diffuse reflection member by seeking for a combination of the image and the coordinates of the light based on the generated first table.

25 Claims, 46 Drawing Sheets

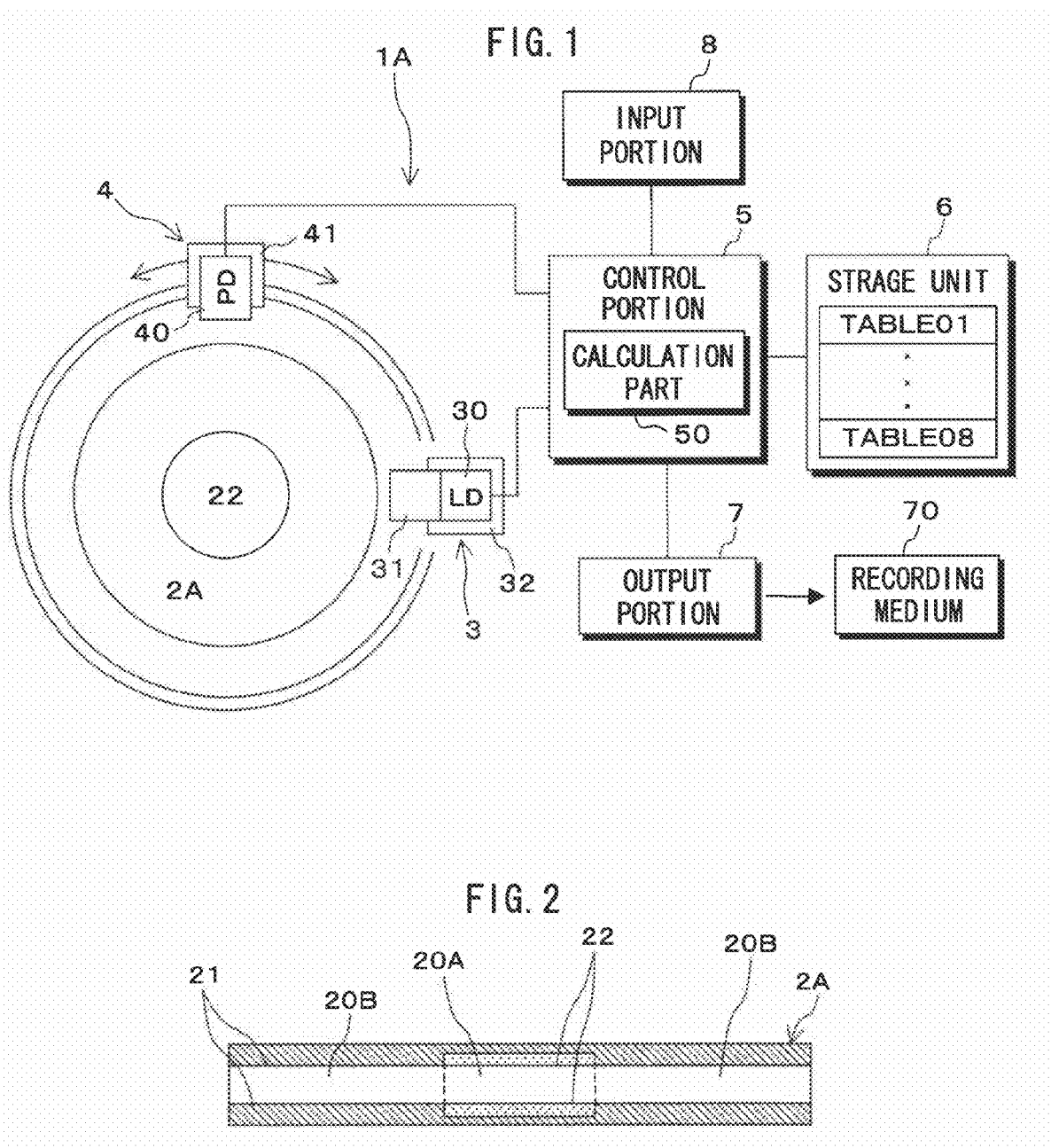

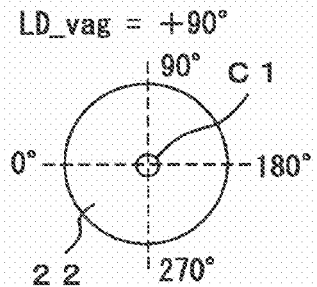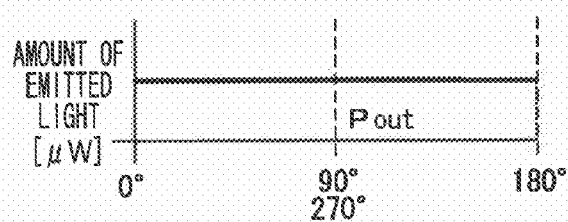
FIG. 10A    FIG. 10B
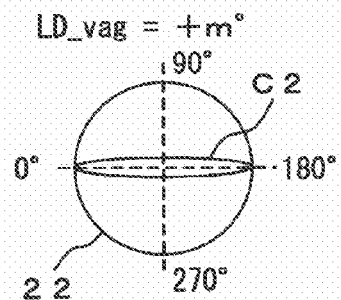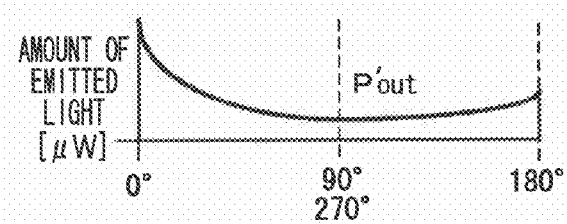
FIG. 11A    FIG. 11B
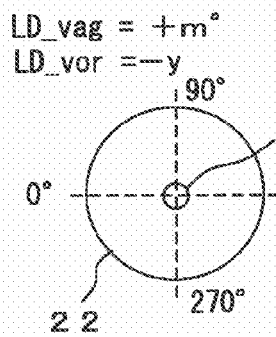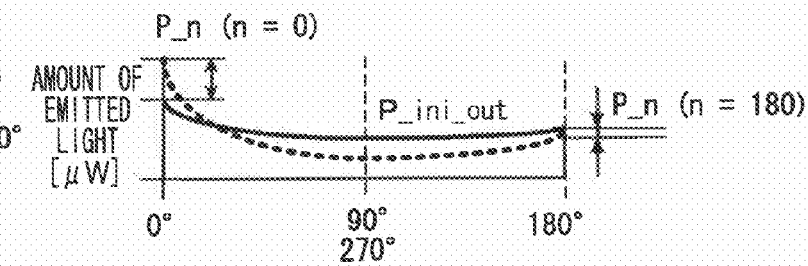
FIG. 12A    FIG. 12B

FIG. 15A

| Cycle | (0,+n) | | Cycle | (+n,0) |
|---|---|---|---|---|
| Cycle | ... | | Cycle | ... |
| Cycle | (0,2) | | Cycle | (2,0) |
| Cycle | (0,1) | | Cycle | (1,0) |
| Cycle | (0,0) | X | Cycle | (0,0) |
| Cycle | (0,-1) | | Cycle | (-1,0) |
| Cycle | (0,-2) | | Cycle | (-2,0) |
| Cycle | ... | | Cycle | ... |
| Cycle | (0,-n) | | Cycle | (-n,0) |

FIG. 15B

| | LD[3:0] | 0 | 1 | 2 | ... | F |
|---|---|---|---|---|---|---|
| Cycle | (0,0) | 0 | 1 | 0 | | 1 |
| Cycle | (0,1) | 0 | 0 | 1 | | 1 |
| Cycle | (1,1) | 0 | 0 | 0 | | 1 |
| Cycle | (1,0) | 0 | 0 | 0 | | 1 |

FIG. 17

|  | ST1 | ST2 | ST3 | |
|---|---|---|---|---|
| <TABLE02> | square | repeat | total | CALCULATION METHOD BY SQUARED ARRAY AND SUPERPOSITION |
| <TABLE03> | square | repeat | cal | CALCULATION METHOD BY SQUARED ARRAY AND SUPERPOSITION (SOLUTION OBTAINED BY SUBTRACTION OF OVERLAPPED PORTIONS) |
| <TABLE04> | square | sepalate | total | CALCULATION METHOD BY SQUARED ARRAY AND APPROXIMATION |
| <TABLE05> | hexagon | repeat | total | CALCULATION METHOD BY HONEYCOMB ARRAY AND SUPERPOSITION |
| <TABLE06> | hexagon | repeat | cal | CALCULATION METHOD BY HONEYCOMB ARRAY AND SUPERPOSITION (SOLUTION OBTAINED BY SUBTRACTION OF OVERLAPPED PORTIONS) |
| <TABLE07> | hexagon | sepalate | total | CALCULATION METHOD BY HONEYCOMB ARRAY AND APPROXIMATION |
| <TABLE02'> | square | repeat | total | LEVEL CORRECTION/CALCULATION METHOD BY SQUARED ARRAY AND SUPERPOSITION |
| <TABLE03'> | square | repeat | cal | LEVEL CORRECTION/CALCULATION METHOD BY SQUARED ARRAY AND SUPERPOSITION (SOLUTION OBTAINED BY SUBTRACTION OF OVERLAPPED PORTIONS) |
| <TABLE04'> | square | sepalate | total | LEVEL CORRECTION/CALCULATION METHOD BY SQUARED ARRAY AND APPROXIMATION |
| <TABLE05'> | hexagon | repeat | total | LEVEL CORRECTION/CALCULATION METHOD BY HONEYCOMB ARRAY AND SUPERPOSITION |
| <TABLE06'> | hexagon | repeat | cal | LEVEL CORRECTION/CALCULATION METHOD BY HONEYCOMB ARRAY AND SUPERPOSITION (SOLUTION OBTAINED BY SUBTRACTION OF OVERLAPPED PORTIONS) |
| <TABLE07'> | hexagon | sepalate | total | LEVEL CORRECTION/CALCULATION METHOD BY HONEYCOMB ARRAY AND APPROXIMATION |
| <TABLE08> | cycle | sepalate | total | |

FIG. 18

| Cycle | (0,0) | (1,0) | ... | (+n,0) | (0,0) | (-1,0) | ... | (-n,0) |
|---|---|---|---|---|---|---|---|---|
| (0,-n) | | | | | | | | |
| ... | | | | | | | | |
| (0,-1) | | | | | | | | |
| (0,0) | | | | | | | | |
| (0,1) | | | | | | | | |
| ... | | | | | | | | |
| (0,+n) | | | | | | | | |

FIG. 19

| n Angle | P_n | n Angle | P_n |
|---|---|---|---|
| 0 | | 0 | |
| 1 | | -1 | |
| 2 | | -2 | |
| ... | | ... | |
| 180 | | -180 | |

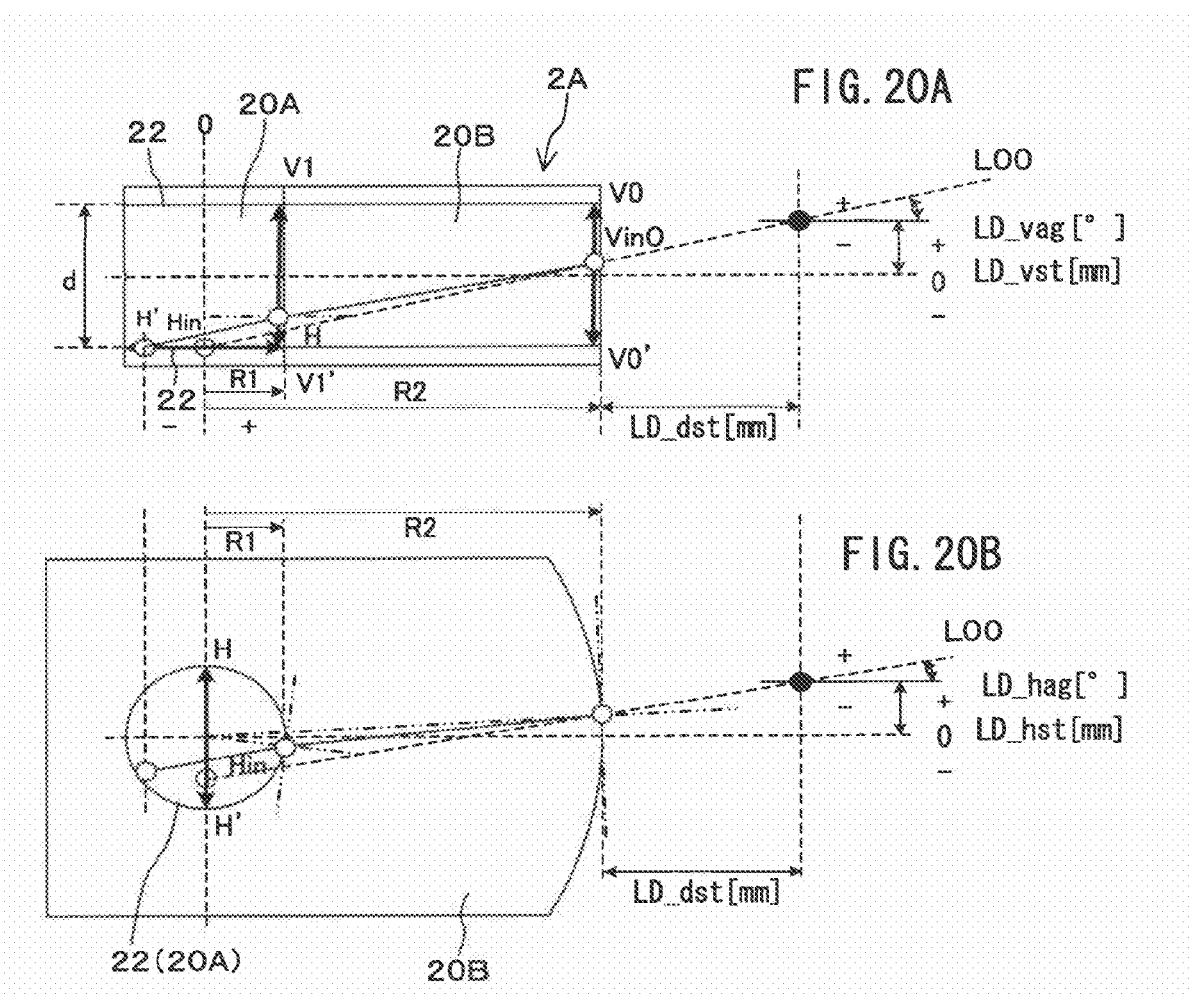

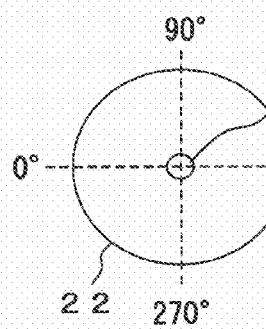 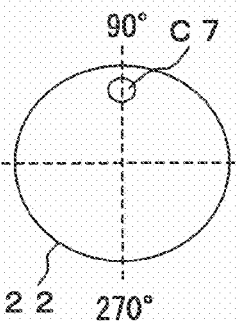 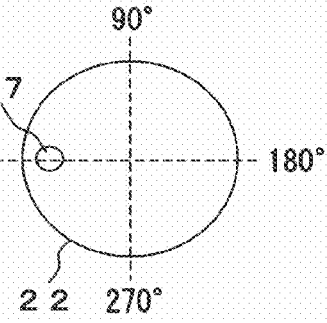
FIG. 22A　　　　　　　FIG. 22B　　　　　　　FIG. 22C
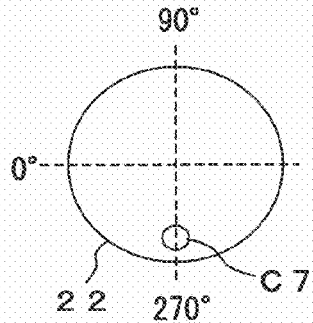 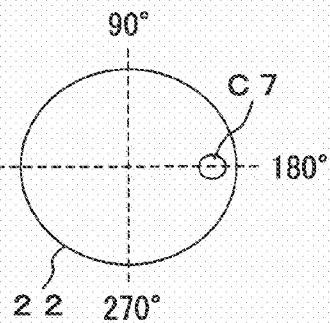
FIG. 22D　　　　　　　FIG. 22E
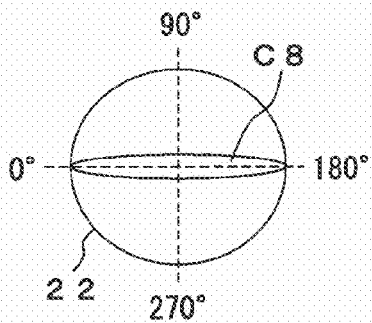 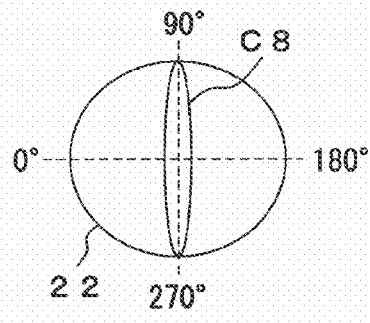
FIG. 23A　　　　　　　FIG. 23B

|  | NUMBERS | DESCRIPTIONS |
|---|---|---|
| ld_no | 100 | NUMBERS OF DIVIDED INPUT LIGHT SOURCE |
| ld_power | 720 | LASER POWER [mA] |
| sp_type | ns | SPECTRUM [Cs] |
| sp_no | LUT | WAVELENGTH OF LIGHT SOURCE SET BASED ON sp_type VALUE WITH REFERRING TO TABLE 01 : ld_wave |

FIG. 34

Table01:ld_wave

| WAVELENGTHS | SYMBOLS | SPECTRAL LINES | LIGHT SOURCES |
|---|---|---|---|
| 1013.98 | n t | INFRARED;MERCURY | H g |
| 852.11 | n s | INFRARED;CESIUM | C s |
| 768.19 | n A' | RED;POTASSIUM | K |
| 706.52 | n r | RED;HELIUM | H e |
| 656.27 | n C | RED;HYDROGEN | H |
| 643.85 | n C' | RED;CADMIUM | C d |
| 632.8 | | He-Ne LASER | He-Ne |
| 589.29 | n D | YELLOW;SODIUM | N a |
| 587.56 | n d | YELLOW;HELIUM | H e |
| 546.07 | n e | GREEN;MERCURY | H g |
| 486.13 | n F | BLUE;HYDROGEN | H |
| 479.99 | n F' | BLUE;CADMIUM | C d |
| 435.83 | n g | BLUE;MERCURY | H g |
| 404.66 | n h | VIOLET;MERCURY | H g |
| 365.01 | n i | ULTRAVIOLET;MERCURY | H g |

FIG. 35

| | NUMBERS | DESCRIPTIONS |
|---|---|---|
| mt_a_r | 10 | DIAMETER [mm] OF FIRST OPTICAL WAVEGUID PORTION |
| mt_a_t | 1 | THICKNESS [mm] OF FIRST OPTICAL WAVEGUID PORTION |
| mt_a_p | c(0,0) | COORDINATE [mm] OF CENTER OF FIRST OPTICAL WAVEGUID PORTION |
| mt_a | air | NAME OF MATERIAL |
| mt_a_refraction | LUT | REFRACTIVE INDEX SET BASED ON mt_a VALUE WITH REFERRING TO TABLE : air |
| Random_cul_st | 0 | 0:REFERENCE TO TABLE 1:RAY TRACE |

FIG. 36

Table002:Air

| air |
|---|
| vd: |
| 0 |
| nt: |
| 1 |
| ns: |
| 1 |
| nr: |
| 1 |
| nC: |
| 1 |
| nd: |
| 1 |
| ne: |
| 1 |
| nF: |
| 1 |
| ng: |
| 1 |
| nh: |
| 1 |
| ni: |
| 1 |

| | NUMBERS | DESCRIPTIONS |
|---|---|---|
| ray_cnt_end | 100 | UPPER LIMIT SET VALUE OF NUMBER OF DIVIDED INPUT LIGHT SOURCE |
| cross_cnt_end | 100 | MAXIMUM NUMBER OF REFLECTION / REFRACTION |
| circle_cnt_end | 360 | RESOLUTION AT LIGHT-ARRIVAL POINT ON OUTERMOST CIRCUMFERENCE |
| Fresnel_on | 1 | 1:FRESNEL CALCULATIONS FOR S-AND P-WAVES ARE CARRIED OUT<br>0:SCHLICK'S APPROXIMATION IS USED |

FIG. 39

| Initial_ray | x1 | y1 | z1 | i | j | k | Level |
|---|---|---|---|---|---|---|---|
| 50 | 5 | 5 | 0 | -1 | 0 | 0 | 7.128713 |
| 49 | 5 | 4.9 | 0 | -1 | 0 | 0 | 7.128713 |
| 48 | 5 | 4.8 | 0 | -1 | 0 | 0 | 7.128713 |
| 47 | 5 | 4.7 | 0 | -1 | 0 | 0 | 7.128713 |
| 46 | 5 | 4.6 | 0 | -1 | 0 | 0 | 7.128713 |
| 45 | 5 | 4.5 | 0 | -1 | 0 | 0 | 7.128713 |
| 44 | 5 | 4.4 | 0 | -1 | 0 | 0 | 7.128713 |
| 43 | 5 | 4.3 | 0 | -1 | 0 | 0 | 7.128713 |
| 42 | 5 | 4.2 | 0 | -1 | 0 | 0 | 7.128713 |
| 41 | 5 | 4.1 | 0 | -1 | 0 | 0 | 7.128713 |
| 40 | 5 | 4 | 0 | -1 | 0 | 0 | 7.128713 |

⁕
⁕
⁕

| -40 | 5 | -4 | 0 | -1 | 0 | 0 | 7.128713 |
| -41 | 5 | -4.1 | 0 | -1 | 0 | 0 | 7.128713 |
| -42 | 5 | -4.2 | 0 | -1 | 0 | 0 | 7.128713 |
| -43 | 5 | -4.3 | 0 | -1 | 0 | 0 | 7.128713 |
| -44 | 5 | -4.4 | 0 | -1 | 0 | 0 | 7.128713 |
| -45 | 5 | -4.5 | 0 | -1 | 0 | 0 | 7.128713 |
| -46 | 5 | -4.6 | 0 | -1 | 0 | 0 | 7.128713 |
| -47 | 5 | -4.7 | 0 | -1 | 0 | 0 | 7.128713 |
| -48 | 5 | -4.8 | 0 | -1 | 0 | 0 | 7.128713 |
| -49 | 5 | -4.9 | 0 | -1 | 0 | 0 | 7.128713 |
| -50 | 5 | -5 | 0 | -1 | 0 | 0 | 7.128713 |

FIG. 41

| | Address cross_cnt_ad | | | data | | | | | | | | | |
|---|---|---|---|---|---|---|---|---|---|---|---|---|---|
| | tree depth | 0-90 | max 0-359 | | | | | | | | | | |
| | [max bit:16] | [15:9] | [8:0] | x1 | y1 | z1 | i | j | k | Level | ixyz | cross type |
| 1ST LAYER | max_bit_0_0_0 | 0 | 0 | | | | | | | | | |
| | max_bit_0_0_0 | 0 | ... | | | | | | | | | |
| | max_bit_0_0_0 | 0 | 359 | | | | | | | | | |
| | max_bit_0_0_0 | 1 | 0 | | | | | | | | | |
| | max_bit_0_0_0 | 1 | ... | | | | | | | | | |
| | max_bit_0_0_0 | 1 | 359 | | | | | | | | | |
| | ... | ... | ... | | | | | | | | | |
| | max_bit_0_0_0 | 89 | 0 | | | | | | | | | |
| | max_bit_0_0_0 | 89 | ... | | | | | | | | | |
| | max_bit_0_0_0 | 89 | 359 | | | | | | | | | |
| | max_bit_0_0_0 | 90 | 0 | | | | | | | | | |
| 2ND LAYER 001 | max_bit_0_0_1 | 0 | 0 | | | | | | | | | |
| | max_bit_0_0_1 | 0 | ... | | | | | | | | | |
| | max_bit_0_0_1 | 0 | 359 | | | | | | | | | |
| | max_bit_0_0_1 | 1 | 0 | | | | | | | | | |
| | max_bit_0_0_1 | 1 | ... | | | | | | | | | |
| | max_bit_0_0_1 | 1 | 359 | | | | | | | | | |
| | ... | ... | ... | | | | | | | | | |
| | max_bit_0_0_1 | 89 | 0 | | | | | | | | | |
| | max_bit_0_0_1 | 89 | ... | | | | | | | | | |
| | max_bit_0_0_1 | 89 | 359 | | | | | | | | | |
| | max_bit_0_0_1 | 90 | 0 | | | | | | | | | |
| | ... | | | | | | | | | | | |
| 2ND LAYER 360*90 | max_bit_0_0_1 | 0 | 0 | | | | | | | | | |
| | max_bit_0_0_1 | 0 | ... | | | | | | | | | |
| | max_bit_0_0_1 | 0 | 359 | | | | | | | | | |
| | max_bit_0_0_1 | 1 | 0 | | | | | | | | | |
| | max_bit_0_0_1 | 1 | ... | | | | | | | | | |
| | max_bit_0_0_1 | 1 | 359 | | | | | | | | | |
| | ... | ... | ... | | | | | | | | | |
| | max_bit_0_0_1 | 89 | 0 | | | | | | | | | |
| | max_bit_0_0_1 | 89 | ... | | | | | | | | | |
| | max_bit_0_0_1 | 89 | 359 | | | | | | | | | |
| | max_bit_0_0_1 | 90 | 0 | | | | | | | | | |

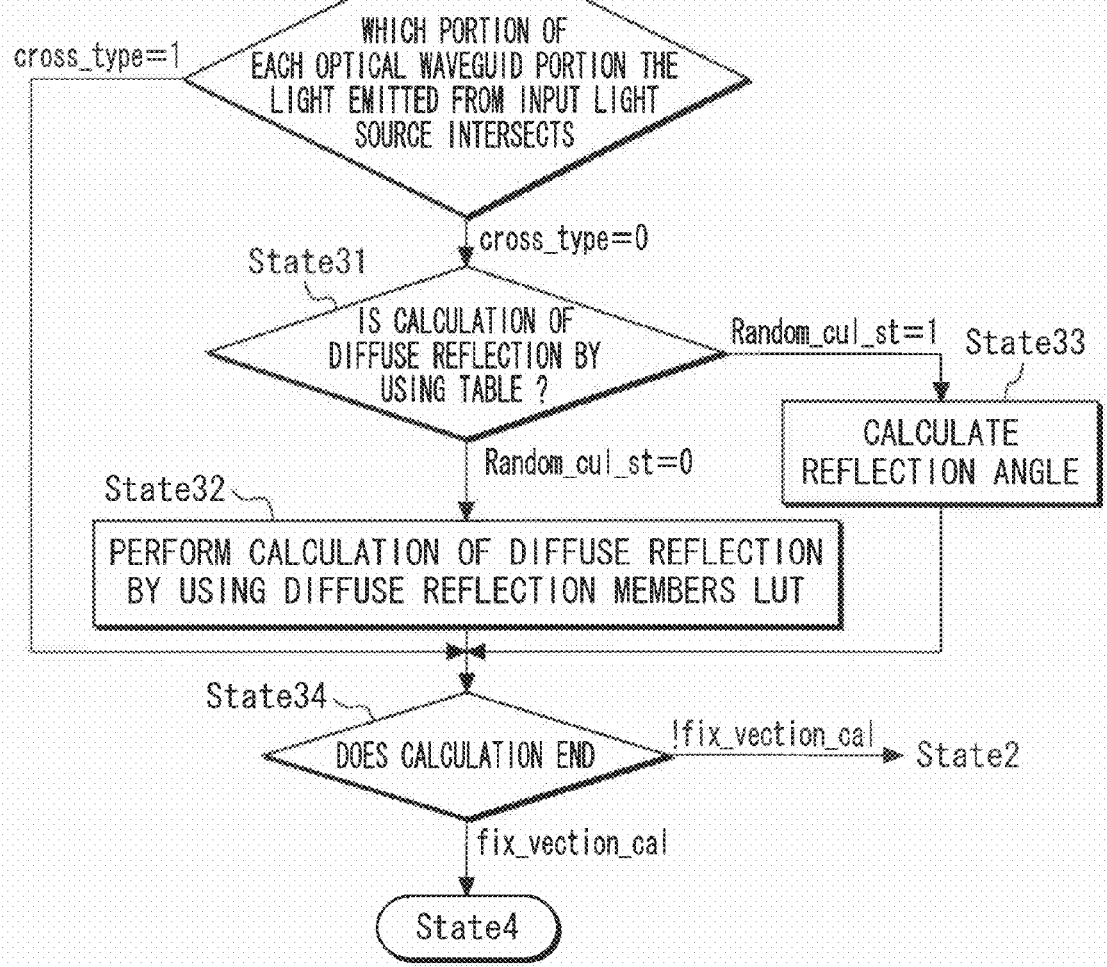

Cross_data

| | Address cross_cnt_ad | | data in | | | | | | | | | |
|---|---|---|---|---|---|---|---|---|---|---|---|---|
| | tree depth | 0-90 | max 0-359 | | | | | | | | | |
| | [max_bit:16] | [15:9] | [8:0] | x1 | y1 | z1 | i | j | k | Level | \|xyz\| | cross_type |
| 1ST LAYER | max_bit_0_0_0 | 0 | 0 | | | | | | | | | |
| | max_bit_0_0_0 | 0 | ... | | | | | | | | | |
| | max_bit_0_0_0 | 0 | 359 | | | | | | | | | |
| | max_bit_0_0_0 | 1 | 0 | | | | | | | | | |
| | max_bit_0_0_0 | 1 | ... | | | | | | | | | |
| | max_bit_0_0_0 | 1 | 359 | | | | | | | | | |
| | ... | ... | ... | | | | | | | | | |

Cross_data

| | Address cross_cnt_ad | | data out | | | | | | | | | |
|---|---|---|---|---|---|---|---|---|---|---|---|---|
| | tree depth | 0-90 | max 0-359 | | | | | | | | | |
| | [max_bit:16] | [15:9] | [8:0] | x1 | y1 | z1 | i | j | k | Level | \|xyz\| | cross_type |
| 1ST LAYER | max_bit_0_0_0 | 0 | 0 | | | | | | | | | |
| | max_bit_0_0_0 | 0 | ... | | | | | | | | | |
| | max_bit_0_0_0 | 0 | 359 | | | | | | | | | |
| | max_bit_0_0_0 | 1 | 0 | | | | | | | | | |
| | max_bit_0_0_0 | 1 | ... | | | | | | | | | |
| | max_bit_0_0_0 | 1 | 359 | | | | | | | | | |
| | ... | ... | ... | | | | | | | | | |

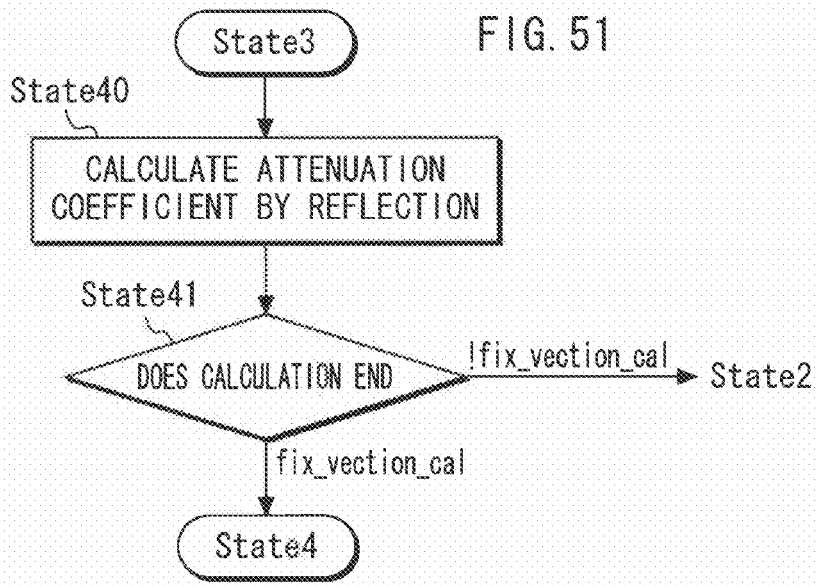

FIG. 52A

Cross_data

| | Address cross_cnt_ad | | data in | | | | | | | | | | | | |
|---|---|---|---|---|---|---|---|---|---|---|---|---|---|---|---|
| | tree depth | 0-90 | max 0-359 | | | | | | | | | | | | |
| | [max_bit:16] | [15:9] | [8:0] | x1 | y1 | z1 | i | j | k | Level | XYZ | cross_type | XY-Rp-Rs | XY-Tp-Ts | YZ-Rp-Rs | YZ-Tp-Ts |
| 1ST LAYER | max_bit_0_0_0 | 0 | 0 | | | | | | | | | | | | | |
| | max_bit_0_0_0 | 0 | ... | | | | | | | | | | | | | |
| | max_bit_0_0_0 | 0 | 359 | | | | | | | | | | | | | |
| | max_bit_0_0_0 | 1 | 0 | | | | | | | | | | | | | |
| | max_bit_0_0_0 | 1 | ... | | | | | | | | | | | | | |
| | max_bit_0_0_0 | 1 | 359 | | | | | | | | | | | | | |
| | ... | ... | ... | | | | | | | | | | | | | |

FIG. 52B

Cross_data

| | Address cross_cnt_ad | | data out | | | | | | | | | | | | |
|---|---|---|---|---|---|---|---|---|---|---|---|---|---|---|---|
| | tree depth | 0-90 | max 0-359 | | | | | | | | | | | | |
| | [max_bit:16] | [15:9] | [8:0] | x1 | y1 | z1 | i | j | k | Level | XYZ | cross_type | XY-Rp-Rs | XY-Tp-Ts | YZ-Rp-Rs | YZ-Tp-Ts |
| 1ST LAYER | max_bit_0_0_0 | 0 | 0 | | | | | | | | | | | | | |
| | max_bit_0_0_0 | 0 | ... | | | | | | | | | | | | | |
| | max_bit_0_0_0 | 0 | 359 | | | | | | | | | | | | | |
| | max_bit_0_0_0 | 1 | 0 | | | | | | | | | | | | | |
| | max_bit_0_0_0 | 1 | ... | | | | | | | | | | | | | |
| | max_bit_0_0_0 | 1 | 359 | | | | | | | | | | | | | |
| | ... | ... | ... | | | | | | | | | | | | | |

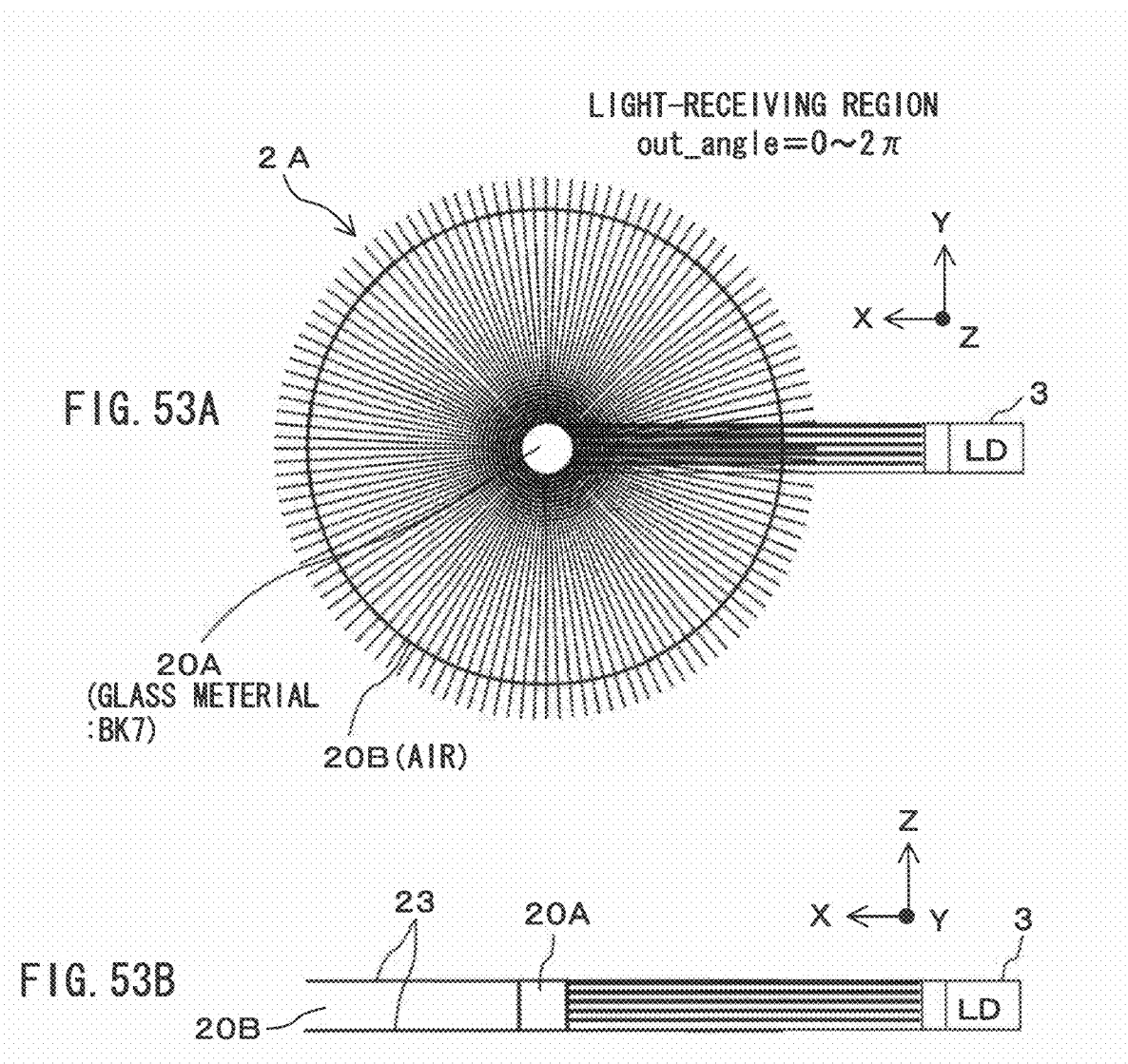

FIG. 56

|  | NUMBERS | DESCRIPTIONS |
|---|---|---|
| mt_a_r | 10 | DIAMETER [mm] OF FIRST OPTICAL WAVEGUID PORTION |
| mt_a_t | 1 | THICKNESS [mm] OF FIRST OPTICAL WAVEGUID PORTION |
| mt_a_p | c (0, 0) | COORDINATE [mm] OF CENTER OF FIRST OPTICAL WAVEGUID PORTION |
| mt_a | BK7 | NAME OF MATERIAL |
| mt_a_refraction | LUT | REFRACTIVE INDEX SET BASED ON mt_a VALUE WITH REFERRING TO TABLE : BK7 |
| mt_a_z | AL_011 | NAME OF REFLECTING MATERIAL |
| mt_a_z_LUT | LUT | REFLECTIVITY OF REFLECTING MATERIAL SET IN CONNECTION WITH WAVELENGTH AND INCIDENT ANGLE |

FIG. 57A

Table02:BK7

| BK7 | |
|---|---|
| vd: | 64.17 |
| nt: | 1.50731 |
| ns: | 1.5098 |
| nr: | 1.51289 |
| nC: | 1.51432 |
| nd: | 1.5168 |
| ne: | 1.51872 |
| nF: | 1.52238 |
| ng: | 1.52668 |
| nh: | 1.53024 |
| ni: | 1.53627 |

FIG. 57B

Table03:Air

| air | |
|---|---|
| vd: | 0 |
| nt: | 1 |
| ns: | 1 |
| nr: | 1 |
| nC: | 1 |
| nd: | 1 |
| ne: | 1 |
| nF: | 1 |
| ng: | 1 |
| nh: | 1 |
| ni: | 1 |

FIG. 59

| | NUMBERS | DESCRIPTIONS |
|---|---|---|
| mt_b_r | 100 | DIAMETER [mm] OF SECOND OPTICAL WAVEGUID PORTION |
| mt_b_t | 1 | THICKNESS [mm] OF SECOND OPTICAL WAVEGUID PORTION |
| mt_b_p | c(0, 0) | COORDINATE [mm] OF CENTER OF SECOND OPTICAL WAVEGUID PORTION |
| mt_b | Air | NAME OF MATERIAL |
| mt_b_refraction | LUT | REFRACTIVE INDEX SET BASED ON mt_b VALUE WITH REFERRING TO TABLE : Air |
| mt_b_z | AL_011 | NAME OF REFLECTING MATERIAL |
| mt_b_z_LUT | LUT | REFLECTIVITY OF REFLECTING MATERIAL SET IN CONNECTION WITH WAVELENGTH AND INCIDENT ANGLE |

FIG. 60A

| address | REFLECTION OR REFRACTION OCCURRED AT POINTS OF INTERSECTION | | | | | | | | B→Aon | ray_out_on |
|---|---|---|---|---|---|---|---|---|---|---|
| 0b000000 | initial | z | z | z | z | z | z | z | Null | Null |
| 0b000001 | refect | refect | z | z | z | z | z | z | | 1'b0 |
| 0b000010 | refect | refect | refect | refect | z | z | z | z | | 1'b1 |
| 0b000011 | refect | refect | refect | refect | refect | refect | refect | refect | | 1'b0 |

FIG. 60B

Cross_data

| address | | data | | | | | | | |
|---|---|---|---|---|---|---|---|---|---|
| cross_cnt_ad[6:1] | cross_cnt_ad[1] | B→Aon | x1 | y1 | z1 | i | j | k | level |
| 0b000000 | 1'b0 | 0 | 5 | 5 | 0 | -1 | 0 | 0 | 7.128713 |
| 0b000000 | 1'b1 | 0 | | | | | | | |
| 0b000001 | 1'b0 | 1 | | | | | | | |
| 0b000001 | 1'b1 | 1 | | | | | | | |
| 0b000010 | 1'b0 | 0 | | | | | | | |
| 0b000010 | 1'b1 | 0 | | | | | | | |
| 0b000011 | 1'b0 | 1 | | | | | | | |
| 0b000011 | 1'b1 | 1 | | | | | | | |

FIG. 61

```
        ( State2 )
            │
State020    ▼
┌─────────────────────────────────────────────────────────┐
│ CALCULATE POINTS OF INTERSECTION BETWEEN LIGHT EMITTED   │
│ FROM INPUT LIGHT SOURCE AND EACH OPTICAL WAVEGUIDE       │
│ PORTION                                                  │
│        ①' ②' +⑤'  &  ③' ④' +⑤'                          │
└─────────────────────────────────────────────────────────┘
State021    │
            ▼
┌─────────────────────────────────────────────────────────┐
│ CALCULATE ABSOLUTE VALUES OF POINTS OF INTERSECTION      │
│ BETWEEN LIGHT EMITTED FROM INPUT LIGHT SOURCE AND EACH   │
│ OPTICAL WAVEGUIDE PORTION                                │
│        ①' ②' +⑤'  &  ③' ④' +⑤'                          │
└─────────────────────────────────────────────────────────┘
State022    │
            ▼
┌─────────────────────────────────────────────────────────┐
│ SEARCH MULTIPLE SOLUTIONS FROM ABSOLUTE VALUES           │
│ OF POINTS OF INTERSECTION                                │
└─────────────────────────────────────────────────────────┘
State023    │
            ▼
┌─────────────────────────────────────────────────────────┐
│ SET VALUE, cross_type INDICATING WHICH PORTION OF EACH   │
│ OPTICAL WAVEGUID PORTION THE LIGHT EMITTED FROM INPUT    │
│ LIGHT SOURCE INTERSECTS                                  │
└─────────────────────────────────────────────────────────┘
State024    │
            ▼
     ┌──────────────────┐
     │ MAINTAIN SET VALUE │
     └──────────────────┘
            │
            ▼
        ( State3 )
```

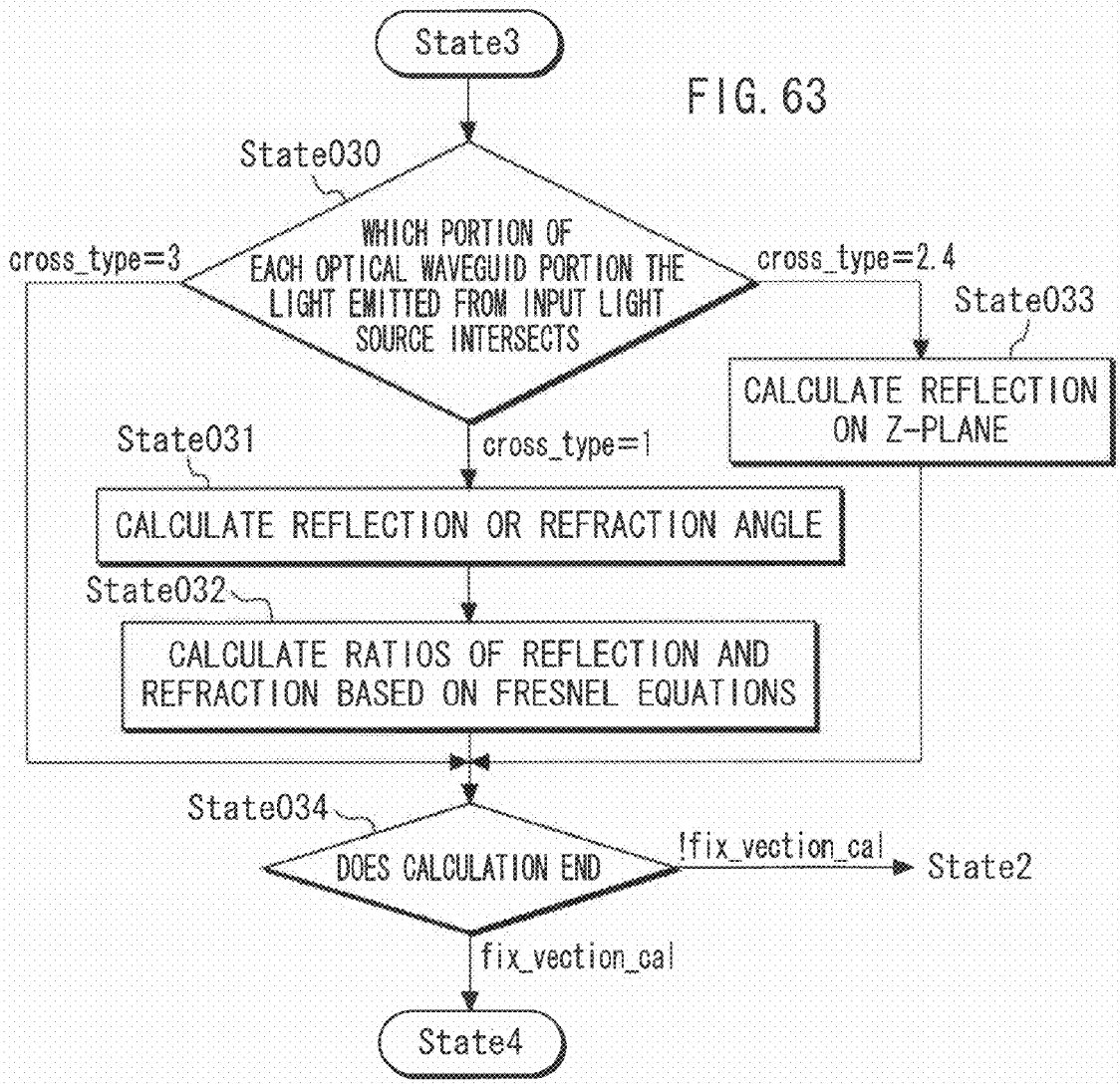

FIG. 64

Cross_data

| address | | data | | | | | | | | | | |
|---|---|---|---|---|---|---|---|---|---|---|---|---|
| cross_cnt_ad[6:1] | cross_cnt_ad[1] | B→Aon | x1 | y1 | z1 | i | j | k | level | \|xyz\| | cross_type | |
| 0b000000 | 1'b0 | 0 | 5 | 5 | 0 | -1 | 0 | 0 | 7.128713 | Null | Null | |
| 0b000000 | 1'b1 | 0 | | | | | | | | | | |
| 0b000001 | 1'b0 | 1 | | | | | | | | | | |
| 0b000001 | 1'b1 | 1 | | | | | | | | | | |
| 0b000010 | 1'b0 | 0 | | | | | | | | | | |
| 0b000010 | 1'b1 | 0 | | | | | | | | | | |
| 0b000011 | 1'b0 | 1 | | | | | | | | | | |
| 0b000011 | 1'b1 | 1 | | | | | | | | | | |

FIG. 65

Cross_data

| address | | data | | | | | | | | | | | | | |
|---|---|---|---|---|---|---|---|---|---|---|---|---|---|---|---|
| cross_cnt_ad[6:1] | cross_cnt_ad[1] | B→Aon | x1 | y1 | z1 | i | j | k | level | \|xyz\| | cross_type | XYRp-Rs | XYTp-Ts | YZRp-Rs | YZTp-Ts |
| 0b000000 | 1'b0 | 0 | 5 | 5 | 0 | -1 | 0 | 0 | 7.128713 | Null | Null | Null | Null | Null | Null |
| 0b000000 | 1'b1 | 0 | | | | | | | | | | | | | |
| 0b000001 | 1'b0 | 1 | | | | | | | | | | | | | |
| 0b000001 | 1'b1 | 1 | | | | | | | | | | | | | |
| 0b000010 | 1'b0 | 0 | | | | | | | | | | | | | |
| 0b000010 | 1'b1 | 0 | | | | | | | | | | | | | |
| 0b000011 | 1'b0 | 1 | | | | | | | | | | | | | |
| 0b000011 | 1'b1 | 1 | | | | | | | | | | | | | |

FIG. 66A

Cross_data

| address | | B→Aon | x1 | y1 | z1 | i | j | k | level | |xyz| | cross_type | XYRp-Rs | XYTp-Ts | YZRp-Rs | YZTp-Ts |
|---|---|---|---|---|---|---|---|---|---|---|---|---|---|---|---|
| cross_cnt_ad[6:1] | cross_cnt_ad[1] | | | | | | | | | | | | | | |
| 0b000000 | 1'b0 | 0 | 5 | 5 | 0 | -1 | 0 | 0 | 7.128713 | Null | Null | Null | Null | Null | Null |
| 0b000000 | 1'b1 | 0 | | | | | | | | | | | | | |
| 0b000001 | 1'b0 | 1 | | | | | | | | | | | | | |
| 0b000001 | 1'b1 | 1 | | | | | | | | | | | | | |
| 0b000010 | 1'b0 | 0 | | | | | | | | | | | | | |
| 0b000010 | 1'b1 | 0 | | | | | | | | | | | | | |
| 0b000011 | 1'b0 | 1 | | | | | | | | | | | | | |
| 0b000011 | 1'b1 | 1 | | | | | | | | | | | | | |

FIG. 66B

Z_Cross_data

| address | | B→Aon | x1 | y1 | z1 | i | j | k | level | |xyz| | cross_type | XYRp-Rs | XYTp-Ts | YZRp-Rs | YZTp-Ts |
|---|---|---|---|---|---|---|---|---|---|---|---|---|---|---|---|
| cross_cnt_ad[6:1] | cross_cnt_ad[1] | | | | | | | | | | | | | | |
| 0b000000 | 1'b0 | 0 | 5 | 5 | 0 | -1 | 0 | 0 | 7.128713 | Null | Null | Null | Null | Null | Null |
| 0b000000 | 1'b1 | 0 | | | | | | | | | | | | | |
| 0b000001 | 1'b0 | 1 | | | | | | | | | | | | | |
| 0b000001 | 1'b1 | 1 | | | | | | | | | | | | | |
| 0b000010 | 1'b0 | 0 | | | | | | | | | | | | | |
| 0b000010 | 1'b1 | 0 | | | | | | | | | | | | | |
| 0b000011 | 1'b0 | 1 | | | | | | | | | | | | | |
| 0b000011 | 1'b1 | 1 | | | | | | | | | | | | | |

METHOD AND APPARATUS OF OBTAINING DIRECTIVITY

BACKGROUND OF THE INVENTION

1. Field of the Invention

The present invention relates to a method and an apparatus of obtaining directivity in an optical waveguide, and a recording medium for storing the directivity. It particularly relates to a method of obtaining directivity in an optical waveguide which is used in an optical selector switch and the like.

2. Description of Related Art

A multistage optical selector switch according to a multipoint-to-multipoint system has studied and developed accompanying an expansion of long-distance multiplex communication technology using an optical cable.

Specifically, there have existed an optical switch of optical-fiber-driving type that changes optical paths by directly driving a fiber with a magnetized cover by means of electromagnet, an optical switch of micro mirror type that changes passing optical paths by changing a reflection angle of light using an MEMS mirror, an optical switch of waveguide type that switches the light on or off by, after separating light into its two spectral components that are different in a phase, performing a phase inversion on one spectral component of the light and interfering with it to original light, and a multistage optical selector switch using an optical sheet bus. The multistage optical selector according to a multipoint-to-multipoint system has been configured based on these technologies to switch a communication signal.

Such an optical switch, however, is expensive and has a large cabinet so that it is unsuitable for built-in to any general consumer appliances.

Japanese Patent Application Publication No. H10-123350 has disclosed a system in which any functions of a product are modularized so that the functions can be easily added or exchanged on an optical sheet bus.

SUMMARY OF THE INVENTION

In such a related system on the optical sheet bus, however, there is no method how to obtain distribution of the light emitted from the optical sheet bus so that it is difficult to determine what kind of shape of the incident light.

It is desirable to provide a method and an apparatus for obtaining directivity in an optical waveguide and a recording medium for storing the directivity, which can obtain a relationship between the directivity in the optical waveguide and each of the shape and incident position of the light is incident to the optical waveguide.

According to an embodiment of the present invention, there is provided a method of obtaining directivity in an optical waveguide. The method includes the step of falling incident light on at least one of diffuse reflection members that are opposed with each other and are arranged at a center portion of the optical waveguide into which the light is propagated. The method also includes the step of generating a first table relative to an amount of emitted light that is acquired at a circumference of the optical waveguide by controlling at least one of an image control factor that is used for changing an image of the light which is incident to the diffuse reflection members and a coordinate control factor that is used for changing coordinates of the light which is incident to the diffuse reflection member with at least one of the image and the coordinates of the light which is incident to the diffuse reflection members of the optical waveguide being changed. The method further includes the step of generating a second table relative to a pattern of the light which is incident to the diffuse reflection member in the optical waveguide by seeking for a combination of the image and the coordinates of the light based on the generated first table. The combination presents a desired distribution of the amount of the emitted light at the circumference of the optical waveguide.

In the embodiment of the method of obtaining directivity in the optical waveguide according to the invention, the incident light is fallen on at least one of the diffuse reflection members that are opposed with each other and are arranged at the center portion of the optical waveguide. The first table relative to an amount of emitted light that is acquired at a circumference of the optical waveguide is generated by controlling at least one of the image control factor and the coordinate control factor with at least one of the image and the coordinates of the light which is incident to the diffuse reflection members of the optical waveguide being changed.

The second table relative to a pattern of the light which is incident to the diffuse reflection member in the optical waveguide is generated by seeking for a combination of the image and the coordinates of the light based on the generated first table. The combination presents a desired distribution of the amount of the emitted light at the circumference of the optical waveguide.

According to another embodiment of the present invention, there is provided an apparatus of obtaining directivity in an optical waveguide emitting light from a circumference thereof by diffusely reflecting the light incident to the diffuse reflection members. The apparatus contains the optical waveguide in which diffuse reflection members are opposed with each other and are arranged at a center portion of the optical waveguide into which the light is propagated. The apparatus also contains a light-emitting unit that falls incident light on at least one of the diffuse reflection members of the optical waveguide and is controlled on the basis of an image control factor that is used for changing an image of the light which is incident to the diffuse reflection member and a coordinate control factor that is used for changing coordinates of the light which is incident to the diffuse reflection member. The apparatus further contains a light-receiving unit that receives light emitted from the optical waveguide at a circumference of the optical waveguide. A first table is generated relative to an amount of light received by the light-receiving unit at the circumference of the optical waveguide by controlling at least one of the image control factor and the coordinate control factor of the light which is incident to the diffuse reflection member from the light-emitting unit with at least one of the image and the coordinates of the light which is incident to the diffuse reflection member of the optical waveguide being changed. A second table is generated relative to a pattern of the light which is incident to the diffuse reflection member in the optical waveguide by seeking for a combination of the image and the coordinates of the light based on the generated first table. The combination presents a desired distribution of the amount of the emitted light at the circumference of the optical waveguide.

In the embodiment of the apparatus of obtaining directivity in the optical waveguide according to the invention, the incident light is fallen on at least one of the diffuse reflection members that are opposed with each other and are arranged at the center portion of the optical waveguide. The first table relative to an amount of emitted light that is acquired at a circumference of the optical waveguide is generated by controlling at least one of the image control factor and the coordinate control factor with at least one of the image and the coordinates of the light which is incident to the diffuse reflection member of the optical waveguide being changed.

The second table relative to a pattern of the light which is incident to the diffuse reflection member in the optical waveguide is generated by seeking for a combination of the image and the coordinates of the light based on the generated first table. The combination presents a desired distribution of the amount of the emitted light at the circumference of the optical waveguide.

According to further embodiment of the present invention, there is provided a recording medium that stores a second table relative to a pattern of light which is incident to at least one of diffuse reflection members that are opposed with each other and are arranged at a center portion of an optical waveguide into which the light is propagated. The second table presents a desired distribution of the amount of the light emitted at a circumference of the optical waveguide. The recording medium stores the second table by using steps of falling incident light on the diffuse reflection member, generating a first table relative to an amount of the emitted light that is acquired at a circumference of the optical waveguide by controlling at least one of an image control factor that is used for changing an image of the light which is incident to the diffuse reflection member and a coordinate control factor that is used for changing coordinates of the light which is incident to the diffuse reflection member with at least one of the image and the coordinates of the light which is incident to the diffuse reflection members of the optical waveguide being changed, and generating the second table by seeking for a combination of the image and the coordinates of the light based on the generated first table, the combination presenting the desired distribution of the amount of the emitted light at the circumference of the optical waveguide.

In the embodiment of the recording medium according to the present invention, the second table relative to a pattern of light which presents a desired distribution of the amount of the light at a circumference of the optical waveguide is stored so that when the light of a pattern based on the second table stored in the recording medium is irradiated, the desired distribution of the amount of the emitted light can be obtained at a circumference of the optical waveguide.

Thus, according to the embodiments of the present invention, it is capable of obtaining the desired distribution of the amount of the emitted light easily in the optical waveguide that emits the light at the circumference thereof utilizing the diffuse reflection thereof by irradiating the light with a shape to a portion of the diffuse refection member.

Further, by storing in the recording medium the second table relative to a pattern of light which presents a desired distribution of the amount of the emitted light at a circumference of the optical waveguide, it is possible to obtains the desired distribution of the amount of the emitted light at the circumference of the optical waveguide when irradiating the light with a pattern based on the second table stored in the recording medium.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 1 is a diagram showing a configuration of an apparatus of obtaining directivity in an optical waveguide, as an embodiment of the invention, which accomplishes a method of obtaining directivity in the optical waveguide, as another embodiment of the invention;

FIG. 2 is a cross sectional view of the optical waveguide showing an example thereof from which the directivity is obtained;

FIGS. 10A and 10B are diagrams each for illustrating a relationship between an amount of the emitted light and each of the incident angle and shape of the light that is incident to diffuse reflection members in the optical waveguide;

FIGS. 11A and 11B are diagrams each for illustrating a relationship between an amount of the emitted light and each of the incident angle and shape of the light that is incident to diffuse reflection members in the optical waveguide;

FIGS. 12A and 12B are diagrams each for illustrating a relationship between an amount of the emitted light and each of the incident angle and shape of the light that is incident to diffuse reflection members in the optical waveguide;

FIG. 15A is a table showing an example of a group of the circle maps by the incident lights and FIG. 15B is a table of the circle maps extracted therefrom;

FIG. 17 is a table showing an example of generated data tables;

FIG. 18 is a table showing an array of coordinates of the circle maps that are formed on diffuse reflection members in the optical waveguide;

FIG. 19 is a table showing an angle dependence characteristic of an amount of emitted light;

FIGS. 20A and 20B are diagrams each for illustrating a condition where light is incident to the diffuse reflection member of the optical waveguide;

FIGS. 22A through 22E are diagrams each for specifically showing a pattern of incident light to the diffuse reflection member;

FIGS. 23A and 23B are diagrams each for specifically showing a pattern of incident light to the diffuse reflection member;

FIG. 34 is a table showing an example of stored wavelengths of light sources to be used in the laser diode;

FIG. 35 is a table showing an example of set values relating to properties of the first optical waveguide portion;

FIG. 36 is a table showing a relationship between optical waveguide material and refractive index;

FIG. 39 is a table showing an example of pieces of arrangement information of light rays emitted from the input light source;

FIG. 41 is a table showing an example of a data structure;

FIG. 46 is a table showing a result of the calculation of points of intersection between the light that is incident to the optical waveguide and the first optical waveguide portion;

FIG. 47 is a flowchart showing a process of calculating vectors of the reflection (diffuse deflection) at each of the points of intersection;

FIGS. 50A and 50B are tables each for showing an example of a result of the calculation of the ratios of the reflection and the refraction;

FIG. 51 is a flowchart showing an example of a calculation process concerning how far the light is attenuated by the reflection (diffuse reflection);

FIGS. 52A and 52B are tables each for showing an example of a result of the calculation of the level by the reflection;

FIGS. 53A and 53B are diagrams showing an outline of the optical waveguide when calculating directivities of the light;

FIG. 56 is a table showing an example of set values relating to properties of the first optical waveguide portion;

FIGS. 57A and 57B are tables each for showing relationships between optical waveguide materials and refractive indexes;

FIG. 59 is a table showing an example of set values relating to various kinds of properties of the second optical waveguide portion;

FIGS. 60A and 60B are tables each for showing an example of generated addresses which are applied to the reflected light and the refracted light;

FIG. 61 is a flowchart showing an example of calculation process of points of intersection between the light that is incident to the optical waveguide and each of the first and second optical waveguide portions;

FIG. 62 is a table showing a result of the calculation of points of intersection between the light that is incident to the optical waveguide and each of the first and second optical waveguide portions;

FIG. 63 is a flowchart showing an example of a process of calculating vectors of the reflection and the refraction at the points of intersection;

FIG. 64 is a table showing an example of a result of the calculation of the reflection and refraction angles;

FIG. 65 is a graph showing an example a result of the calculation of the ratios of the reflection and the refraction;

FIGS. 66A and 66B are tables each for showing an example of a result of the calculation of the reflection on Z-plane;

DESCRIPTION OF THE PREFERRED EMBODIMENTS

Figure 3:
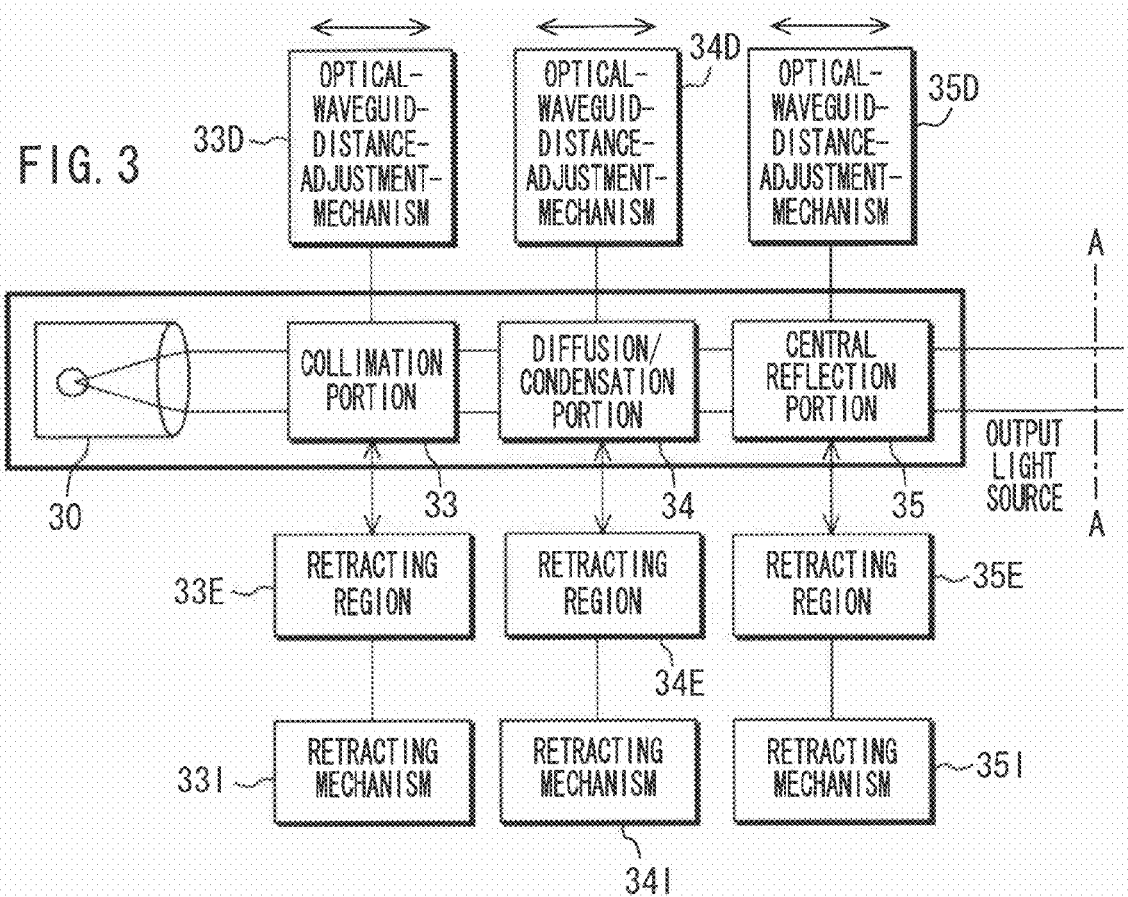
FIG. 3 is a block diagram showing a configuration of a light-emitting unit.

The following will describe embodiments of a method and an apparatus of obtaining directivity in an optical waveguide, and a recording medium therefor according to the present invention with reference to the accompanied drawings.

[Configuration of Measuring Apparatus as Embodiment of the Invention]

FIG. 1 shows a configuration of an apparatus of obtaining directivity in an optical waveguide, as an embodiment of the invention, which accomplishes a method of obtaining directivity in the optical waveguide, as another embodiment of the invention. FIG. 2 shows an example of the optical waveguide, the directivity of which is obtained.

The apparatus 1A of obtaining directivity (hereinafter referred to as a "measuring apparatus 1A") contains an optical waveguide 2A of plane type to which light is incident from an optional direction and from a circumference of which the light is emitted by diffuse reflection, a light-emitting portion 3 emitting the light, and a light-receiving portion 4 that receives the light.

Here, the reflection is a nature phenomenon in which progressive waves or particles strike a boundary surface between a medium into which they are progressing and another medium or a boundary surface between discontinuously changed media so that they change their direction and progress to a new direction in the medium. If roughness of the boundary surface has a length that is almost equal to or longer than a wavelength of each of the waves, reflection waves progress to any directions. Such a reflection is referred to as "diffuse or diffused reflection".

On the other hand, dispersion is a nature phenomenon in which waves strike an obstacle having a length that is not much longer than wavelength of each of the waves so that they spread out around the obstacle.

The optical waveguide 2A includes a first optical waveguide portion 20A as optical waveguide portion in which the light is propagated at its center portion, and a second optical waveguide portion 20B that is arranged around the first optical waveguide portion 20A. The optical waveguide 2A also includes reflecting members 21 that are positioned on both upper and lower surfaces of the second optical waveguide portion 20B so as to be opposed to each other and diffuse reflection members 22 that are positioned on both upper and lower surfaces of the first optical waveguide portion 20A at the center position of the optical waveguide 2A so as to be opposed to each other.

The first optical waveguide portion 20A and the second optical waveguide portion 20B are respectively composed of an air layer in this embodiment.

Each of the reflecting members 21 has a shape like a disk and the reflecting members 21 are positioned at a predetermined distance so as to hold the second optical waveguide portion 20B between them with their reflecting surfaces that reflect the light by total reflection being opposed to each other. The reflecting members 21 expose an outer circumference of the second optical waveguide portion 20B along the circumference thereof if the second optical waveguide portion 20B is not composed of an air layer.

The diffuse reflection members 22 hold a center portion of the first optical waveguide portion 20A between their upper and lower surfaces with their diffuse reflection surfaces, which perform diffuse reflection with their roughness having a length that is almost equal to or longer than a wavelength of the incident light being opposed to the first optical waveguide portion 20A of the air layer. Each of the diffuse reflection members 22 has a shape like a disk. A center of the circular optical waveguide 2A is aligned with a center of each of the diffuse reflection members 22. In this embodiment, each of the diffuse reflection members 22 has a flat diffuse reflection surface with the reflection surface of each of the reflecting members 21.

Thus, the optical waveguide 2A enables the light to be emitted and received at its optional positions along the outer circumference of the second optical waveguide portion 20B, thereby emitting or receiving the light to or from the outer circumference of the optical waveguide 2A. The diffuse reflection members 22 receive the light that is incident to the diffuse reflection members 22 directly from the outer circumference of the optical waveguide 2A or via the total reflection with the reflecting members 21 so that the light is emitted from the circumference of the optical waveguide 2A with the diffuse reflection by the diffuse reflection surfaces of the diffuse reflection members 22.

Accordingly, when the light is incident from an optional position around the outer circumference of the optical waveguide 2A to any diffuse reflection members 22 at an incident angle to the diffuse reflection members 22 through a position between opposed reflecting members 21, the light is emitted from the circumference of the optical waveguide 2A by the diffuse reflection of the diffuse reflection members 22, thereby enabling the light to be received at an optional position around the outer circumference of the optical waveguide 2A.

The light-emitting unit 3 includes light source, for example, a laser diode (LD) 30, an image-adjusting mechanism 31 having a function of mainly adjusting an image of the light that is incident to any of the diffuse reflection members 22 of the optical waveguide 2A from the laser diode 30, and a coordinates-adjusting mechanism 32 having a function of mainly adjusting coordinates of the light that is incident to any of the diffuse reflection members 22.

The light-receiving unit 4 includes a photodetector (PD) 40 that receives the light from the diffuse reflection members 22, converts it to any electric signals based on its level and outputs the electric signal. The light-receiving portion 4 also includes a traveling mechanism 41 that travels the photodetector 40 around the circumference of the optical waveguide 2A along the outer circumference thereof on its rails. It is to be noted that the light-receiving unit 4 may include a plurality of photodetectors 40 which correspond to resolution for measurement and are arranged around the circumference of the optical waveguide 2A along the outer circumference thereof at an angle corresponding to the resolution for measurement.

The measuring apparatus 1A includes a control unit 5 that controls the light-emitting unit 3 and the light-receiving unit 4 in order to obtain an incident pattern of the light, predetermined power distribution of which is obtained around the circumference of the optical waveguide 2A, by an experimentation. The measuring apparatus 1A also includes a calculation part 50 that calculates the patterns of the light that is incident to any of the diffuse reflection members 22 based on the amount of emitted light that the light-receiving portion 4 receives and generates tables.

The measuring apparatus 1A further includes a storage unit 6 that stores a program to be carried out in the control portion 5 or the calculation part 50, a table that may be required for the calculation, any tables generated by the calculation and the like, an output portion 7 that outputs the generated tables to a recording medium 70, and an input portion 8 that inputs any kinds of data that may be required for the calculation.

If obtaining an incident pattern of the light, predetermined power distribution of which is obtained around the circumference of the optical waveguide 2A, by the calculation, the input unit 8 inputs parameters or the like relating to the optical waveguide 2A and the light-emitting unit 3. The storage unit 6 stores a look-up table (LUT) or the like relating to the diffuse reflection members 22 to be used for a case where the power distribution of the light is obtained around the circumference of the optical waveguide 2A by the calculation. The calculation part 50 obtains the power distribution of the light around the circumference of the optical waveguide 2A by calculating optical paths generated with the reflection, the refraction and the diffuse reflection.

[Control Factor of Light Emitted from LD]

FIG. 3 shows a configuration of the light-emitting unit 3. The light-emitting unit 3 includes the laser diode 30 that emits light to be adjusted to parallel light, any one of a collimation portion 33, a diffusion/condensation portion 34 and a reflection-adjustment portion 35 as the image-adjusting mechanism 31 or any two of the collimation portion 33, the diffusion/condensation portion 34 and the reflection-adjustment portion 35 as the image-adjusting mechanism 31 or all of them as the image-adjusting mechanism 31.

Figure 4A:
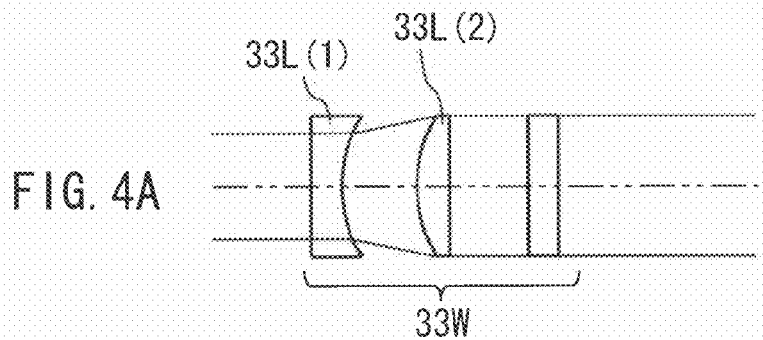
FIGS. 4A and 4B are diagrams each for illustrating a configuration of a collimation portion.
Figure 4B:
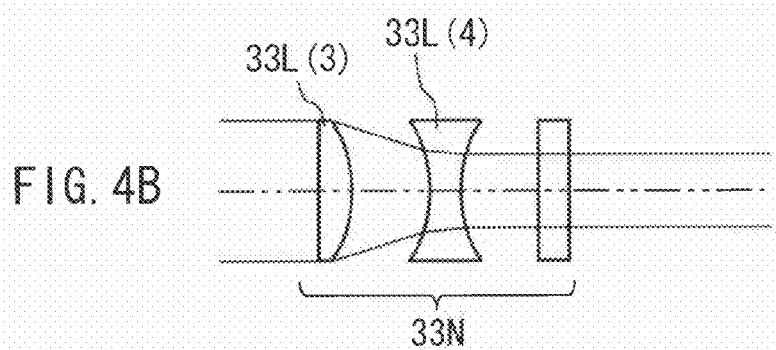

FIGS. 4A and 4B illustrate configurations of the collimation portions 33. Each of the collimation portions 33 includes any one of an enlargement collimation portion 33W and a reduction collimation portion 33N.

The enlargement collimation portion 33W contains a concave lens 33L(1) at a forward portion thereof and a convex lens 33L(2) at a rear portion thereof as shown in FIG. 4A and enlarges a diameter of the incident light to be emitted. The reduction collimation portion 33N contains a convex lens 33L(3) at a forward portion thereof and a concave lens 33L(4) at a rear portion thereof as shown in FIG. 4B and reduces the diameter of the incident light to be emitted. The collimation portion 33 may include a set of a concave lens and a convex lens for the enlargement collimation portion 33W and a set of a concave lens and a convex lens for the reduction collimation portion 33N, which are optionally switchable.

Figure 5A:
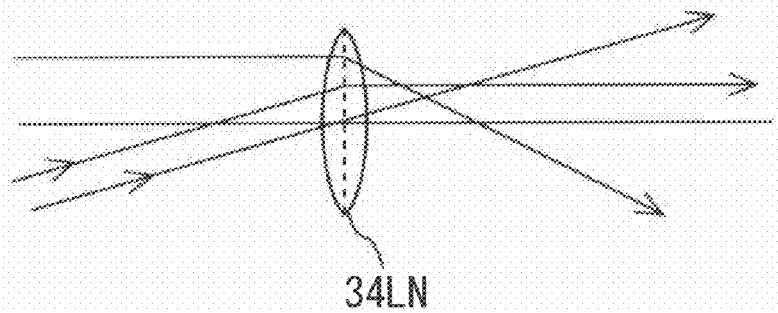
FIGS. 5A and 5B are diagrams each for illustrating a configuration of a diffusion/condensation portion.
Figure 5B:
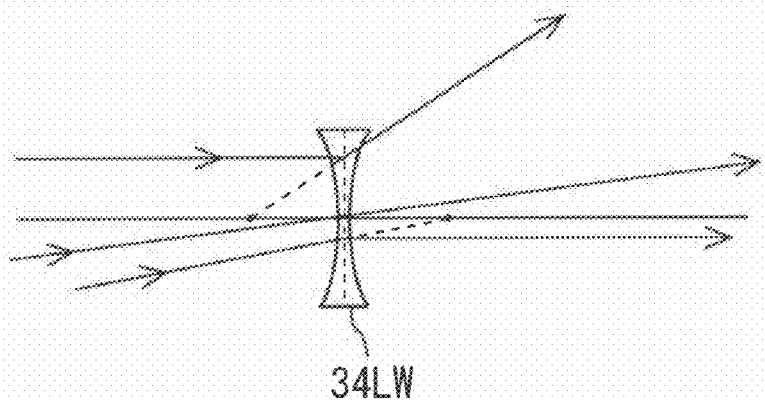

FIGS. 5A and 5B illustrate configurations of the diffusion/condensation portion 34. The diffusion/condensation portion 34 contains anyone of a convex lens 34LN that condenses the incident light to be emitted as shown in FIG. 5A and a concave lens 34LW that diffuses the incident light to be emitted as shown in FIG. 5B. The diffusion/condensation portion 34 may contain a set of a concave lens and a convex lens, which are optionally switchable.

Figure 6:
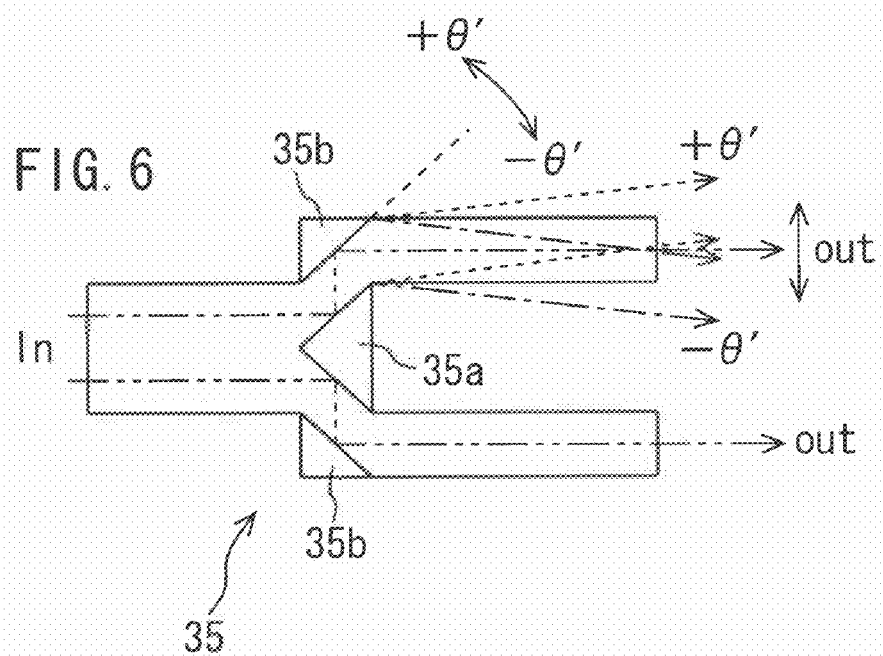
FIG. 6 is a diagram for illustrating a configuration of a reflection-adjustment portion.

FIG. 6 illustrates a configuration of a reflection-adjustment portion. A central reflection portion 35 constitutes a diffusion/condensation portion that diffuses or condenses light. The central reflection portion 35 contains a first reflection mirror 35a that has a reflection surface angle of 45 degrees and reflects incident light at 90 degrees to at least two directions and a second reflection mirror 35b that has a reflection surface angle θ so that the incident light from the first reflection mirror 35a can be reflected at 90 degrees plus or minus θ.

The first reflection mirror 35a has a conic shape and the second reflection mirror 35b has a cylinder shape with truncated conical internal space so that circular spot light is changed to ring-shaped light, which is emitted.

When there is an adjustment mechanism for changing a direction of the second reflection mirror 35b to adjust the reflection surface angle θ of the second reflection mirror 35b to become 45 degrees plus or minus θ, emitted light path can be changed within a range from plus θ' shown by broken lines in FIG. 6 to minus θ' shown by alternate long and short dashed lines in FIG. 6 with respect to parallel light. Further, the reflection surface of the second reflection mirror 35b is constituted so as to become a curved surface so that the emitted light can be diffused or condensed.

The reflection surface angle θ of the second reflection mirror 35b is adjusted so as to become 45 degrees minus θ' so that a diameter of the light that is incident to a side surface of the optical waveguide 2A can be condensed, thereby enabling a thickness of the optical waveguide 2A to be designed so as to be thinned.

If, however, the diameter of the incident light is condensed so as to focus before the diffuse reflection members 22 or the reflecting members 21, which are objects to be irradiated, the light is too diffused at the diffuse reflection members 22 or the reflecting members 21. Thus, if the reflection surface angle θ of the second reflection mirror 35b is adjusted to minus direction, the adjustment may be performed taking into consideration any maps generated at the diffuse reflection members 22 to which the light is finally irradiated and the thickness of the optical waveguide 2A.

When a part constituted by lens in each of the collimation portion 33, the diffusion/condensation portion 34 and the central reflection portion 35 is constituted by water lens or the like that has a mechanism altering its curvature, it is possible to adjust a diameter of the spot light.

When a part constituted by lens in each of the collimation portion 33, the diffusion/condensation portion 34 and the central reflection portion 35 is constituted by two blocks that are separately provided in a section direction of the light and a horizontal direction thereof against a center of the lens, is possible to adjust a shape of the spot light in the section direction of the light and the horizontal direction thereof separately.

The collimation portion 33, the diffusion/condensation portion 34 or the central reflection portion 35 contains an optical-waveguide-distance-adjustment mechanism 33D, 34D or 35D that adjusts a distance from the optical waveguide 2A separately. The collimation portion 33, the diffusion/condensation portion 34 or the central reflection portion 35 contains a retracting mechanism 33I, 34I or 35I that retracts the collimation portion 33, the diffusion/condensation portion 34 or the central reflection portion 35 separately to their retracting region 33E, 34E or 35E.

There are provided with a plurality of the collimation portions 33, the diffusion/condensation portions 34 and the central reflection portions 35, which have lens or reflection mirrors having different curvatures, and there is a recombining mechanism of each module so that any combination of them enables a desired pattern of the emitted light to be realized.

Thus, in the light-emitting unit 3 having the above-mentioned image-adjusting mechanism 31, the light emitted from the laser diode 30 is irradiated onto the optical waveguide 2A with the following image-control factors at section A-A of the light and an image of the light that is incident to any of the diffuse reflection members 22 of the optical waveguide 2A is changed by controlling the image-control factors.

[Section Direction]

An outer radius of the spot light emitted from LD in a section direction of the light (LD_vor [mm]);

An inner radius of the spot light emitted from LD in a section direction of the light (LD_vir [mm]);

An angle of an outermost beam in the spot light emitted from LD in a section direction of the light (LD_vo_ang [°]); and An angle of an innermost beam in the spot light emitted from LD in a section direction of the light (LD_vi_ang [°]).

[Horizontal Direction]

An outer radius of the spot light emitted from LD in a horizontal direction of the light (LD_hor [mm]);

An inner radius of the spot light emitted from LD in a horizontal direction of the light (LD_hir [mm]);

An angle of an outermost beam in the spot light emitted from LD in a horizontal direction of the light (LD_ho_ang [°]); and An angle of an innermost beam in the spot light emitted from LD in a horizontal direction of the light (LD_hi_ang [°]).

FIGS. 7A through 7D illustrate examples of the images of light that are respectively controlled by the image adjustment mechanism of the light-emitting unit. The spot light shown in FIG. 7A has the image-control factors, the outer radius of the spot light emitted from LD in a section direction of the light (LD_vor) and the angle of an outermost beam in the spot light emitted from LD in a section direction of the light (LD_vo_ang), in the section direction of the light. Specifically, the outer radius of the spot light emitted from LD in a section direction of the light (LD_vor) is x [mm] (LD_vor=x [mm]) and the angle of an outermost beam in the spot light emitted from LD in a section direction of the light (LD_vo_ang) is zero degrees (LD_vo_ang=0 [°]).

Figure 7A:
FIGS. 7A through 7D are schematic illustrations each for illustrating an example of an image of light that is controlled by an image adjustment mechanism of the light-emitting unit.

The spot light shown in FIG. 7A also has the image-control factors, the outer radius of the spot light emitted from LD in a horizontal direction of the light (LD_hor) and the angle of an outermost beam in the spot light emitted from LD in a horizontal direction of the light (LD_ho_ang), in the horizontal direction of the light. Specifically, the outer radius of the spot light emitted from LD in a horizontal direction of the light (LD_hor) is x [mm] (LD_hor=x [mm]) and the angle of an outermost beam in the spot light emitted from LD in a horizontal direction of the light (LD_ho_ang) is zero degrees (LD_ho_ang=0 [°]).

Figure 7B:
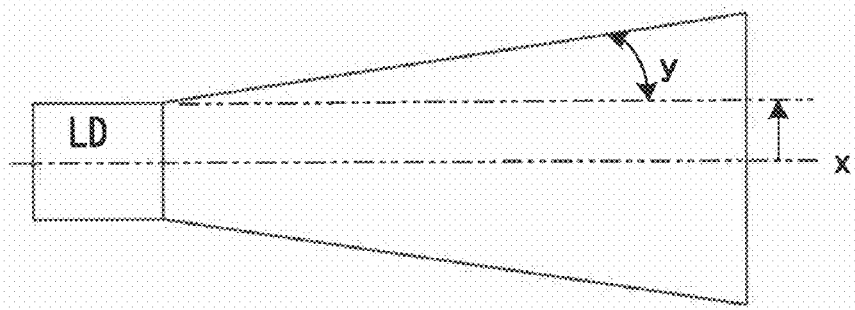

The diffused spot light shown in FIG. 7B has the image-control factors, the outer radius of the spot light emitted from LD in a section direction of the light (LD_vor) and the angle of an outermost beam in the spot light emitted from LD in a section direction of the light (LD_vo_ang), in the section direction of the light. Specifically, the outer radius of the spot light emitted from LD in a section direction of the light (LD_vor) is x [mm] (LD_vor=x [mm]) and the angle of an outermost beam in the spot light emitted from LD in a section direction of the light (LD_vo_ang) is y degrees (LD_vo_ang=y [°]).

The diffused spot light shown in FIG. 7B also has the image-control factors, the outer radius of the spot light emitted from LD in a horizontal direction of the light (LD_hor) and the angle of an outermost beam in the spot light emitted from LD in a horizontal direction of the light (LD_ho_ang), in the horizontal direction of the light. Specifically, the outer radius of the spot light emitted from LD in a horizontal direction of the light (LD_hor) is x [mm] (LD_hor=x [mm]) and the angle of an outermost beam in the spot light emitted from LD in a horizontal direction of the light (LD_ho_ang) is y degrees (LD_ho_ang=y [°]).

Figure 7C:
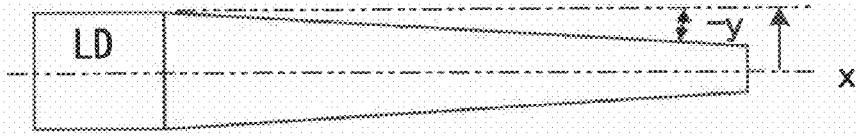

The condensed spot light shown in FIG. 7C has the image-control factors, the outer radius of the spot light emitted from LD in a section direction of the light (LD_vor) and the angle of an outermost beam in the spot light emitted from LD in a section direction of the light (LD_vo_ang), in the section direction of the light. Specifically, the outer radius of the spot light emitted from LD in a section direction of the light (LD_vor) is x [mm] (LD_vor=x [mm]) and the angle of an outermost beam in the spot light emitted from LD in a section direction of the light (LD_vo_ang) is −y degrees (LD_vo_ang=−y [°]).

The condensed spot light shown in FIG. 7C also has the image-control factors, the outer radius of the spot light emitted from LD in a horizontal direction of the light (LD_hor) and the angle of an outermost beam in the spot light emitted from LD in a horizontal direction of the light (LD_ho_ang), in the horizontal direction of the light. Specifically, the outer radius of the spot light emitted from LD in a horizontal direction of the light (LD_hor) is x [mm] (LD_hor=x [mm]) and the angle of an outermost beam in the spot light emitted from LD in a horizontal direction of the light (LD_ho_ang) is −y degrees (LD_ho_ang=−y [°]).

Figure 7D:
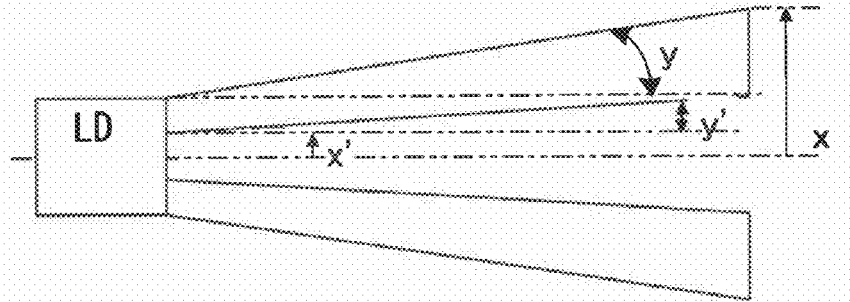

The reflected (diffused) spot light shown in FIG. 7D that the central reflection portion 35 reflects has the image-control factors, the outer radius of the spot light emitted from LD in a section direction of the light (LD_vor), the inner radius of the spot light emitted from LD in a section direction of the light (LD_vir), the angle of an outermost beam in the spot light emitted from LD in a section direction of the light (LD_vo_ang), and the angle of an innermost beam in the spot light emitted from LD in a section direction of the light (LD_vi_ang), in the section direction of the light. Specifically, the outer radius of the spot light emitted from LD in a section direction of the light (LD_vor) is x [mm] (LD_vor=x [mm]), the inner radius of the spot light emitted from LD in a section direction of the light (LD_vir) is x' [mm] (LD_vir=x' [mm]), the angle of an outermost beam in the spot light emitted from LD in a section direction of the light (LD_vo_ang) is y degrees (LD_vo_ang=y [°]) and the angle of an innermost beam in the spot light emitted from LD in a section direction of the light (LD_vi_ang) is y' degrees ((LD_vi_ang=y' [°]).

The reflected (diffused) spot light shown in FIG. 7D that the central reflection portion 35 reflects has the image-control factors, the outer radius of the spot light emitted from LD in a horizontal direction of the light (LD_hor), the inner radius of the spot light emitted from LD in a horizontal direction of the light (LD_hir), the angle of an outermost beam in the spot light emitted from LD in a horizontal direction of the light (LD_ho_ang), and the angle of an innermost beam in the spot light emitted from LD in a horizontal direction of the light (LD_hi_ang), in the horizontal direction of the light. Specifically, the outer radius of the spot light emitted from LD in a horizontal direction of the light (LD_hor) is x [mm] (LD_hor=x [mm]), the inner radius of the spot light emitted from LD in a horizontal direction of the light (LD_hir) is x' [mm] (LD_hir=x' [mm]), the angle of an outermost beam in the spot light emitted from LD in a horizontal direction of the light (LD_ho_ang) is y degrees (LD_ho_ang=y [°]) and the angle of an innermost beam in the spot light emitted from LD in a horizontal direction of the light (LD_hi_ang) is y' degrees ((LD_hi_ang=y' [°]).

The reflected (condensed) spot light, not shown, that the central reflection portion 35 reflects has the image-control factors, the outer radius of the spot light emitted from LD in a section direction of the light (LD_vor), the inner radius of the spot light emitted from LD in a section direction of the light (LD_vir), the angle of an outermost beam in the spot light emitted from LD in a section direction of the light (LD_vo_ang), and the angle of an innermost beam in the spot light emitted from LD in a section direction of the light (LD_vi_ang), in the section direction of the light. Specifically, the outer radius of the spot light emitted from LD in a section direction of the light (LD_vor) is x [mm] (LD_vor=x [mm]), the inner radius of the spot light emitted from LD in a section direction of the light (LD_vir) is x' [mm] (LD_vir=x' [mm]), the angle of an outermost beam in the spot light emitted from LD in a section direction of the light (LD_vo_ang) is −y degrees (LD_vo_ang=−y [°]) and the angle of an innermost beam in the spot light emitted from LD in a section direction of the light (LD_vi_ang) is −y' degrees ((LD_vi_ang=−y' [°]).

The reflected (condensed) spot light that the central reflection portion 35 reflects also has the image-control factors, the outer radius of the spot light emitted from LD in a horizontal direction of the light (LD_hor), the inner radius of the spot light emitted from LD in a horizontal direction of the light (LD_hir), the angle of an outermost beam in the spot light emitted from LD in a horizontal direction of the light (LD_ho_ang), and the angle of an innermost beam in the spot light emitted from LD in a horizontal direction of the light (LD_hi_ang), in the horizontal direction of the light. Specifically, the outer radius of the spot light emitted from LD in a horizontal direction of the light (LD_hor) is x [mm] (LD_hor=x [mm]), the inner radius of the spot light emitted from LD in a horizontal direction of the light (LD_hir) is x' [mm] (LD_hir=x' [mm]), the angle of an outermost beam in the spot light emitted from LD in a horizontal direction of the light (LD_ho_ang) is −y degrees (LD_ho_ang=−y [°]) and the angle of an innermost beam in the spot light emitted from LD in a horizontal direction of the light (LD_hi_ang) is −y' degrees ((LD_hi_ang=−y' [°]).

The coordinates-adjusting mechanism 32 contains an incident angle adjustment mechanism that adjusts a direction of the light-emitting unit 3 and a position adjustment mechanism that adjusts a position thereof. The incident angle adjustment mechanism and the position adjustment mechanism have functions to adjust the direction and the position of the light-emitting unit 3 separately in the section direction of the light and the horizontal direction thereof.

[Control Factors for Allowing the Light Emitted from LD to be Incident to Diffuse Reflection Members of Optical Waveguide]

Figure 8A:
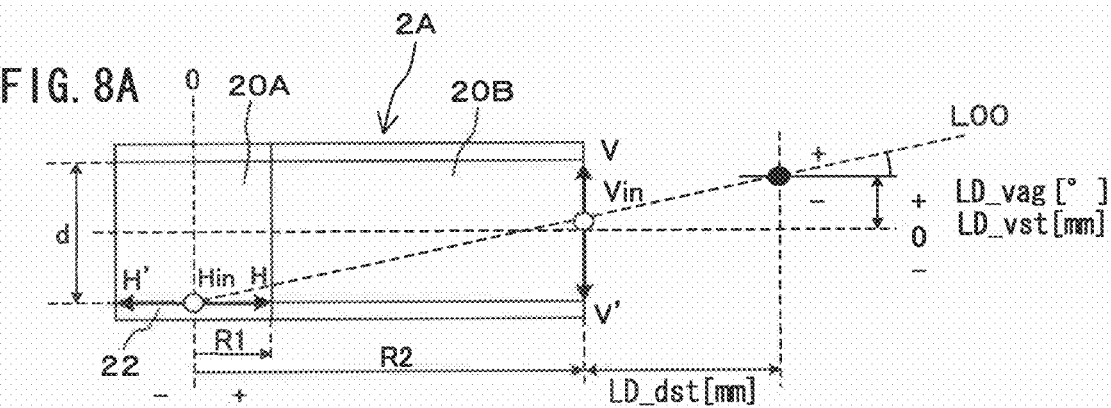
FIGS. 8A and 8B are diagrams each for showing a condition when light is incident to diffuse reflection members in the optical waveguide.
Figure 8B:
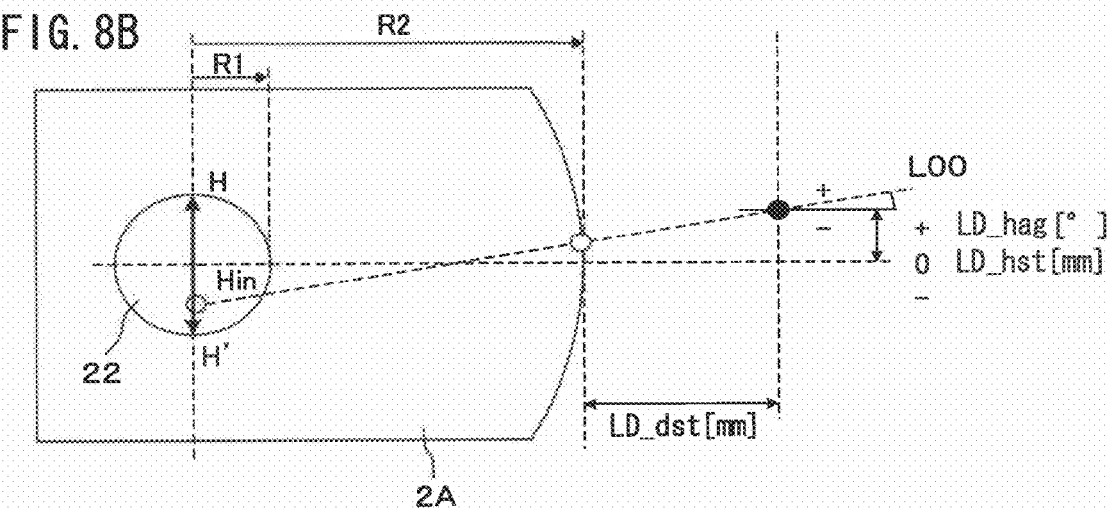

FIGS. 8A and 8B show a condition when light is incident to the diffuse reflection members 22 of the optical waveguide 2A. FIG. 8A shows the optical waveguide 2A seen in a section direction thereof. FIG. 8B shows the optical waveguide 2A seen in a plane direction thereof. The following will describe a condition that me be necessary when the light emitted from light-emitting unit 3 is incident to the diffuse reflection members 22 of Optical Waveguide 2A.

It is assumption (assumption 1) that light emitted from the light-emitting unit 3 is collimated parallel light. It is assumption (assumption 2) that both the first optical waveguide portion 20A and the second optical waveguide portion 20B in the optical waveguide 2A are air layers. It is assumption (assumption 3) that the light emitted from the light-emitting unit 3 is irradiated at any one of the opposed diffuse reflection members 22.

In the light-emitting unit 3, by being provided with the above-mentioned coordinates-adjusting mechanism 32 or the like, the following image control factors relating to the light-emitting unit 3 and the optical waveguide 2A are set. Controlling coordinate control factors enables a coordinates of the light that is incident to any of the diffuse reflection members 22 to be changed.

[Section Direction]

An angle of the light emitted from LD in a section direction of the light (LD_vag [°]);

A vertical position of LD (LD_vst [mm]); and

A distance between LD and optical waveguide material (LD_dst [mm]).

[Horizontal Direction]

An angle of the light emitted from LD in a horizontal direction of the light (LD_hag [°]); and A horizontal position of LD (LD_hst [mm]).

A radius of each of the diffuse reflection members 22 in the optical waveguide 2A is set to R1, a radius of the optical waveguide 2A is set to R2 and a thickness of the optical waveguide 2A is set to d.

An optional position (x, y, z) of an outer point of the optical waveguide 2A is indicated according to the following equation (1) using the coordinate control factors, the distance between LD and optical waveguide material (LD_dst), the horizontal position of LD (LD_hst) and the vertical position of LD (LD_vst).

$$(x,y,z)=(R2+LD\_dst, LD\_hst, LD\_vst) \quad (1)$$

An incident angle of the light emitted from the light-emitting unit (LD light source) 3 with respect to the optical waveguide 2A (diffuse reflection members 22) is indicated according to the following equation (2) using the coordinate control factors, the angle of the light emitted from LD in a section direction of the light (LD_vag) and the angle of the light emitted from LD in a horizontal direction of the light (LD_hag).

$$(\angle XY, \angle XZ)=(LD\_hag, LD\_vag) \quad (2)$$

An incident position Vin of the light emitted from the LD light source and projected to a plane V-V' indicating an outer circumference surface of the optical waveguide 2A in the section direction of the light is an intersection of a line L00 passing through the outer point, (x, y, z)=(R2+LD_dst, LD_hst, LD_vst), of the optical waveguide 2A and having an angle, (∠XY, ∠XZ)=(LD_hag, LD_vag), and a curved surface satisfying conditions of the following equations (3), (4) and (5).

$$y^2+x^2=R2^2 \quad (3)$$

$$x>0 \quad (4)$$

$$-d/2<z<d/2 \quad (5)$$

An incident position Hin of the light emitted from the LD light source and projected to a plane H-H' indicating an inner circumference surface of any one of the diffuse reflection members 22 in the horizontal direction of the light is an intersection of the line L00 and a surface satisfying conditions of the following equations (6), (7) and (8).

$$y^2+x^2=R1^2 \quad (6)$$

$$z=-d/2(LD\_vag>0) \quad (7)$$

$$z=d/2(LD\_vag<0) \quad (8)$$

Light, the incident position Vin of which is an intersection of the line L00 and the curved surface satisfying conditions of the above-mentioned equations (3), (4) and (5), can be incident to the diffuse reflection members 22 through the outer circumference of the optical waveguide 2A. Light, the incident position Hin of which is an intersection of the line L00 and the plane satisfying conditions of the above-mentioned equations (6), (7) and (8), can be incident to any of the diffuse reflection members 22 in the optical waveguide 2A.

Thus, controlling the coordinate control factors so that they satisfy the conditions of the above-mentioned equations (3) through (6) allows the light emitted from the light-emitting unit 3 to be made incident to any of the diffuse reflection members 22 through the circumference of the optical waveguide 2A.

If the number of times in which the light that is incident to the optical waveguide 2A is reflected on the reflecting members 21 is set to Ref_no, the above-mentioned equations (7) and (8) satisfy constraint conditions of the following equations (9) and (10).

$$z=-/2(Ref\_no=2n, LD\_vag<0) \quad (9)$$

$$z=d/2(Ref\_no=2n+1, LD\_vag>0) \quad (10)$$

Satisfying either the condition of the above-mentioned equation (9) or (10) allows which of the opposed diffuse reflection members 22 to which the light propagated into the optical waveguide 2A is incident to be determined. This also allows which of the opposed reflection members 21 by which the light to be emitted from the optical waveguide 2A is reflected to be determined. This further allows selection of angular directivity of the light-receiving unit 4 to be obtained.

If the image control factors, the angle of an outermost beam in the spot light emitted from LD in a section direction of the light (LD_vo_ang) and the angle of an innermost beam in the spot light emitted from LD in a section direction of the light (LD_vi_ang), to identify an angle of the spot light in the section direction of the light emitted from the light-emitting unit 3 are added to the above-mentioned equations (3) through (10), their values are set so that they satisfy a condition of each equation.

Similarly, if the image control factors, the angle of an outermost beam in the spot light emitted from LD in a horizontal direction of the light (LD_ho_ang) and the angle of an innermost beam in the spot light emitted from LD in a horizontal direction of the light (LD_hi_ang), to identify an angle of the spot light in the horizontal direction of the light emitted from the light-emitting unit 3 are added to the above-mentioned equations (3) through (10), their values are set so that they satisfy a condition of each equation.

If the image control factors, the outer radius of the spot light emitted from LD in a section direction of the light (LD_-vor) and the inner radius of the spot light emitted from LD in a section direction of the light (LD_vir), to identify a radius of the spot light in the section direction of the light emitted from the light-emitting unit 3 are added to the above-mentioned equations (3) through (10), their values are set so that they satisfy a condition of each equation.

Similarly, if the image control factors, the outer radius of the spot light emitted from LD in a horizontal direction of the light (LD_hor) and the inner radius of the spot light emitted from LD in a horizontal direction of the light (LD_hir), to identify a radius of the spot light in the horizontal direction of the light emitted from the light-emitting unit 3 are added to the above-mentioned equations (3) through (10), their values are set so that they satisfy a condition of each equation.

Thus, controlling the image control factors and the coordinate control factors so that predetermined conditions of the above-mentioned equations (3) through (10) are satisfied allows an irradiation surface by the LD having an optional shape to be formed on an optional position of either of the diffuse reflection members 22.

[Relationship Between Irradiation Shape by LD and Amount of Received Light by PD]

FIGS. 9 through 13 illustrate a relationship between an amount of the emitted light and each of the incident angle and shape of the light that is incident to any of the diffuse reflection members in the optical waveguide. The following will describe a relationship between a shape of the light that is irradiated to any of the diffuse reflection embers 22 (hereinafter referred to be as an "LD irradiation shape") and an amount of the emitted light which is received by the light-receiving unit 4 along the circumference of the optical waveguide 2A when the light is incident to any of the diffuse reflection members 22 of the optical waveguide 2A from the light-emitting unit 3 with the image control factors and the coordinate control factors being controlled.

[Assumptions]

Figure 9:
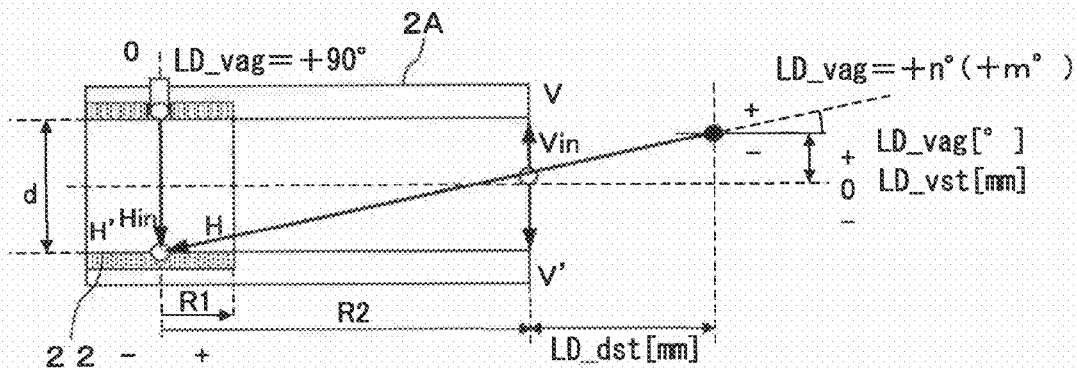
FIG. 9 is a diagram illustrating a relationship between an amount of the emitted light and each of the incident angle and shape of the light that is incident to any of the diffuse reflection members in the optical waveguide.

If the light-emitting unit 3 emits the light having an amount of light P_in to the diffuse reflection members 22 at the angle of the light emitted from LD in a section direction of the light (LD_vag) of +90 degrees or −90 degrees (hereinafter, referred to as "LD section angle LD_vag=±90°"), namely perpendicularly, as shown in FIG. 9, the light having the LD irradiation shape is mapped to any of the diffuse reflection members 22 as circle map C1 as shown in FIG. 10A. An amount of emitted light is constant over the circumference of the optical waveguide 2A as shown in FIG. 10B. This amount of emitted light is set to P_out.

If the light-emitting unit 3 emits the light having an amount of light P_in to the diffuse reflection members 22 at the LD_vag of +m degrees (LD_-vag=+m°), namely diagonally, as shown in FIG. 9, the light having the LD irradiation shape is mapped to any of the diffuse reflection members 22 as an ellipse map (hereinafter, referred to as "0-180 ellipse map") C2, a major axis of which extends along a line passing through a coordinates of 0 degrees of any of the diffuse reflection members 22 and a coordinates of 180 degrees thereof, as shown in FIG. 11A. An amount of emitted light indicates a specially strong directivity at the coordinates of 0 degrees of any of the diffuse reflection members 22 and a slightly strong directivity at the coordinates of 180 degrees thereof, as shown in FIG. 11B. This amount of emitted light is set to P'_out.

If a position on the circumference of the optical waveguide 2A is represented as an angle n, an amount of the emitted light at the angle n is set to P_n. Further, an amount of loss light generated when the diffuse reflection member 22 performs the diffuse reflection on the light on which the diffuse reflection member 22 has performed the diffuse reflection is set to run_p_n. An amount of loss light generated when the reflecting member 21 performs the reflection on the light on which the diffuse reflection member 22 has performed the diffuse reflection is set to ref_p_n.

Under the above-mentioned assumptions, the relationship between the amount of the incident light and the amount of the emitted light is indicated according to the following equations (11), (12) and (13).

$$P\_out = \int_{n=0}^{\pm 180} p\_n \qquad (11)$$

$$P\_in = P\_out + \int_{n=0}^{\pm 180} run\_p\_n + \int_{n=0}^{\pm 180} ref\_p\_n \qquad (12)$$

$$P\_in > P\_out \qquad (13)$$

When the light having the LD irradiation shape is mapped as the circle map, the following relations (1), (2) and (3) are held.

(1) The amount of the emitted light, p_n is approximated to a constant value;

(2) The amount of loss light, run_p_n is approximated to a constant value; and (3) The amount of loss light, ref_p_n is approximated to a constant value.

Here, a reason why the amount of the emitted light and the amount of loss light are respectively approximated to the constant value on a circumference of the optical waveguide 2A will be described if the light having the LD irradiation shape is mapped to any one of the diffuse reflection members 22 as the circle map under following conditions (a) through (c):

(a) The incident angle of the light with respect to the diffuse reflection members 22 is set to the LD section angle LD_vag=±90° and the light is irradiated over a center of the diffuse reflection members 22;

(b) The light that is irradiated to the diffuse reflection members 22 is mapped thereto as the circle map; and (c) The diffuse reflection members 22 are arranged at a center of the circle optical waveguide 2A and the circumference of the optical waveguide emitting the light is positioned so as to have same distance with respect to the map.

If the diffuse reflection members 22 are used, the light that is incident to the diffuse reflection surface is reflected to various directions so that the loss light at the angle n on the circumference of the optical waveguide 2A is not constant. If, however, the above-mentioned conditions (a) to (c) are satisfied, variation of the loss is influenced by only a shape of the diffuse reflection surface of any of the diffuse reflection members 22, for example, a difference of the output loss at a time of one rotation of the diffuse reflection surface on the horizontal direction. This enables the loss of the light to be approximated to a constant value when the light is irradiated over the diffuse reflection members 22 as compared with a case where the light is irradiated from a side surface of the optical waveguide 2A.

Accordingly, if the incident angle of the light with respect to the diffuse reflection members 22 is set to the LD section angle LD_vag=±90° and the light having the LD irradiation shape is mapped to any of the diffuse reflection members 22 as the circle map, the amount of the emitted light and the amount of the loss light can be respectively approximated to a constant value on the circumference of the optical waveguide 2A.

When the light having the LD irradiation shape is mapped as the 0-180 ellipse map, optical vectors from the light-emitting portion 3 change on the circumference of the optical waveguide 2A on a route from 180 degrees to zero degrees and the following relations (4), (5), (6) and (7) are held.

(4) p_n=fP(n);
(5) run_pn=f run_p(n);
(6) ref_p_n=f ref_p(n); and
(7) The optical vectors within a range of the angle n from zero degrees to 180 degrees through 90 degrees and the optical vectors within a range of the angle n from zero degrees to 180 degrees through 270 degrees are line symmetry to each other.

A state where an outer diameter of a spot light emitted from the light-emitting portion 3 at the angles of 0 and 180 degrees satisfies following equation (14) and an outer diameter of the spot light emitted from the light-emitting portion 3 at the angles of 90 degrees and 270 degrees satisfies following equation (15) when the spot light is incident to the diffuse reflection members 22 by controlling the image control factors and the coordinate control factors so as to satisfy the above-mentioned equations (3) through (10) under a predetermined condition is set to an ST00.

$$Hin\_X=R1 \quad (14); \text{ and}$$

$$Hin\_Y \approx R1\_min \quad (15)$$

where R1_min indicates a minimum diameter of the light that the light-emitting portion 3 can adjusts.

A control factor for changing the outer diameter of a spot light emitted from the light-emitting portion 3 to become the 0-180 ellipse map by adjusting in a –y direction an angle of an outermost beam in the spot light emitted from LD in a section direction of the light (LD_vo_ang [°]) to condense the light emitted from the light-emitting portion 3 at this state, ST00, so as to satisfy following equation (16) is set to CTL01. It is to be noted that in the following equation (16), as shown in FIG. 12, the 0-180 ellipse map is changed to a circle map C3.

$$R1 > Hin\_X > 0 \quad (16)$$

When the outer diameter of a spot light emitted from the light-emitting portion 3 to become the 0-180 ellipse map is changed by controlling the control factor CTL01 so as to satisfy the above equation (16), the amount of the emitted light, p_n which satisfies following equation (17) is stored as TABLE01.

TABLE01

$$P\_ini\_out = \int_{Hin\_X=0}^{+R1} \int_{n=0}^{\pm 180} p\_n \quad (17)$$

Figure 13:
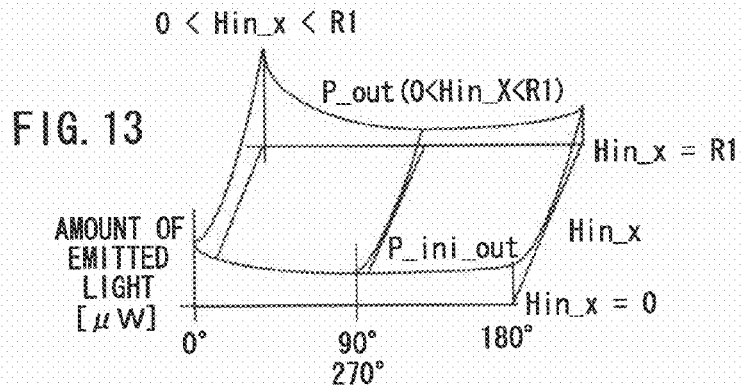
FIG. 13 is a diagram for illustrating a relationship between an amount of the emitted light and each of the incident angle and shape of the light that is incident to diffuse reflection members in the optical waveguide.

When the outer diameter of a spot light emitted from the light-emitting portion 3 to become the 0-180 ellipse map is changed by controlling the control factor CTL01 so as to satisfy the above equation (16), as shown in FIG. 13, amounts of emitted light, P_ini_out near the angle of zero degrees and 180 degrees decrease and amounts of emitted light, P_ini_out near the angles of 90 degrees and 270 degrees increase. Thus, in the TABLE01, the LD irradiation shape is stored in which in a distribution of the amount of emitted light, the amount of emitted light is approximated to a constant value on the circumference of the optical waveguide 2A as shown in FIG. 12B.

When the outer diameter of a spot light emitted from the light-emitting portion 3 to become the 0-180 ellipse map is changed by adjusting an outer radius of the spot light emitted from LD in a section direction of the light (LD_vor [mm]) to focus the light emitted from the light-emitting portion 3 at the above-mentioned state, ST00, so as to satisfy following equation (16), the amount of the emitted light, p_n which satisfies following equation (17) may be stored as TABLE 1.

[Calculation Method by Squared Array and Superposition]

The following will describe a case where a plurality of the spot lights is incident to the diffuse reflection members 22 of the optical waveguide 2A.

FIGS. 14A through 14D illustrate examples of an array of circle maps by incident lights. When the circle maps are arrayed into a square, an amount of emitted light can be obtained on the basis of the four circle maps C4 that are overlapped or closed to each other by using their symmetries as shown by solid lines in FIGS. 14A and 14B.

Accordingly, a state where following equations (18), (19) and (20) are satisfied after the four light-emitting portions 3 are separately provided under a constitution described in relation to FIG. 1 and the TABLE 1 is stored by controlling the above-mentioned control factors on the respective light-emitting portions 3 is set to an ST00.

$$Hin\_X \approx R1\_min \quad (18);$$

$$Hin\_Y \approx R1\_min \quad (19); \text{ and}$$

$$Hin\_Y^2 = Hin\_X^2 \quad (20)$$

At this state ST01, the outer radius of the spot light emitted from LD in a section direction of the light (LD_vor [mm]), which is a circle map control factor for specifying a radius of the spot light in the section direction of the light, is adjusted or the angle of an outermost beam in the spot light emitted from LD in a section direction of the light (LD_vo_ang [°]), which is a circle map control factor for specifying a radius of the spot light in the section direction of the light, is adjusted.

Similarly, the outer radius of the spot light emitted from LD in a horizontal direction of the light (LD_hor [mm]), which is a circle map control factor for specifying a radius of the spot light in the horizontal direction of the light, is adjusted or the angle of an outermost beam in the spot light emitted from LD in a horizontal direction of the light (LD_ho_ang [°]), which is a circle map control factor for specifying a radius of the spot light in the horizontal direction of the light, is adjusted.

The angle of the light emitted from LD in a section direction of the light (LD_vag [°]), which is a center-of-circle coordinate control factor for specifying a coordinates of the spot light in a section direction of the light, the vertical position of LD (LD_vst [mm]), and the distance between LD and optical waveguide material (LD_dst [mm]) are adjusted.

The angle of the light emitted from LD in a horizontal direction of the light (LD_hag [°]), which is a center-of-circle coordinate control factor for specifying a coordinates of the spot light in a horizontal direction of the light, and the horizontal position of LD (LD_hst [mm]) are adjusted.

Thus, when controlling each control factor, the circle maps C4 are superposed and a control factor for assigning a group of circle maps that satisfies following equations (21) and (22) is set to CTL02.

$$(Hin\_Y \pm R1\_min*n)^2 = (Hin\_X \pm R1\_min*n)^2 \quad (21)$$

$$R1\_min*n < R1 \quad (22)$$

FIGS. 15A and 15B show group of the circle maps. For example, from the group of the circle maps by the incident lights shown in FIG. 15A, the superposed four circle maps as shown in FIG. 15B are extracted and the four light-emitting portions are separately switched on or off.

Figure 14A:
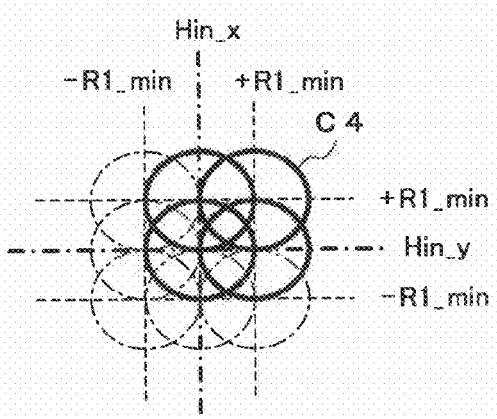
FIGS. 14A through 14D are diagrams each for illustrating an example of an array of circle maps by incident lights.

When by controlling the control factor CTL02, the group of the circle maps in which the circle maps C4 are superposed in a squared array is assigned as shown in FIG. 14A and a set of four superposed circle maps is extracted as well as the four light-emitting portions are separately switched on or off, the amount of the emitted light, p_n which satisfies following equation (23) is stored as TABLE02.

TABLE02

$$P\_cyc\_out = \int_{yn=-R1}^{+R1} \int_{xn=-R1}^{+R1} \int_{LD=0}^{F} \int_{n=0}^{\pm 180} p\_n \quad (23)$$

ST1 = square
ST2 = repeat
ST3 = total where ST1 indicates an array and a shape of circle maps and ST1=square indicates a state in which the circle maps are arrayed in a square; ST2 indicates which the circle maps are superposed or separated and ST2=repeat indicates a state in which the circle maps are superposed; and ST3 indicates whether or not a superposed portion of the circle maps is subtracted and ST3=total indicates a state in which a total of the amounts of emitted light on the plurality of circle maps is acquired.

[Subtraction Method by Squared Array and Superposition]

When by controlling the above-mentioned control factor CTL02, the group of the circle maps in which the circle maps C4 are superposed in a squared array is assigned as shown in FIG. 14A and a set of four superposed circle maps is extracted as well as the four light-emitting portions are separately switched on or off, the amount of the emitted light of a superposed portion of the circle maps C4 shown in FIG. 14A is subtracted and the amount of the emitted light, p_n which satisfies following equation (24) is stored as TABLE03.

TABLE03

$$P\_cyc\_out = \int_{yn=-R1}^{+R1} \int_{xn=-R1}^{+R1} \int_{LD=0}^{F} \int_{n=0}^{\pm 180} p\_n \quad (24)$$

ST1 = square
ST2 = repeat
ST3 = cal where ST3=cal indicates a state in which a superposed portion of the circle maps is subtracted.

[Approximation Method by Squared Array]

A control factor for assigning a group of circle maps such that following equations (25) and (26) are satisfied by separating the circle maps and adjoin them in the above-mentioned state ST00 after the one light-emitting portion 3 is provided under a constitution described in relation to FIG. 1 and the TABLE 1 is stored is set to a CTL03.

$$(Hin\_Y \pm R1\_min*2n)^2 = (Hin\_X \pm R1\_min*2n)^2 \quad (25)$$

$$R1\_min*2n < R1 \quad (26)$$

Figure 14B:
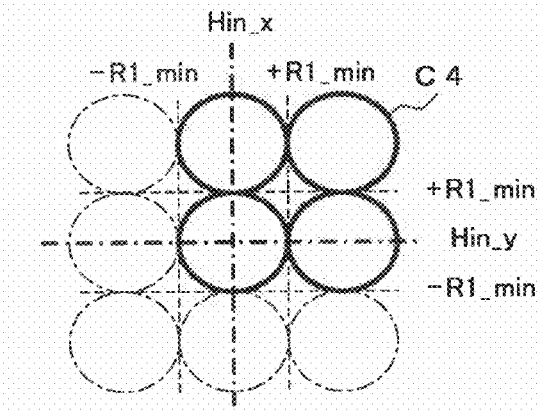

By controlling the control factor CTL03, the group of the circle maps in which the superposed circle maps are separated and the separated circle maps are adjoined in a squared array is assigned as shown in FIG. 14B and a set of four adjoined circle maps is extracted as well as the amount of the emitted light, p_n which satisfies following equation (27) is stored as TABLE04.

TABLE04

$$P\_cyc\_out = \int_{yn=-R1}^{+R1} \int_{xn=-R1}^{+R1} \int_{n=0}^{\pm 180} p\_n \quad (27)$$

ST1 = square
ST2 = separate
ST3 = total where ST2=separate indicates a state in which the circle maps is separated.

[Calculation Method by Honeycomb Array and Superposition]

Figure 14C:
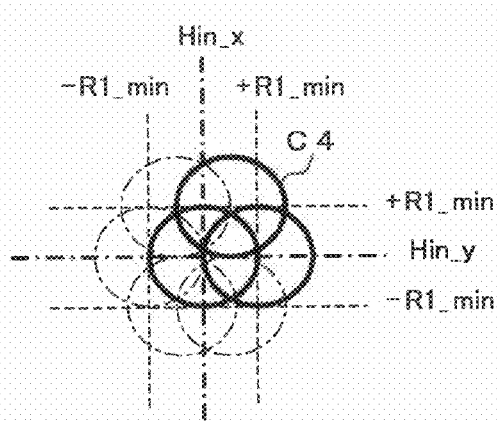
Figure 14D:
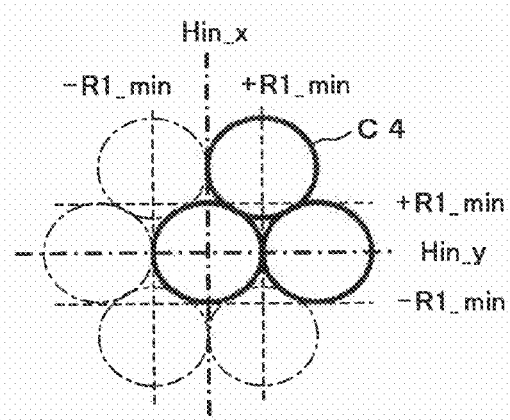

If the circle maps C4 are arrayed like a honeycomb as shown in FIGS. 14C and 14D, based on three adjacent circle maps C4 shown by solid lines, an amount of emitted light can be obtained by using their symmetries.

By controlling the control factor CTL02 in the above-mentioned state ST01, the group of the circle maps in which the circle maps are superposed in a honeycomb array is assigned as shown in FIG. 14C and a set of three superposed circle maps is extracted as well as the amount of the emitted light, p_n which satisfies following equation (28) is stored as TABLE05.

TABLE05

$$P\_cyc\_out = \int_{yn=-R1}^{+R1} \int_{xn=-R1}^{+R1} \int_{n=0}^{\pm 180} p\_n \quad (28)$$

ST1 = hexagon
ST2 = repeat
ST3 = total where ST1=hexagon indicates a state in which the circle maps is arrayed like a honeycomb.

[Subtraction Method by Honeycomb Array and Superposition]

By controlling the above-mentioned control factor CTL02, the group of the circle maps in which the circle maps C4 are superposed in a honeycomb array is assigned as shown in FIG. 14C and a set of three superposed circle maps is extracted as well as the amount of the emitted light of a superposed portion of the circle maps C4 shown in FIG. 14C is subtracted and the amount of the emitted light, p_n which satisfies following equation (29) is stored as TABLE06.

TABLE06

$$P\_cyc\_out = \int_{yn=-R1}^{+R1} \int_{xn=-R1}^{+R1} \int_{n=0}^{\pm 180} p\_n \quad (29)$$

ST1 = hexagon
ST2 = repeat
ST3 = cal

[Approximation Method by Honeycomb Array]

By controlling the control factor CTL03 in the above-mentioned state ST01, the group of the circle maps in which the superposed circle maps are separated and the separated circle maps are adjoined in a honeycomb array is assigned as shown in FIG. 14D and a set of three adjoined circle maps is extracted as well as the amount of the emitted light, p_n which satisfies following equation (30) is stored as TABLE07.

TABLE07

$$P\_cyc\_out = \int_{yn=-R1}^{+R1} \int_{xn=-R1}^{+R1} \int_{n=0}^{\pm 180} p\_n \quad (30)$$

ST1 = hexagon
ST2 = separate
ST3 = total

[Correction of a Variation in Optical Properties of Each LD in Circle Maps]

The above-mentioned tables TABLE02 to TABLE07 indicate the amounts of the emitted lights in circle maps when a plurality of the circle maps C4 is arrayed like a square or a honeycomb. Accordingly, as following equations (31) through (36), each tables TABLE02 to TABLE07 multiplied by an amount of light P_in/m, which is obtained by dividing an amount of light P_in that the light-emitting unit 3 emits by the number of circle maps, is equal to each of the following tables TABLE02' to TABLE07' which are stored.

$$TABLE02'=(TABLE02)*P\_in/m \quad (31)$$

$$TABLE03'=(TABLE03)*P\_in/m \quad (32)$$

$$TABLE04'=(TABLE04)*P\_in/m \quad (33)$$

$$TABLE05'=(TABLE05)*P\_in/m \quad (34)$$

$$TABLE06'=(TABLE06)*P\_in/m \quad (35)$$

$$TABLE07'=(TABLE07)*P\_in/m \quad (36)$$

The letter "m" indicates the number of circle maps.

[Correction of Variation in Optical Properties of Each LD]

The above-mentioned tables TABLE02' to TABLE07' indicate the amounts of the emitted lights in circle maps when a plurality of the circle maps C4 is arrayed like a square or a honeycomb. The following will describe a case where these circle maps are approximated by single circle map.

At the above-mentioned state ST01, the outer radius of the spot light emitted from LD in a section direction of the light (LD_vor [mm]), which is a circle map control factor for specifying a radius of the spot light in the section direction of the light, is adjusted or the angle of an outermost beam in the spot light emitted from LD in a section direction of the light (LD_vo_ang [°]), which is a circle map control factor for specifying a radius of the spot light in the section direction of the light, is adjusted.

Similarly, the outer radius of the spot light emitted from LD in a horizontal direction of the light (LD_hor [mm]), which is a circle map control factor for specifying a radius of the spot light in the horizontal direction of the light, is adjusted or the angle of an outermost beam in the spot light emitted from LD in a horizontal direction of the light (LD_ho_ang [°]), which is a circle map control factor for specifying a radius of the spot light in the horizontal direction of the light, is adjusted.

Thus, when controlling each control factor, a control factor for assigning a circle map that satisfies following equations (37), (38), (39) and (40) is set to CTL04.

$$Hin\_Y^2 = Hin\_X^2 \quad (37)$$

$$R1\_min < Hin\_X < R1 \quad (38)$$

$$R1\_min < Hin\_Y < R1 \quad (39)$$

$$Hin\_Y = Hin\_X \quad (40)$$

Figure 16A:
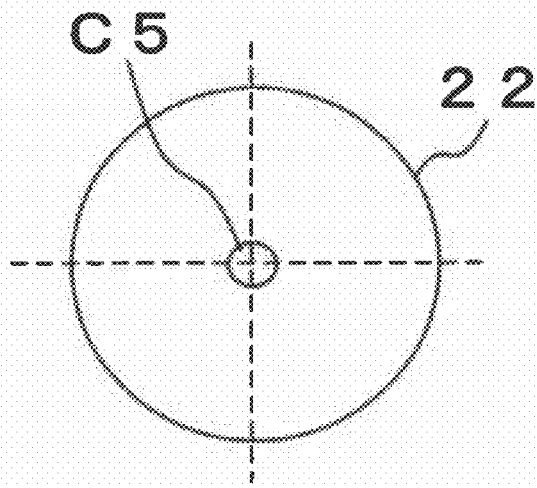
FIGS. 16A through 16C are diagrams each for showing an example of a circle map by incident light.
Figure 16B:
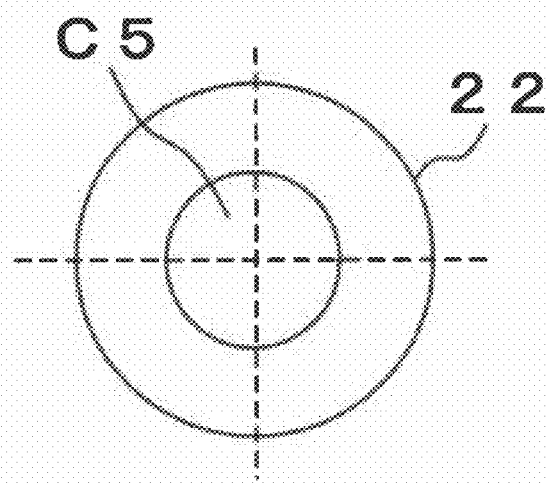
Figure 16C:
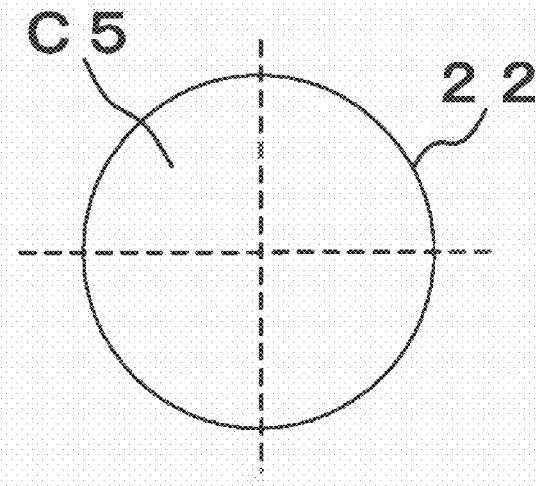

FIGS. 16A through 16C show an example of the circle map. When controlling the control factor CTL04 so as to satisfy the equations (37) through (40), the circle map alters from a state shown in FIG. 16A to a state shown in FIG. 16C through a state shown in FIG. 16B. Further, by controlling the control factor CTL04, the amount of the emitted light, p_n which satisfies following equation (41) is stored as TABLE08.

TABLE08

$$P\_cyc\_out = \int_{\substack{Hin\_y= \\ Hin\_x= \\ R1\_min}}^{+R1} \int_{n=0}^{\pm 180} p\_n \quad (41)$$

ST1 = cycle
ST2 = separate
ST3 = total where ST1=cycle indicate a state in which the circle map is circular.

[How to Adjust Properties in Dependence on Angles to Fixed One]

FIG. 17 shows an example of generated data tables. The above-mentioned tables TABLE02 to TABLE07 indicate properties in dependence on angles of the amount of the emitted light, p_n when point light sources irradiate light to any of the diffuse reflection members 22 of the optical waveguide 2A.

On the other hand, the above-mentioned tables TABLE02' to TABLE07' are corrected output level tables in which output levels obtained by a set of a plurality of circle maps are corrected to an output level of a real single circle map. The table TABLE08 is an output level table of the real single circle map which is obtained by approximating the set of a plurality of circle maps when spreading one light source.

A combination of circle maps such that the amount of the emitted light, p_n satisfies following equation (42) is calculated from these tables.

$$\sum_{n=0}^{\pm 180} fp\_n(n) = CONSTANT = P\_cyc\_out\ MAXIMUM \quad (42)$$

Thus, the properties in dependence on angles can be adjusted to the fixed one over the circumference of the optical waveguide 2A. Further, from the combination of the circle maps calculated by the above-mentioned equation (42), a shape and coordinates of a pattern of the light that is really incident to the diffuse reflection members 22 are acquired and the shape and the coordinates of the pattern of the light thus acquired are stored as a table.

By storing this table on the recording medium 70, an optical selector which contains an optical waveguide including diffuse reflection members and functional boards each having an light-emitting unit and a light-receiving unit and mounts the functional boards on a circumference of the optical waveguide can emit the light with the shape and at the coordinates of the pattern of the light based on the table stored in the recording medium 70. This enables the light to be emitted from the circumference of the optical waveguide at desired levels and enables the functional boards to be optionally positioned.

In the optical selector, the functional board may be provide with an adjustable surface lens or an optical system that generates a map at the pattern and the coordinates of the light which realizes the combination of the circle maps calculated by the equation (42).

FIG. 18 shows an array of coordinates of the circle maps that are formed on the diffuse reflection members in the optical waveguide. FIG. 19 shows properties in dependence on angles of an amount of emitted light. In the tables, here, a negative region has mirror symmetry of a positive region so that a calculation of the negative region can be omitted if the negative region is regarded as a map of the positive region on the occasion of the calculation.

The number of all the combinations from a set of coordinates Array of the circle maps as shown in FIG. 18 is choose function of $_{2n}C_{(2n-1)}$. A combination in which a sum total amount of received light of the light-receiving unit 4 becomes a constant at each angle when each circle map is switched on (irradiated state) or off (not irradiated state) is calculated by the least squares method using Pearson's correlation coefficient.

Alternatively, output values in dependence on angles as shown in FIG. 19 are ordered in descending order and a combination in which an order of influence by received light in the light-receiving unit 4 becomes a constant at each angle when each circle map is switched on (irradiated state) or off (not irradiated state) is calculated by the least squares method using Kendall's correlation coefficient or Spearman's correlation coefficient in regard to all the combinations $_{2n}C_{(2n-1)}$ from a set of coordinates Array of the circle maps as shown in FIG. 18.

According to these methods, from a result of scanning along the circumference of the optical waveguide 2A by the light-receiving unit 4, it is possible to set a pattern of the light that is equally irradiated to the circumference thereof.

[Variations of Control Factors for Allowing the Light Emitted from LD to be Incident to Diffuse Reflection Members of Optical Waveguide]

FIGS. 20A and 20B show a condition when light is incident to the diffuse reflection members 22 of the optical waveguide 2A. FIG. 20A shows the optical waveguide 2A seen in a section direction thereof. FIG. 20B shows the optical waveguide 2A seen in a plane direction thereof. The following will describe a condition that may be necessary when the light emitted from light-emitting unit 3 is incident to the diffuse reflection members 22 of Optical Waveguide 2A.

It is assumption (assumption 12) that the first optical waveguide portion 20A of the optical waveguide 2A is air layer and the second optical waveguide portion 20B thereof is material such as plastic material that is transparent at a predetermined wavelength region, which is other than the air layer.

When the second optical waveguide portion 20B thereof is material which is other than the air layer, in the optical waveguide 2A, refraction occurs at an outer circumference of the second optical waveguide portion 20B, which is the boundary between the second optical waveguide portion 20B and the air, and an inner circumference of the second optical waveguide portion 20B, which is the boundary between the second optical waveguide portion 20B and the first optical waveguide portion 20A that is the air layer.

Here, a refractive index Nair of air is 1.000292 (Nair=1.000292). A refractive index Na of the first optical waveguide portion 20A is Nair (Na=Nair) because the first optical waveguide portion 20A that is the air layer. On the other hand, a refractive index of the second optical waveguide portion 20B is set to Nb.

According to the optical waveguide 2A, in a configuration concerning the material other than the air layer in which the second optical waveguide portion 20B has the refractive index Nb, the following control factors relating to the light-emitting unit 3 and the optical waveguide 2A are set.

Air to the second optical waveguide portion 20B (outer circumference):

[Section Direction]

An angle of the light emitted from LD in a section direction of the light (LD_vag [°]);

A vertical position of LD (LD_vst [mm]);

A distance between LD and optical waveguide material (LD_dst [mm]);

[Horizontal Direction]

An angle of the light emitted from LD in a horizontal direction of the light (LD_hag [°]); and A horizontal position of LD (LD_hst [mm]).

Within the second optical waveguide portion 20B:

[Section Direction]

An angle of the light emitted from LD in a section direction of the light (LD_vag' [°]);

A vertical position of LD (LD_vst' [mm]); and

A distance between LD and optical waveguide material (LD_dst' [mm]);

[Horizontal Direction]

An angle of the light emitted from LD in a horizontal direction of the light (LD_hag' [°]); and A horizontal position of LD (LD_hst' [mm]).

The second optical waveguide portion 20B to the first optical waveguide portion 20A (diffuse reflection members):

[Section Direction]

An angle of the light emitted from LD in a section direction of the light (LD_vag" [°]);

A vertical position of LD (LD_vst" [mm]);

A distance between LD and optical waveguide material (LD_dst" [mm]);

[Horizontal Direction]

An angle of the light emitted from LD in a horizontal direction of the light (LD_hag" [°]); and A horizontal position of LD (LD_hst" [mm]).

Refraction angle relations in section direction:
Nair*sin(LD_vag)=Nb*sin(LD_vag')=Nair*sin(LD_vag")

Refraction angle relations in horizontal direction:
Nair*sin(LD_hag)=Nb*sin(LD_hag')=Nair*sin(LD_hag")

A radius of each of the diffuse reflection members 22 in the optical waveguide 2A is set to R1, a radius of the optical waveguide 2A is set to R2 and a thickness of the optical waveguide 2A is set to d.

An optional position (x, y, z) of an outer point of the optical waveguide 2A is indicated according to the above-mentioned equation (1) and an incident angle of the light emitted from the light-emitting unit (LD light source) 3 with respect to the outer circumference of the optical waveguide 2A is indicated according to the above-mentioned equation (2).

An incident position Vin0 of the light emitted from the LD light source and projected to a plane V0-V0' indicating an outer circumference surface of the optical waveguide 2A in the section direction of the light is an intersection of a line L00 passing through the outer point, (x, y, z)=(R2+LD_dst, LD_hst, LD_vst), of the optical waveguide 2A and having an angle, (∠XY, ∠XZ)=(LD_hag, LD_vag), and a curved surface satisfying conditions of following equations (43), (44) and (45).

$$y^2+x^2=R2^2 \qquad (43)$$

$$x>0 \qquad (44)$$

$$-d/2<z<d/2 \qquad (45)$$

An incident position Vin1 of the light emitted from the LD light source and projected to a plane V1-V1' indicating an outer circumference surface of the first optical waveguide portion 20A in the section direction of the light is an intersection of a line L00 passing through the intersection (x', y', z') of the line L00 and the second optical waveguide portion 20B and having an angle, (∠XY, ∠XZ)=(LD_hag', LD_vag'), and a curved surface satisfying conditions of following equations (46), (47) and (48).

$$y^2+x^2=R1^2 \qquad (46)$$

$$x>0 \qquad (47)$$

$$-d/2<z<d/2 \qquad (48)$$

An incident position Hin of the light emitted from the LD light source and projected to a plane H-H' indicating an inner circumference surface of any one of the diffuse reflection members 22 in the horizontal direction of the light is an intersection of the line L00 and a surface satisfying conditions of the following equations (49), (50) and (51).

$$y^2+x^2=R1^2 \qquad (49)$$

$$z=-d/2(LD\_vag">0) \qquad (50)$$

$$z=d/2(LD\_vag"<0) \qquad (51)$$

Light, the incident position Vin0 of which is an intersection of the line L00 and the curved surface satisfying conditions of the above-mentioned equations (43), (44) and (45) and the incident position Vin1 of which is an intersection of the line L00 and the curved surface satisfying conditions of the above-mentioned equations (46), (47) and (48) can be incident to the diffuse reflection members 22 through the outer circumference of the optical waveguide 2A. Light, the incident position Hin of which is an intersection of the line L00 and the plane satisfying conditions of the above-mentioned equations (49), (50) and (51), can be incident to any of the diffuse reflection members 22 in the optical waveguide 2A.

Thus, controlling the coordinate control factors so that they satisfy the conditions of the above-mentioned equations (43) through (51) allows the light emitted from the light-emitting unit 3 to be made incident to any of the diffuse reflection members 22 through the circumference of the optical waveguide 2A even if the second optical waveguide portion 20B is constituted of material other than the air layer in the optical waveguide 2A.

If the number of times in which the light that is incident to the optical waveguide 2A is reflected on the reflecting members 21 is set to Ref_no, the above-mentioned equations (50) and (51) satisfy constraint conditions of the following equations (52) and (53).

$$z=-d/2(Ref\_no=2n,LD\_vag"<0) \qquad (52)$$

$$z=d/2(Ref\_no=2n+1,LD\_vag">0) \qquad (53)$$

Satisfying either the condition of the above-mentioned equation (52) or (53) allows which of the opposed diffuse reflection members 22 to which the light propagated into the optical waveguide 2A is incident to be determined even if the second optical waveguide portion 20B is constituted of material other than the air layer in the optical waveguide 2A. This also allows which of the opposed reflection members 21 by which the light to be emitted from the optical waveguide 2A is reflected to be determined. This further allows selection of angular directivity of the light-receiving unit 4 to be obtained.

[How to Allow Property in Dependence on Angles to be Selected]

A combination of circle maps such that the amount of the emitted light, p_n satisfies following equations (54) and (55) is calculated from these tables shown in FIG. 17.

$$\sum_{n=0}^{\pm 180} fp\_n(n) = \text{CONSTANT} = P\_cyc\_out \text{ MAXIMUM} \qquad (54)$$

$$\text{Step} = PD\_cnt/360$$

$$\sum_{n=0}^{\pm 180} fp\_n(n) = P\_cyc\_out \text{ MINIMUM} \qquad (55)$$

$$\text{Step} \neq PD\_cnt/360$$

Thus, the properties in dependence on angles can be selected over the circumference of the optical waveguide 2A. Further, from the combination of the circle maps calculated by the above-mentioned equations (54) and (55), a shape and coordinates of a pattern of the light that is really incident to the diffuse reflection members 22 are acquired and the shape and the coordinates of the pattern of the light thus acquired are stored as a table.

By storing this table on the recording medium 70, an optical selector which contains an optical waveguide including diffuse reflection members and functional boards each having an light-emitting unit and a light-receiving unit and mounts the functional boards on a circumference of the optical waveguide can emit the light with the shape and the coordinates of the pattern of the light based on the table stored in the recording medium 70. This enables the optical waveguide to have desired directivities and enables the functional boards to be positioned based on the directivities.

In the optical selector, the functional board may be provide with an adjustable surface lens or an optical system that generates a map at the pattern and the coordinates of the light which realizes the combination of the circle maps calculated by the equations (54) and (55).

[How to Obtain Uniformity and Selectivity on Circumference of Optical Waveguide by Means of a Density of Light Beam]

Based on the above-mentioned tables TABLE02' through TABLE07', a variation of a density of light beam that irradiates respective circle maps is reconstructed using an adjustable surface lens so that uniformity and selectivity of the amount of emitted light on the circumference of the optical waveguide 2A can be selected.

Based on the above-mentioned tables TABLE02' through TABLE07', a variation of a density of light beam that irradiates respective circle maps is reconstructed using a plurality of light-emitting units 3 so that uniformity and selectivity of the amount of emitted light on the circumference of the optical waveguide 2A can be selected.

Figure 21A:
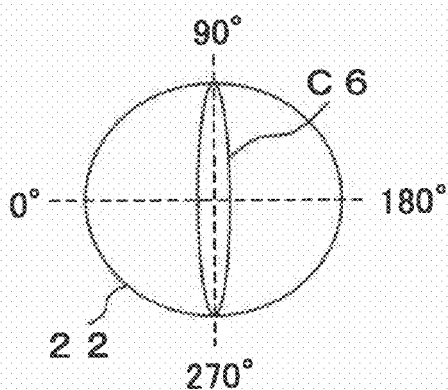
FIGS. 21A through 21F are diagrams each for specifically showing a pattern of incident light to the diffuse reflection member.

FIGS. 21A through 27 show specific examples of patterns of the light that is incident to the diffuse reflection members. As shown in the above-mentioned FIG. 12, the amount of the emitted light at the angles of the vicinities of 90 degrees and 270 degrees on the circumference of the optical waveguide 2A is less than the remains so that by changing the circle maps (pattern) C6 formed when the light is incident to the diffuse reflection members 22 to 90-270 ellipse map as shown in FIG. 21A, it is possible to make the directivity on the circumference of the optical waveguide 2A more closely resemble to uniformity thereof.

Figure 21B:
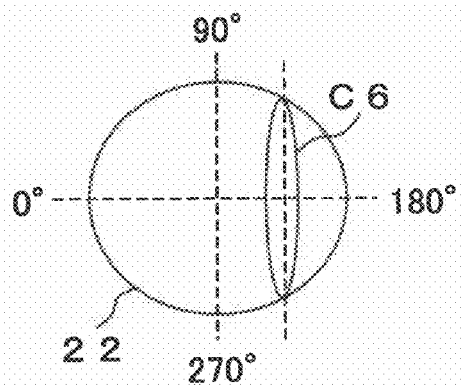
Figure 21C:
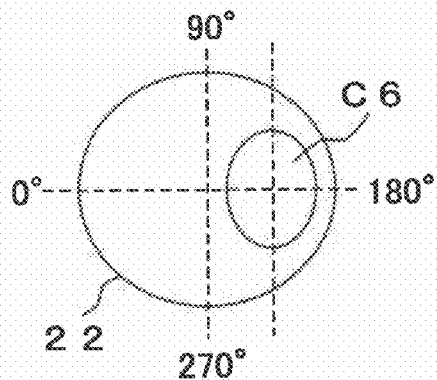
Figure 21D:
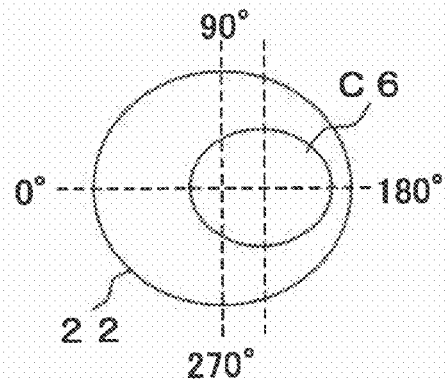
Figure 21E:
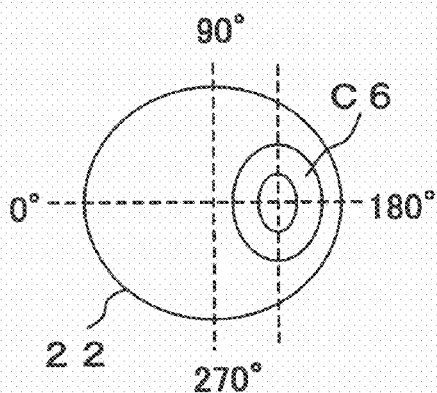
Figure 21F:
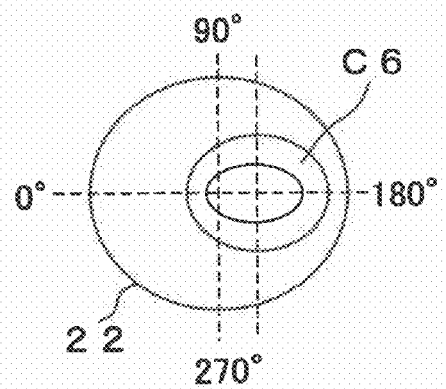
Figure 24A:
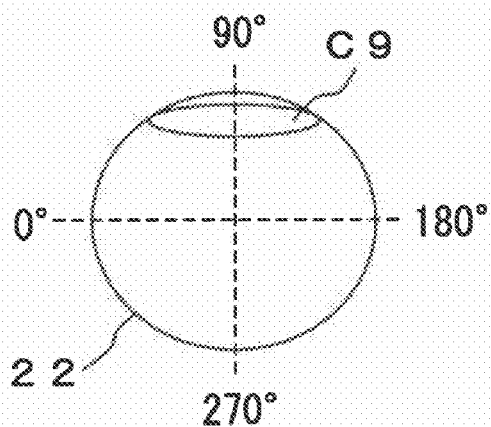
FIGS. 24A through 24D are diagrams each for specifically showing a pattern of incident light to the diffuse reflection member.
Figure 24B:
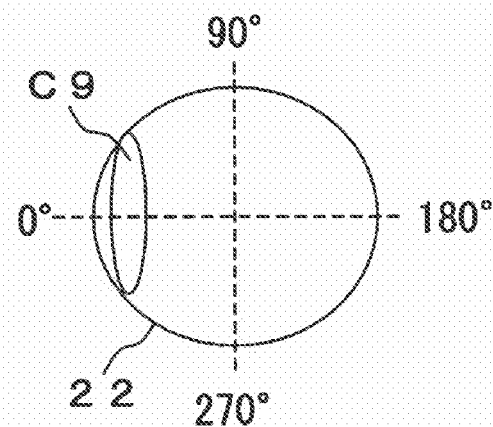
Figure 24C:
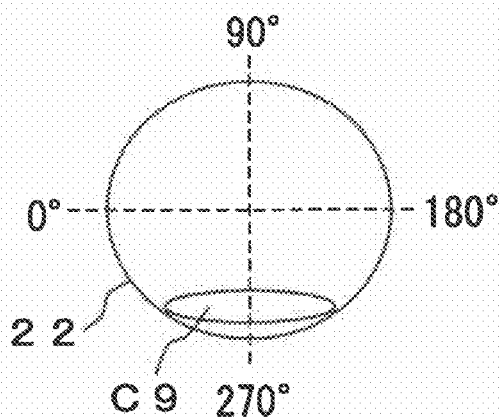
Figure 24D:
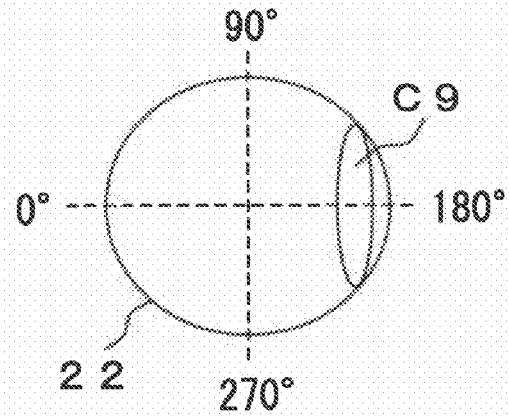
Figure 25A:
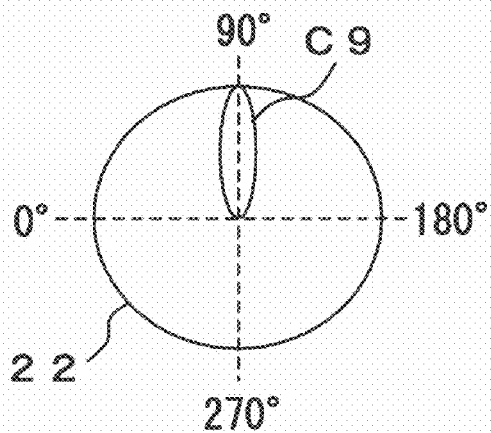
FIGS. 25A through 25D are diagrams each for specifically showing a pattern of incident light to the diffuse reflection member.
Figure 25B:
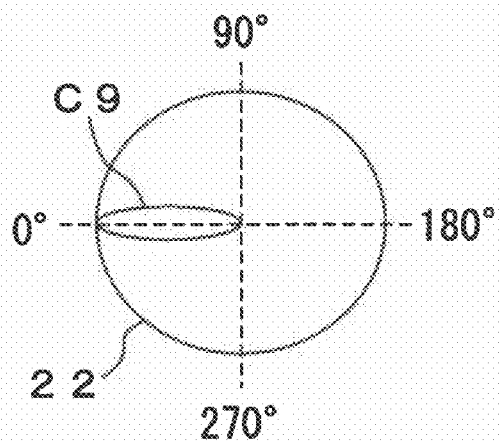
Figure 25C:
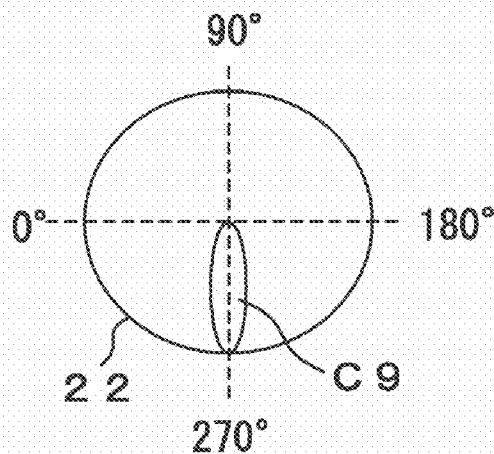
Figure 25D:
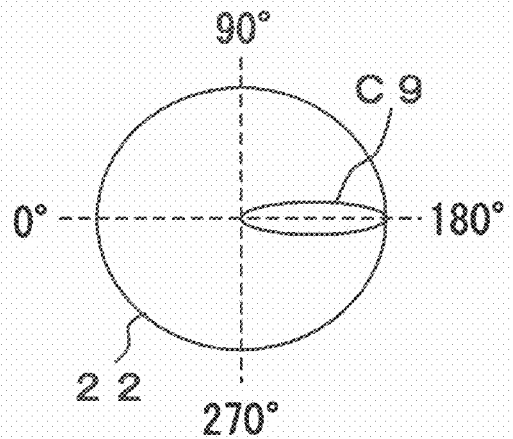

The amount of the emitted light at the angles of the vicinity of zero degrees is less than that of the emitted light at the angle of the vicinity of 180 degrees so that it is possible to form the circle maps (pattern) C6 as 90-270 ellipse map at a side of the angle of 180 degrees as shown in FIG. 21B. Similarly, it is possible to form the circle maps (pattern) C6 as desired ellipse map at a side of the angle of 180 degrees as shown in FIG. 21C or 21D. It also is possible to form the circle maps (pattern) C6 as ring shaped ellipse map at a side of the angle of 180 degrees as shown in FIG. 21E or 21F.

As shown in FIGS. 22A through 22E, it is possible to select the directivity between the angle of zero degrees and 180 degrees through 90 degrees or between the angle of zero degrees and 180 degrees through 270 degrees by forming the circle maps (pattern) C7 formed when the light is incident to the diffuse reflection members 22 as a circle map and changing the coordinates thereof.

Similarly, as shown in FIGS. 23A and 23B, it is possible to select the directivity in the direction of the angles of zero degrees and 180 degrees or the direction of the angles of 90 degrees and 270 degrees by forming the circle maps (pattern) C8 formed when the light is incident to the diffuse reflection members 22 as 0-180 ellipse map or 90-270 ellipse map.

Further, as shown in FIGS. 24A through 24D and FIGS. 25A through 25D, it is possible to select the directivity between the angle of zero degrees and 180 degrees through 90 degrees or between the angle of zero degrees and 180 degrees through 270 degrees by forming the circle maps (pattern) C9 formed when the light is incident to the diffuse reflection members 22 as 0-180 ellipse map or 90-270 ellipse map and deviating the coordinates thereof between the angle of zero degrees and 180 degrees through 90 degrees or between the angle of zero degrees and 180 degrees through 270 degrees.

Figure 26A:
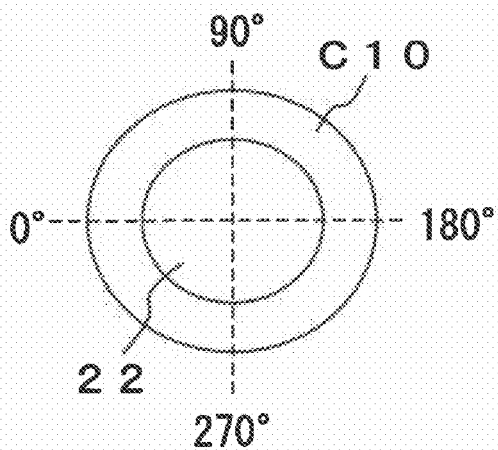
FIGS. 26A and 26B are diagrams each for specifically showing a pattern of incident light to the diffuse reflection member.
Figure 26B:
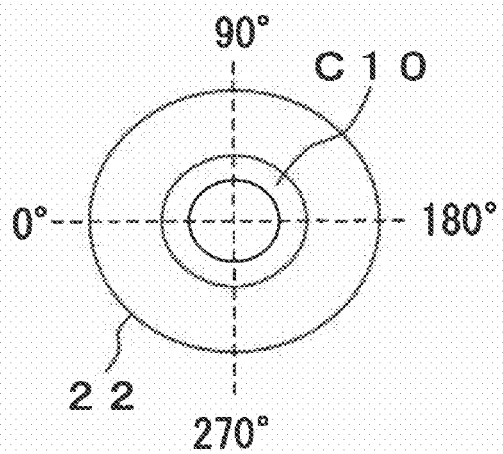
Figure 27:
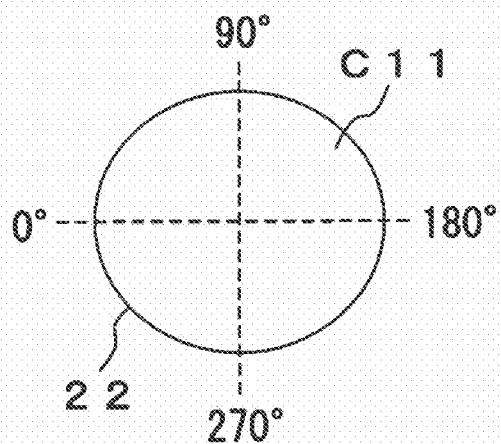
FIG. 27 is a diagram that specifically shows a pattern of incident light to the diffuse reflection member.

Additionally, as shown in FIGS. 26A and 26B, it is possible to select the directivity by forming the circle maps (pattern) C10 formed when the light is incident to the diffuse reflection members 22 as ring shaped circle map. As shown in FIG. 27, it is possible to select the directivity by forming the circle maps (pattern) C11 formed when the light is incident to the diffuse reflection members 22 as a circle map having a shape such that it is irradiated to whole surface of any of the diffuse reflection members 22.

[Other Methods of Obtain Uniformity and Selectivity on Circumference of Optical Waveguide]

The shape and the coordinates of the pattern of the light that is really incident to any of the diffuse reflection members are obtained using the above-mentioned various kinds of calculation methods, distribution of properties in dependence on angles of the amount of emitted light when irradiating the light through a simple lens that is capable of obtaining such a pattern is calculated by the light-receiving unit, and properties of level distribution of the amount of emitted light are calculated on the circumference of the optical waveguide 2A. This enables uniformity and selectivity of the level of the amount of emitted light on the circumference of the optical waveguide 2A.

Although the light has been incident to any of the diffuse reflection members 22 that are faced to each other at top and bottom of the optical waveguide 2A and the diffuse reflection members 22 have performed diffuse reflection on the light in the above examples, at least two pieces of the separate light-emitting units may form circle maps on the respective diffuse reflection members 22 that are faced to each other.

Further, by controlling an angle of the light emitted from LD in a section direction of the light (LD_vag [°]), which specifies coordinates of the spot light in the section direction of the light, the light is irradiated to any of the diffuse reflection members 22 at first diffuse reflection and then, the diffuse-reflected light may form a circle map on the other diffuse reflection member 22.

In the above description, the control factors in the light-emitting unit have been adjusted. On the other hand, following control factors in the light-receiving unit are set.

[Section Direction]

A vertical position of PD (PD_vst [mm]); and

A distance between PD and optical waveguide material (PD_dst [mm]).

[Horizontal Direction]

A horizontal position of PD (PD_hst [mm]).

By controlling such control factors, a plurality of the light-receiving units can obtain selectivities.

[Method of Calculating Directivity of the Diffuse Reflection Members]

The following will describe a method of obtaining, by calculation, distribution of the amount of the emitted light from the optical waveguide emitting the light to the circumference thereof by performing the diffuse reflection on the incident light.

Figure 28A:
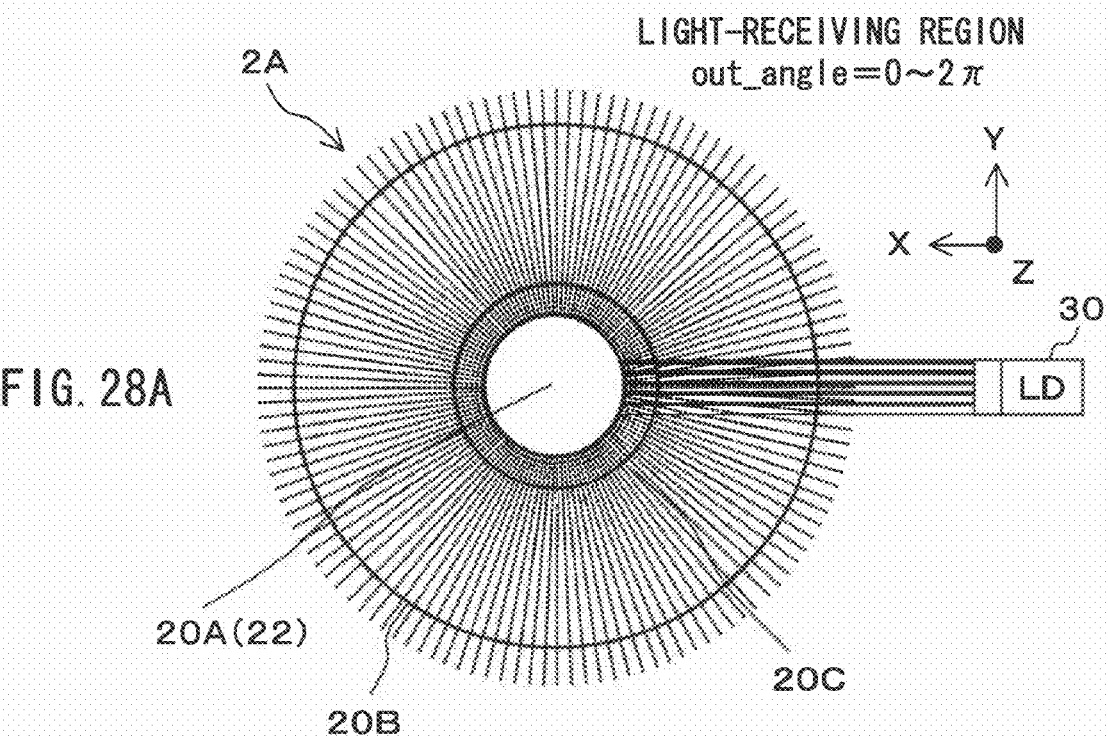
FIGS. 28A and 28B are diagrams each for showing an outline of the optical waveguide when calculating distribution of the amount of the emitted light.
Figure 28B:
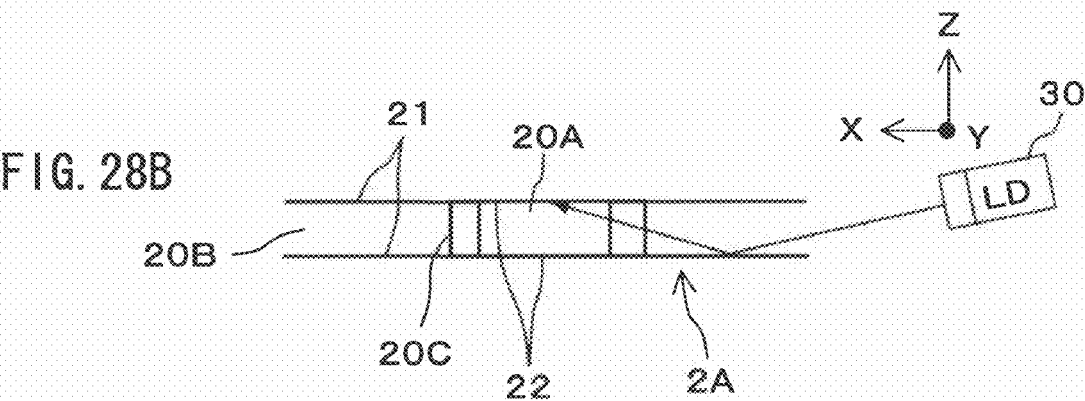

FIGS. 28A and 28B show an outline of the optical waveguide when calculating the distribution of the amount of the emitted light. In the calculation of the distribution of the amount of the emitted light in the optical waveguide 2A, the light that is incident to the diffuse reflection members 22 from the light-emitting unit 3 is divided and the divided pieces of light are addressed. Optical path of the light on each address is calculated and a position, a direction (vector) and a level of the light that is emitted from the circumference of the second optical waveguide portion 20B to the outside is obtained at a light-receiving region that is obtained by dividing the optical waveguide 2A into n partitions on the circumference thereof. A position, a direction (vector) and a level of the light that is not emitted from the second optical waveguide portion 20B to the outside is also obtained.

In the optical waveguide 2A, the first optical waveguide portion 20A has the diffuse reflection members 22 that are opposed to each other at top and bottom thereof and the second optical waveguide portion 20B has the reflection members 21 that are opposed to each other at top and bottom thereof. A side spreading structure 20C is further provided between the first and second optical waveguide portions 20A and 20B.

When, thus, a plurality of materials is present in the optical path, calculations of the optical paths based on reflection or diffuse reflection are performed for every boundary between the materials.

Figure 29:
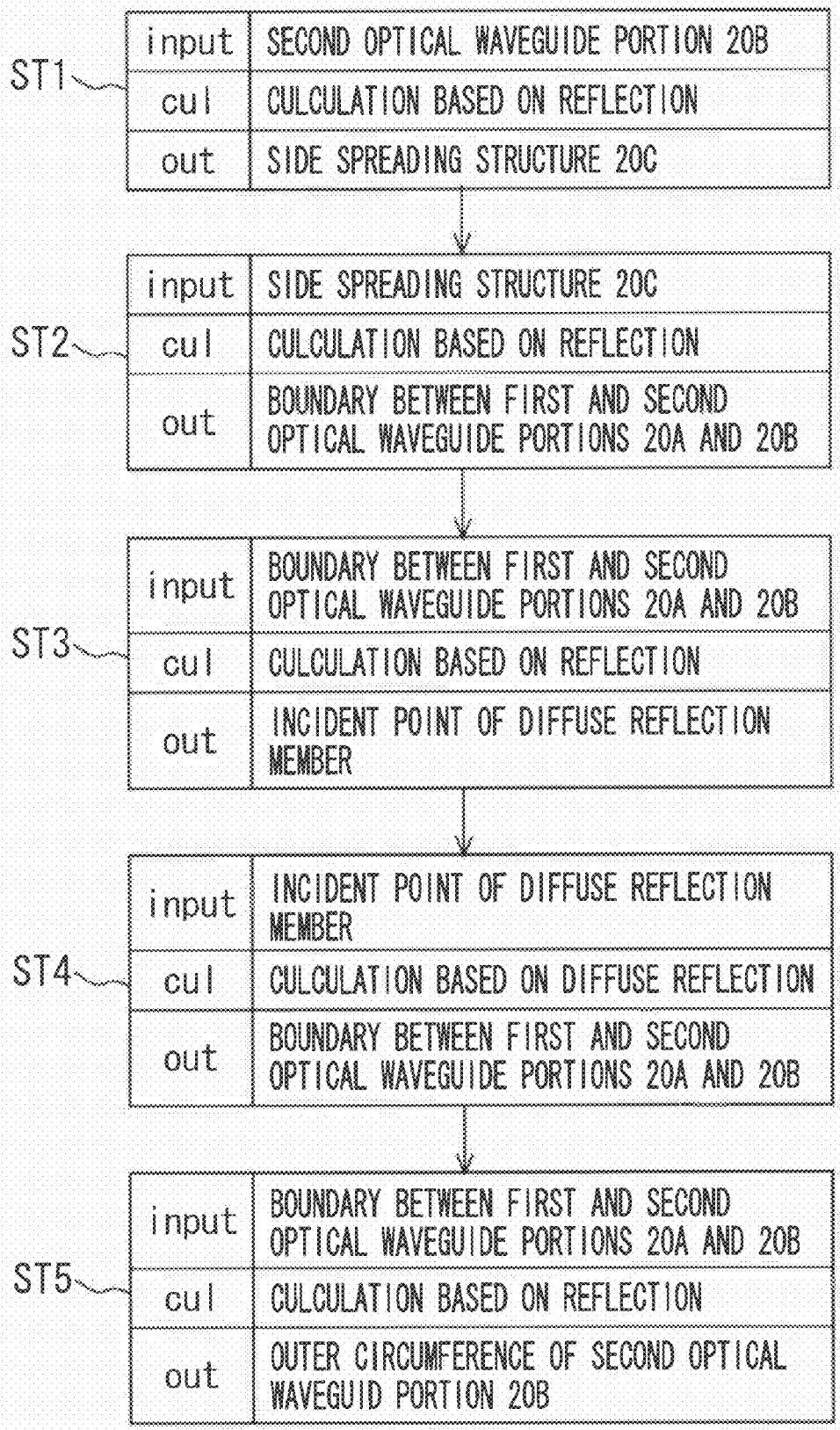
FIG. 29 is a flowchart showing a whole flow of a calculation of optical paths.

FIG. 29 shows a whole flow of the calculation of the optical paths. First, at a step ST1, in a state in which the light at the circumference of the second optical waveguide portion 20B is set as input and the light at the side spreading structure 20C is set as output, the calculation of the optical path based on reflection is performed. A result of the calculation is transferred to a step ST2.

Next, at the step ST2, in a state in which the light at the side spreading structure 20C is set as input and the light at the boundary between the first and second optical waveguide portions 20A and 20B is set as output, the calculation of the optical path based on reflection is performed. A result of the calculation is transferred to a step ST3.

At the step ST3, in a state in which the light at the boundary between the first and second optical waveguide portions 20A and 20B is set as input and the light at an incident point of any of the diffuse reflection members 22 is set as output, the calculation of the optical path based on reflection is performed. A result of the calculation is transferred to a step ST4.

At the step ST4, in a state in which the incident point of any of the diffuse reflection members 22 is set as input and the light at the boundary between the first and second optical waveguide portions 20A and 20B is set as output, the calculation of the optical path based on diffuse reflection is performed. A result of the calculation is transferred to a step ST5.

At the step ST5, in a state in which the light at the boundary between the first and second optical waveguide portions 20A and 20B is set as input and the light at the outer circumference of the second optical waveguide portion 20B is set as output, the calculation of the optical path based on reflection is performed.

Figure 30A:
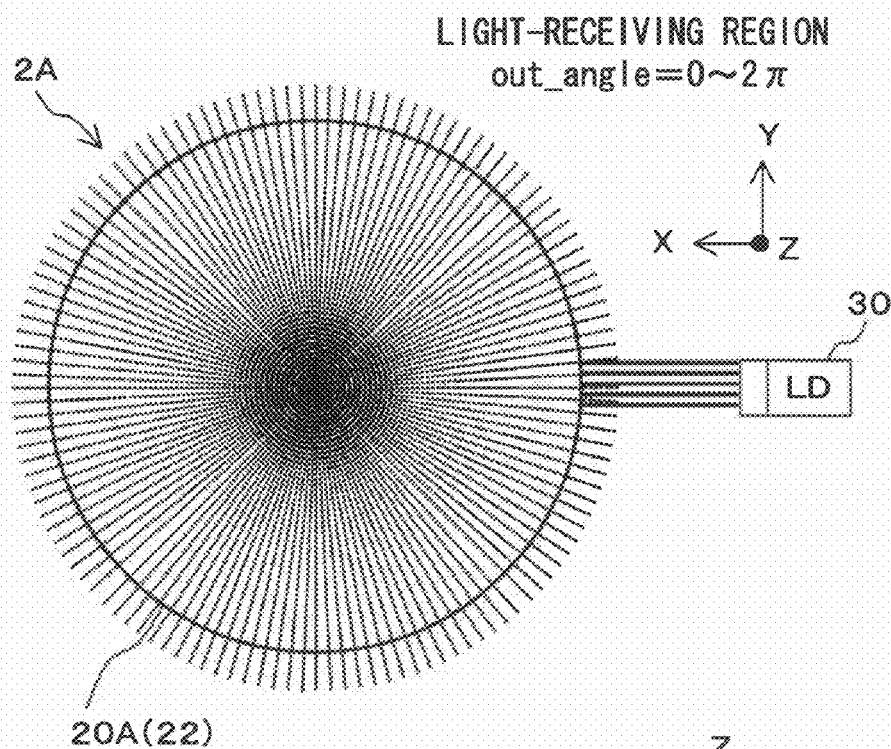
FIGS. 30A and 30B are diagrams each for showing an outline of the diffuse reflection members used when calculating distribution of the amount of the emitted light.
Figure 30B:
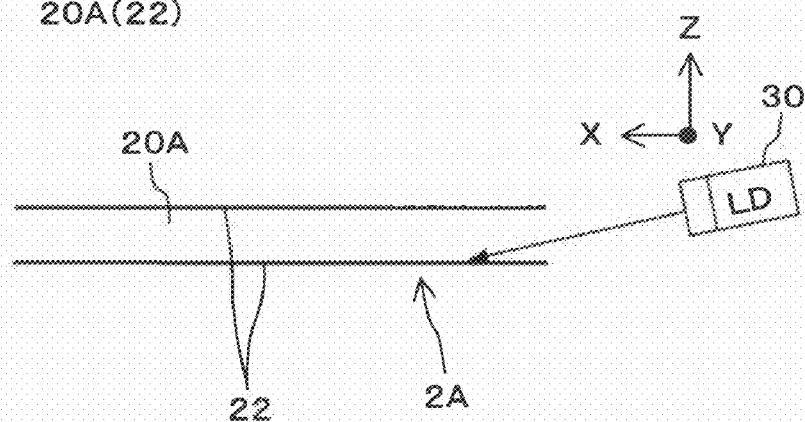
Figure 31:
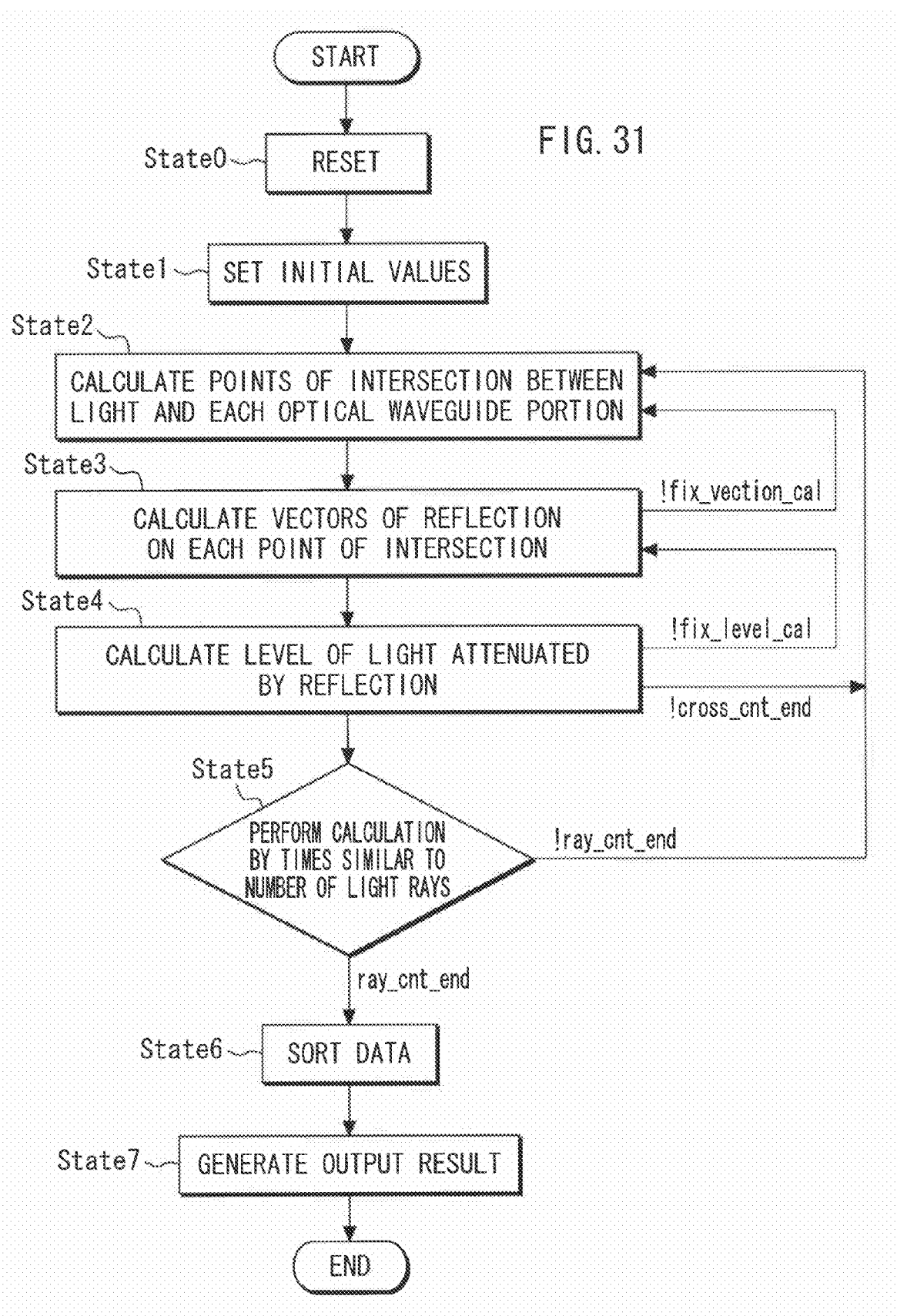
FIG. 31 is a flowchart showing an example of a calculation method of the optical paths by diffuse reflection.

FIGS. 30A and 30B show an outline of the diffuse reflection members used when calculating the distribution of the amount of the emitted light. FIG. 31 shows an example of the method of calculating the optical paths by the reflection and the diffuse reflection. First, the following will describe a whole flow of the method of calculating the optical paths by the reflection and the diffuse reflection.

At State 0: any initial values that have been set are reset;

At State 1: initial values relating to properties of the light source (laser diode 30), properties of the optical waveguide 2A and the like are set;

At State 2: points of intersection between the light that is incident to the optical waveguide 2A and each of the first and second optical waveguide portions 20A and 20B are calculated;

At State 3: vectors of the reflection (diffuse reflection) are calculated;

At State 4: an amount of the attenuation of the light based on the diffuse reflection calculated at the state 3 is calculated;

At State 5: the calculations from the state 2 to the state 4 are repeated by times similar to the number of light beams;

At State 6: an array of data obtained by the calculations from the state 2 to the state 5 is sorted; and At State 7: an output result is generated.

Figures 32, 33:
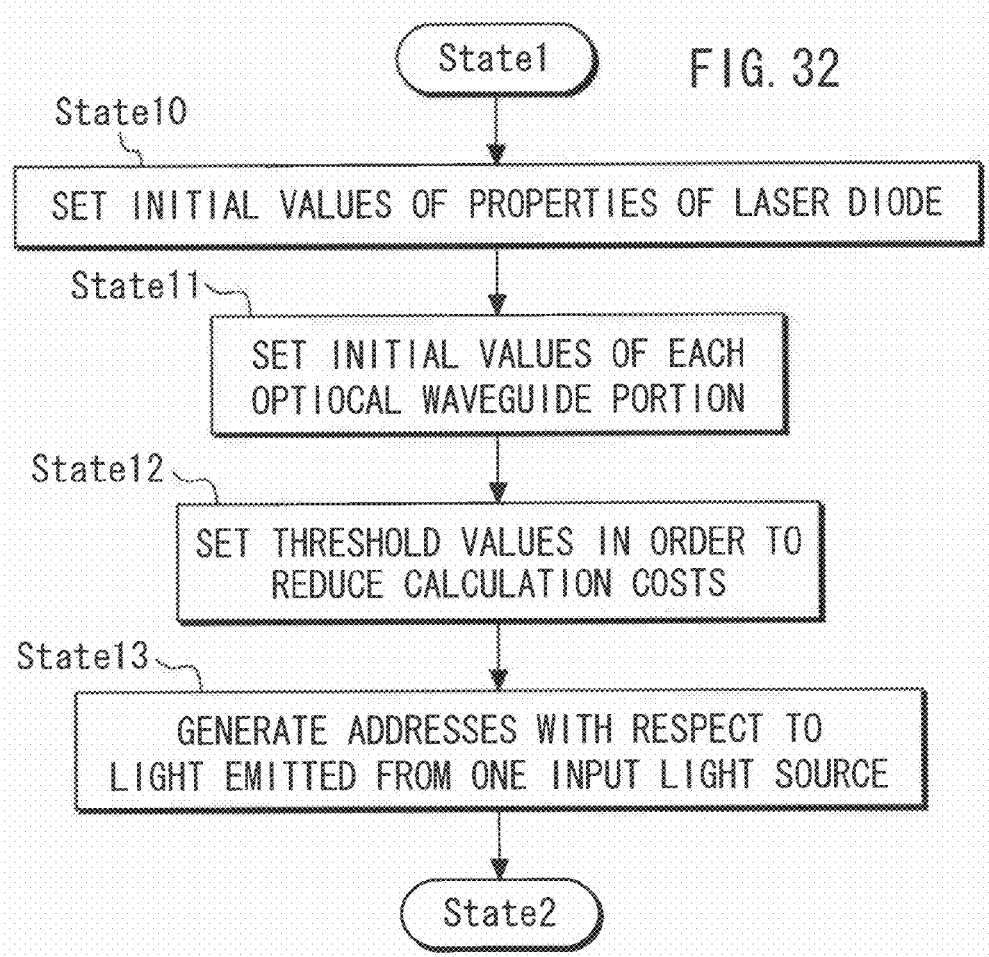
FIG. 32 is a flowchart showing an example of setting process of initial values.
FIG. 33 is a table showing an example of set values relating to various kinds of properties of a laser diode.

FIG. 32 shows an example of a setting process of initial values of the State 1 shown in FIG. 31, which will describe.

At State 10, the initial values of properties of the laser diode 30 are set. FIG. 33 shows an example of set initial values relating to various kinds of properties of the laser diode 30 to be set in the State 10.

At the State 10, for example, as shown in FIG. 33, number of divided input light source, ld_no, laser power, ld_power, a spectrum of light source, sp_type, and a wavelength of the light source, sp_no are set. It is to be noted that numerical values set in FIG. 10 are illustrated as examples.

Regarding the numbers of divided input light source, ld_no, the numbers of the divided input light source for allocating addresses to the light emitted from the laser diode 30 are set and the divided numbers of the input light source are determined based on an accuracy of the calculation result. Regarding the laser power, ld_power, power of the laser diode 30 is set.

Regarding the spectrum of light source, sp_type, a spectral line of the light source to be used in the laser diode 30 is set. Regarding the wavelength of the light source, sp_no, the wavelength of the light source to be used in the laser diode 30 is set.

FIG. 34 shows an example of the wavelengths of the light source to be used in the laser diode 30. The table 001 shown in FIG. 34 is a lookup table (LUT) in which species of the light sources, spectral lines, symbols indicating species of the spectral lines, and wavelengths are arrayed. The wavelength of the light source, sp_no, is set based on the spectrum of light source, sp_type, with referring to the table 001 shown in FIG. 34.

At State 11 shown in FIG. 32, properties of each of the optical waveguide portions constituting the optical waveguide 2A are set. FIG. 35 shows an example of set initial values relating to the properties of the first optical waveguide portion 20A to be set in the State 11.

At the State 11, for example, as shown in FIG. 35, a diameter, mt_a_r, of the first optical waveguide portion 20A, a thickness, mt_a_t, of the first optical waveguide portion 20A, and coordinates, mt_a_p, of a center of the first optical waveguide portion 20A are set.

A name of the material, mt_a, constituting the first optical waveguide portion 20A, and a refractive index, mt_a_refraction, of the material constituting the first optical waveguide portion 20A are also set.

Further, a setting, Random_cul_st, on either the calculation of the diffuse reflection is performed with reference to the table or is performed using ray trace is set. It is to be noted that numerical values set in FIG. 35 are illustrated as examples. Such parameters set in the State 11 may be parameters that set an equation which is capable of expressing an outline of the first optical waveguide portion 20A. Parameters for setting a shape, a position of an origin and a material of the first optical waveguide portion 20A are set so that the parameter alters according to a shape of the first optical waveguide portion 20A.

When reflective material is coated in order to enhance reflectivity of the diffuse reflection member 22, a name of the reflective material and the reflectivity thereof are set. It is to be noted that regarding the second optical waveguide portion 20B, similar to the first optical waveguide portion 20A, parameters for setting a shape, a position of an origin and a material of the second optical waveguide portion 20B are also set. Further, in the configuration as shown in FIG. 2 in which the reflection members 21 are provided, a name of the reflective material and the reflectivity thereof are set. In the configuration as shown in FIG. 28 in which the side spreading structure 20C is provided, parameters for setting a shape, a position of an origin, reflectivity thereof and the like of the side spreading structure 20C are also set.

FIG. 36 shows an example of a table storing a relationship between optical waveguide materials and refractive indexes thereof. The table 002 shown in FIG. 36 is a lookup table (LUT) in which the refractive indexes of a predetermined material, for example, air in this embodiment, with respect to respective wavelengths of the light source are indicated. The refractive index, mt_a_refraction, of the material constituting the first optical waveguide portion 20A is set based on the name, mt_a, of the material constituting the first optical waveguide portion 20A with reference to the table 002 shown in FIG. 36.

Figures 37A, 37B, 38:
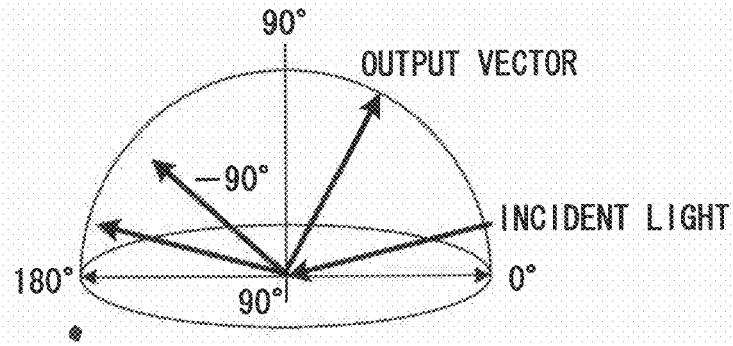
FIG. 37A is a diagram showing a concept of a look-up table of the diffuse reflection members and FIG. 37B is a diagram showing distribution of vectors of the output on a circumference of the diffuse reflection members with respect to incident angle and input wavelength.
FIG. 38 is a table showing an example of set values relating to threshold values that are set for reducing calculation costs.

FIGS. 37A and 37B relate to the table of the diffuse reflection members. The table of the diffuse reflection members (hereinafter, referred to as "diffuse reflection members LUT" is prepared according to any experimental procedure when a set of vectors of incident light is incident to a diffuse reflection surface that is more than a wavelength of the light. FIG. 37A shows a concept of a look-up table of the diffuse reflection members and FIG. 37B shows distribution of vectors of the output on the circumference of the diffuse reflection members with respect to incident angle and input wavelength. The diffuse reflection members LUT is prepared for obtaining a direction (vector) in which each light is emitted by the reflection when the light is incident with plural incident angles to (a surface of) any of the diffuse reflection members each having a surface shape. Concerning plural surface shapes, the vectors of the output on the circumference of the diffuse reflection members are obtained with respect to plural incident angles and plural input wavelengths. The diffuse reflection members LUT is prepared in two dimensions when any of the diffuse reflection members has one shape and it is prepared in three dimensions when any of the diffuse reflection members has plural shapes.

At State 12 shown in FIG. 32, threshold values for decreasing an amount of the calculation to reduce calculation costs are set. FIG. 38 shows an example of set values relating to the threshold values that are set at the State 12 for reducing the calculation costs.

At the State 12, for example, as shown in FIG. 38, an upper limit set value, ray_cnt_end, of the number of divided input light source, ld_no, maximum number, cross_cnt_end, of the reflection, a resolution, circle_cnt_end, at a light-arrival point on an outermost circumference of the first optical waveguide portion 20A and a setting, Fresnel_on, on whether or not Fresnel calculations for P- and S-waves should be carried out are set.

At State 13 shown in FIG. 32, the addresses are generated concerning the light emitted from one input light source. FIG. 39 shows an example of pieces of arrangement information of light rays emitted from the input light source. In the calculations at the steps ST1 through ST3 shown in FIG. 29, pieces of position information (x1, y1, z1) of the input light source, a unit vector (i, j, k) of the input light source, and a level (level) per one input light source are calculated, so that array information shown in FIG. 39 is prepared.

Figure 40A:
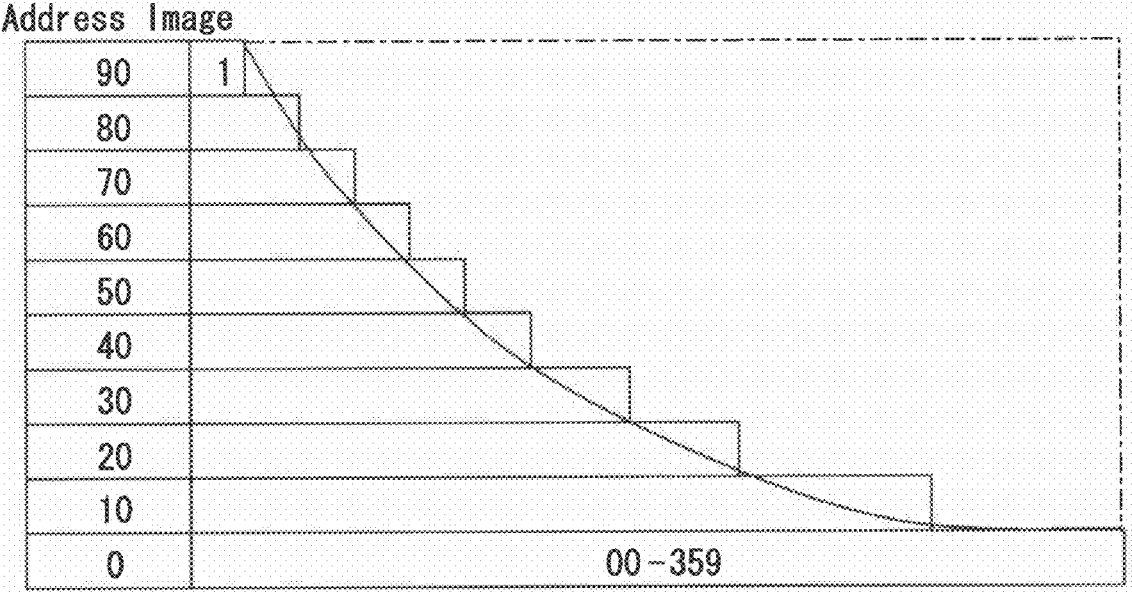
FIGS. 40A and 40B are diagrams each for showing an example of generated address.
Figure 40B:

FIGS. 40A and 40B show an example of generated addresses. FIG. 40A shows concept of the generated address. FIG. 40B shows concept of data for each address. If the light is incident to a surface with an incident angle of 90 degrees, the single address is generated when the light is perfectly reflected. On the other hand, if the light is incident to a surface with an incident angle of near zero degrees, the addresses of maximum 360 pieces are generated. In a case of the diffuse reflection, even if the light is incident to a surface with an incident angle of 90 degrees, a plurality of the outputs occurs so that they appear like a tree shown by a solid line in FIG. 40A.

FIG. 41 shows an example of a data structure. One input light source has an address concerning tree depth, incident angle and periphery depending on which output is emitted. In each case in which the light is incident to the diffuse reflection members 22 with incident angles of zero degrees through 90 degrees, the address contains, as data, pieces of position information (x1, y1, z1) of the input light source, a unit vector (i, j, k) of the input light source, and a level (level) per one input light source on the circumference of the first optical waveguide portion 20A.

With relation to data concerning a fact that one light beam is emitted by the diffuse reflection with any angles, the calculations are respectively carried out in a second layer.

It is to be noted that if the distribution of the amount of the emitted light form the laser diode 30 has a mirror symmetry with respect to the planes X, Y, and Z shown in FIG. 30, array information of the mirror portion is not prepared. If the distribution of vectors of the output as shown in FIG. 37B has any mirror symmetry, array information of the mirror portion is not prepared. A case where distribution of output by any of the diffuse reflection members has symmetry may contain a case where each of the diffuse reflection members that are opposed to each other has the same surface shape and the light having the same shape is incident to each of the diffuse reflection members.

Figure 42A:
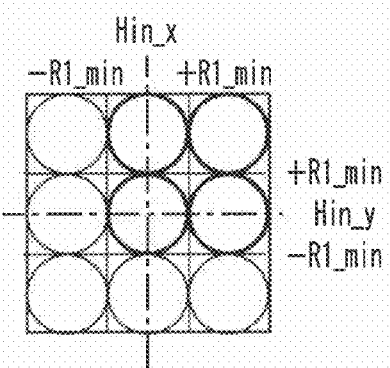
FIGS. 42A and 42B are diagrams each for showing an example of output distribution of the laser diodes, which has mirror symmetry.
Figure 42B:
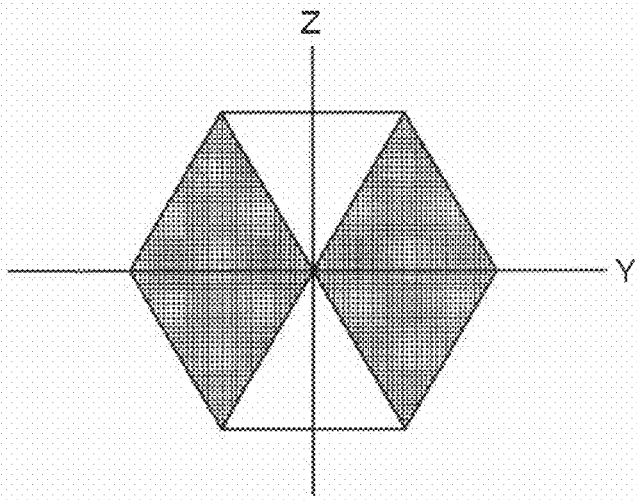
Figure 43A:
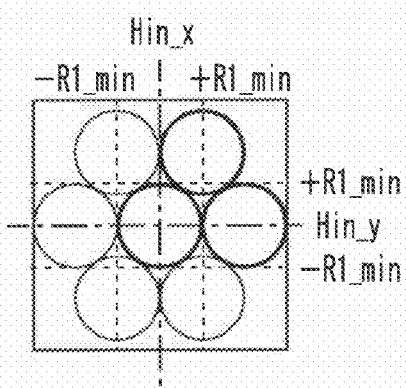
FIGS. 43A and 43B are diagrams showing an example of output distribution of the laser diode, which has rotation symmetry.
Figure 43B:
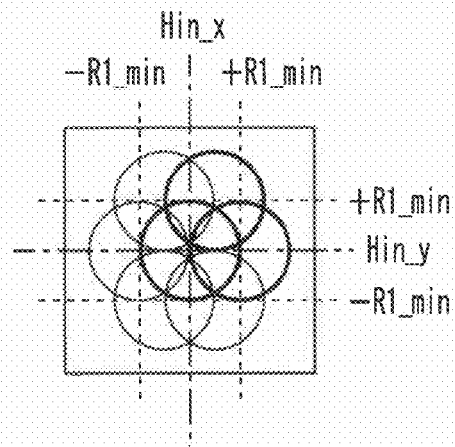

FIGS. 42A and 42B show an example of an output distribution of the laser diodes, which has the mirror symmetry and FIGS. 43A and 43B show an example of an output distribution of the laser diodes, which has rotation symmetry. When the output distribution of the laser diodes has the mirror symmetry as shown in FIGS. 42A and 42B and the laser diodes are provided on one plane that is symmetrical to X- and Y-planes or Y- and Z-planes, steps of calculations are decreased to 50% thereof. Further, when the light is spread or concentrated, shaded portions and solid-white portions are respectively equal to each other as shown in FIG. 18B so that when the laser diodes are provided on both planes that are symmetrical to X- and Y-planes or Y- and Z-planes, steps of calculations are decreased to 25% thereof.

On the other hand, when the output distribution of the laser diodes has the rotation symmetry as shown in FIGS. 43A and 43B and the laser diodes are provided on one axis that is symmetrical to X-axis, steps of the calculations can be decreased utilizing the symmetry. Further, when the output distribution of the laser diodes has the rotation symmetry as shown in FIG. 43B, the output of the laser diode becomes denser following a center thereof and becomes thinner following an outer thereof so that the output distribution of the laser diodes has asymmetry. If so, the steps of the calculations remain 100%.

Figure 44:
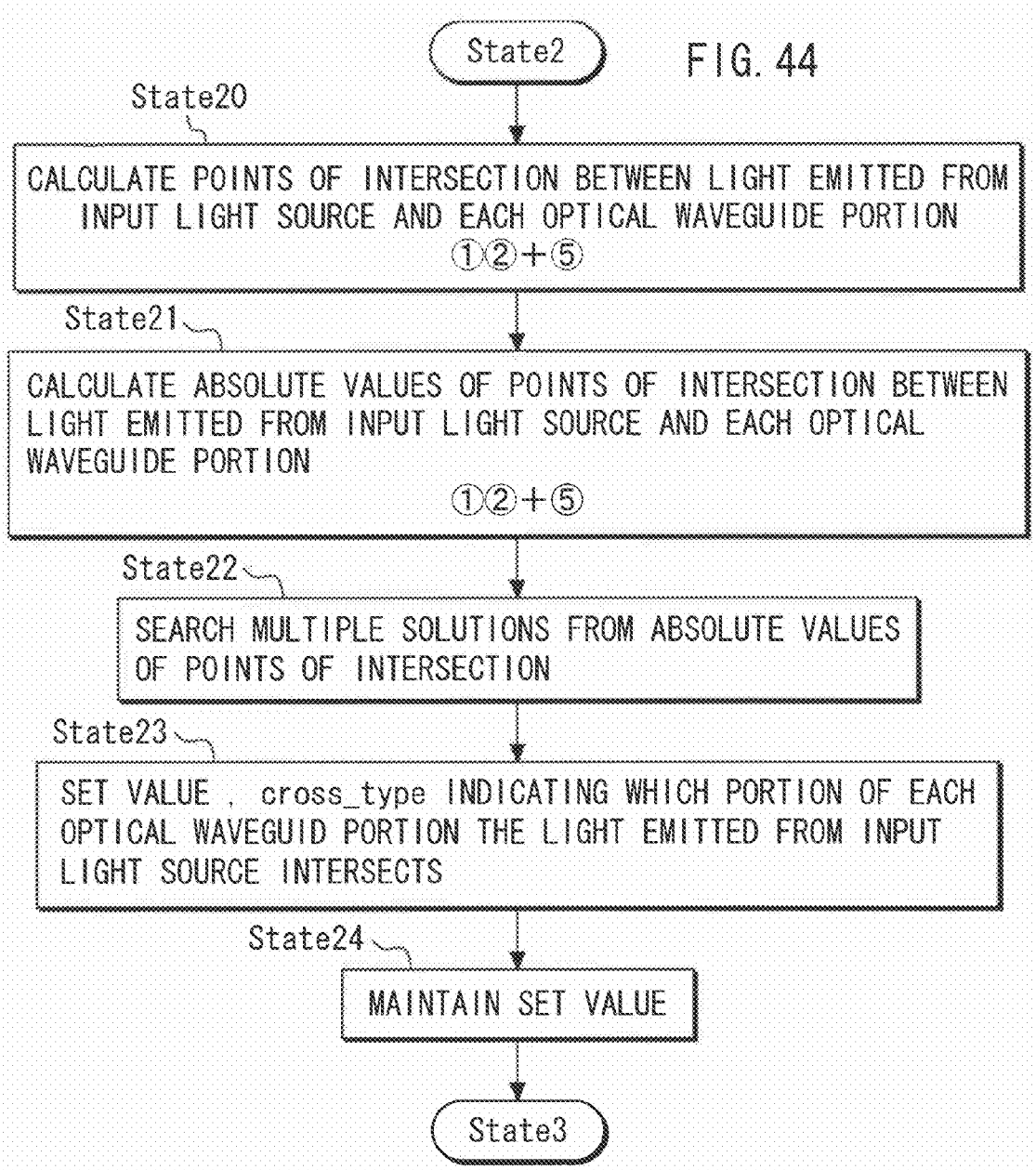
FIG. 44 is a flowchart showing an example of calculation process of points of intersection between the light that is incident to the optical waveguide and the first optical waveguide portion.

FIG. 44 shows an example of calculation process of points of intersection between the light that is incident to the optical waveguide and each of the optical waveguide portions. The following will describe the processing of the State 2 shown in FIG. 31 using an example thereof the calculation process of points of intersection between the light emitted from the input light source and the first optical waveguide portion 20A.

At State 20, points of intersection between the light that is emitted from each input light source and the first optical waveguide portions 20A are calculated. A shape of the first optical waveguide portion 20A is obtained by the following equation (56) using the diameter, mt_a_r, and the thickness, mt_a_t, of the first optical waveguide portion 20A set at the State 11. The selected input light source is obtained by the following equation (57) using the array information of the light rays shown in FIG. 39 corresponding to the address of Cross_data shown in FIG. 41.

$$x^2 + y^2 = (mt\_a\_r/2)^2 \quad (1)$$
$$z = \pm mt\_a\_t^2 \quad (2)$$
(56)

$$(x - x1)/i = (y - y1)/j = (z - z1)/k \quad (5)$$
(57)

Accordingly, a point of intersection between the light that is emitted from the input light source and the first optical waveguide portion 20A is calculated based on the equations (56) and (57).

At State 21 shown in FIG. 44, according to the calculation procedure similar to that of the State 20, absolute values of the points of intersection between the light that is emitted from the input light source and the first optical waveguide portion 20A are calculated so that a positional relationship between the points of intersection can be obtained.

Figure 45:
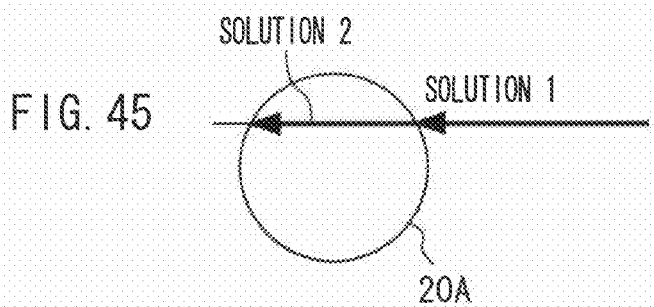
FIG. 45 is a diagram showing a case in which multiple solutions stay.

At State 22 shown in FIG. 44, any multiple solutions are searched from the absolute value of each of the points of intersection obtained at the State 21. FIG. 45 shows a case in which the multiple roots stay. If the points of intersection between the light that is emitted from the input light source and the first optical waveguide portion 20A are obtained due to the equations (56) and (57), solution 1 and solution 2 shown in FIG. 45 stay in this case.

At the State 22, items of data of the absolute values of the points of intersection including the multiple solutions are rearranged so that the solution 1, namely, the point of intersection between the light that is incident to the first optical waveguide portion 20A from the outside and the first optical waveguide portion 20A is obtained.

At State 23 shown in FIG. 44, it is obtained from the absolute values of the points of intersection excluding the multiple solutions obtained at the State 22 where the light emitted from the input light source intersects the first optical waveguide portion 20A.

At the State 23, if the absolute values of the points of intersection satisfy requirements of the following equation (58), it is determined that the light emitted from the input light source intersects a side surface of the first optical waveguide portion 20A and, at State 24, a value, cross_type=1, is set and maintained.

If the absolute values of the points of intersection satisfy requirements of the following equation (59), it is determined that the light emitted from the input light source is incident to the diffuse reflection members 22 and, at the State 24, a value, cross_type=2, is set and maintained.

If the absolute values of the points of intersection satisfy requirements of the following equation (12), it is determined that the light emitted from the input light source intersects a side surface of the second optical waveguide portion 20B and, at the State 24, a value, cross_type=3, is set and maintained.

If the absolute values of the points of intersection satisfy requirements of the following equation (13), it is determined that the light emitted from the input light source intersects a bottom surface of the second optical waveguide portion 20B and, at the State 24, a value, cross_type=2, is set and maintained.

$$①|xyz| < ②|xyz| \quad (58)$$

$$②|xyz| < ①|xyz| \quad (59)$$

FIG. 46 shows a result of the calculation of the points of intersection between the light that is incident to the optical waveguide and the first optical waveguide portion. In the above-mentioned process at the State 20 through the State 24, the values of Cross_data, which are boxed with alternate long and short dashed lines in FIG. 46, are input and the values of Cross_data, which are boxed with a solid line in FIG. 46, are output.

It is to be noted that a point of intersection between the light that is emitted from each input light source and the second optical waveguide portion 20B is obtained by substituting a diameter and thickness of the second optical waveguide portion 20B for a diameter and thickness of the first optical waveguide portion 20A in the above-mentioned equation (56) to calculate the equations (56) and (57).

In a configuration in which the side spreading structure 20C is provided, a point of intersection between the light that is emitted from each input light source and the side spreading structure 20C is obtained by substituting a diameter and thickness of the second optical waveguide portion 20B for a diameter and thickness of the first optical waveguide portion 20A in the above-mentioned equation (56) to calculate the equations (56) and (57).

Further, the value of Cross_type, is set to a predetermined value depending on whether the light emitted from the input light source intersects a side surface of the second optical waveguide portion 20B, the light emitted from the input light source intersects a bottom surface of the second optical waveguide portion 20B, the light emitted from the input light source is incident to any the reflection members 21 in this embodiment or in a configuration in which the side spreading structure 20C is provided, the light emitted from the input light source intersects a side surface of the side spreading structure 20C.

FIG. 47 shows a process of calculating vectors of the reflection (diffuse reflection) at the points of intersection obtained at the State 2. The following will describe the processing at the State 3 shown in FIG. 31.

At State 30, it refers to which position of the first optical waveguide portion 20A the light emitted from the input light source intersects. In a case of the set value, cross_type=1, in which the light emitted from the input light source intersects the side surface of the first optical waveguide portion 20A, the process is finished. In a case of the set value, cross_type=2, in which the light emitted from the input light source intersects any of the diffuse reflection members 22, the process of State 31 is performed.

At the state 31, the setting, Random_cul_st, on either the calculation of the diffuse reflection set in the State 11 is performed with reference to the diffuse reflection members LUT or is performed using ray trace is referred. If the calculation of the diffuse reflection is performed with reference to the diffuse reflection members LUT, the process of State 32 is performed. If the calculation of the diffuse reflection is performed using ray trace, the process of State 33 is performed.

At the State 33 shown in FIG. 47, reflection or refraction angle is calculated according to the following equation (60).

$$\frac{\sin\theta_A}{\sin\theta_B} = \frac{\lambda_A}{\lambda_B} = \frac{v_A}{v_B} = \frac{n_B}{n_A} = n_{AB} \tag{60}$$

where $\theta_A$ indicates an incident angle from first medium A to second medium B, $\theta_B$ indicates a refracting angle from first medium A to second medium B, $\lambda_A$ indicates a wavelength of wave in first medium A, $\lambda_B$ indicates a wavelength of wave in second medium B, $v_A$ indicates a velocity of wave in first medium A, $v_B$ indicates a velocity of wave in second medium B, $n_A$ indicates an absolute refractive index of first medium A, $n_B$ indicates an absolute refractive index of second medium B and $n_{AB}$ indicates a relative refractive index of second medium B to first medium A.

Figures 48A, 48B, 49:
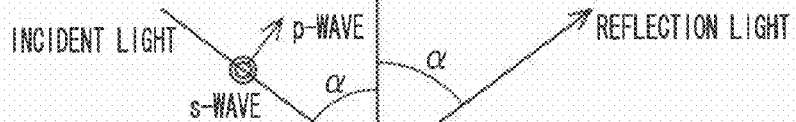
FIGS. 48A and 48B are tables each for showing a result of the calculation at the points of intersection between the light emitted from a light source and the optical waveguide portion.
FIG. 49 is a graph showing a relationship between incident light and reflection light or refraction light.

FIGS. 48A and 48B show a result of the calculation of the reflection angles at a point of intersection between light emitted from the input light source and the optical waveguide portion. In the processing at the State 31, the values of Cross_data, which are boxed with alternate long and short dashed lines in FIG. 48A, are input and the values of Cross_data, which are boxed with a solid line in FIG. 48B, are output.

At the State 32 shown in FIG. 47, ratios of the reflection and the refraction are calculated based on Fresnel equations on X- and Y-planes or Y- and Z-planes. Here, the following calculation is performed in a case of Fresnel_on=1 at the State 12 shown in FIG. 32.

FIG. 49 shows a relationship between incident light and reflection light or refraction light. An amplitude reflectivity rp of S-wave (TE-wave, H-wave, horizontal polarization or orthogonal polarization) is given by the following equation (61) and an amplitude transmissivity tp thereof is given by the following equation (62). An amplitude reflectivity rs of P-wave (TM-wave, E-wave, vertical polarization or parallel polarization) is given by the following equation (63) and an amplitude transmissivity ts thereof is given by the following equation (64).

$$r_p = \frac{n_1\cos\beta - n_2\cos\alpha}{n_1\cos\beta + n_2\cos\alpha} = -\frac{\tan(\alpha-\beta)}{\tan(\alpha+\beta)} \tag{61}$$

$$t_p = \sqrt{\frac{n_2\cos\beta}{n_1\cos\alpha}} \frac{2n_1\cos\alpha}{n_2\cos\alpha + n_1\cos\beta} \tag{62}$$

$$= \sqrt{\frac{n_2\cos\beta}{n_1\cos\alpha}} \frac{2\cos\alpha\sin\beta}{\sin(\alpha+\beta)\cos(\alpha-\beta)}$$

$$r_s = \frac{n_1\cos\alpha - n_2\cos\beta}{n_1\cos\alpha + n_2\cos\beta} = \frac{\sin(\alpha-\beta)}{\sin(\alpha+\beta)} \tag{63}$$

$$t_s = \sqrt{\frac{n_2\cos\beta}{n_1\cos\alpha}} \frac{2n_1\cos\alpha}{n_1\cos\alpha + n_2\cos\beta} \tag{64}$$

$$= \sqrt{\frac{n_2\cos\beta}{n_1\cos\alpha}} \frac{2\cos\alpha\sin\beta}{\sin(\alpha+\beta)}$$

where $\alpha$ is an incidence angle, $\beta$ is a refraction angle, $n_1$ is absolute refractive index of material before the incidence plane and $n_2$ is absolute refractive index of material after the incidence plane.

An absolute value Rp of the amplitude reflectivity rp of the s-wave is given by the following equation (65) and an absolute value Tp of the amplitude transmissivity tp of the S-wave is given by the following equation (66). An absolute value Rs of the amplitude reflectivity rs of the p-wave is given by the following equation (67) and an absolute value Ts of the amplitude transmissivity ts of the p-wave is given by the following equation (68).

$$Rp = |Rp|^2 \tag{65}$$

$$Tp = \frac{n_2\cos\theta_2}{n_1\cos\theta_1}|tp|^2 \tag{66}$$

$$Rs = |rs|^2 \tag{67}$$

$$Ts = \frac{n_2\cos\theta_2}{n_1\cos\theta_1}|ts|^2 \tag{68}$$

It is to be noted that since the equations, Rp+Tp=1 and Rs+Ts=1 are held, only one term may be obtained.

FIG. 50 shows an example of a result of the calculation of the ratios of the reflection and the refraction. In the above-mentioned processing at the State 32, the values of Cross_data, which are boxed with alternate long and short dashed lines in FIG. 50, are input and the values of Cross_data, which are boxed with a solid line in FIG. 50, are output.

Here, since the optical paths by the reflection (diffuse reflection) of the light that is incident to any of the diffuse reflection members 22 are obtained by the calculation, a result of the calculation of the refraction is used for the calculation of the loss.

It is to be noted that in a case of Fresnel_on=0 at the State 12 shown in FIG. 32, Schlich's approximation like the following equation (69) is performed. This equation, however, is not highly precise so that the calculation based on the above-mentioned Fresnel equation is preferable.

$$F_r(\theta) \approx F_0 + (1-F_0)^5 \tag{69}$$

where $F_0$ is real part of the Fresnel reflection coefficient at a time of the vertical incidence.

The process at the State 33 in which the calculation of the diffuse reflection is performed using the ray trace is similar to that of the State 32 in which the calculation of the reflection is performed, detailed description of which will be omitted.

At State 34, a signal, fix_vection_cal, determining the processing is generated according to a situation whether or not the calculation has finished.

In a case of the set value, cross_type=2, in which the light emitted from the input light source intersects any of the diffuse reflection members 22, the signal, fix_vection_cal, is generated because the calculation has not yet finished and the process goes back to the State 2. In a case of the set value, cross_type=1, in which the light emitted from the input light source intersects the side surface of the first optical waveguide portion 20A, the processing of State 4 is performed because the calculation has finished.

It is to be noted that the calculation of reflection vectors at a point of intersection between the light that is emitted from the input light source and the first optical waveguide portion 20A at the State 3 is performed at a point of intersection between the light that is emitted from the input light source and the second optical waveguide portion 20B and at a point of intersection between the light that is emitted from the input light source and the side spreading structure 20C in a configuration in which the side spreading structure 20C is provided.

More specifically, it refers to which position of the second optical waveguide portion 20A the light emitted from each input light source intersects from the value of the set value, cross_type. If the light emitted from the input light source intersects the bottom surface of the second optical waveguide portion 20B, the angles of the reflection and refraction are calculated using the above-mentioned equation (60) and the ratios of the reflection and the refraction are calculated using the above-mentioned equations (60) through (68). If the light emitted from the input light source intersects the side surface of the second optical waveguide portion 20B, the calculation finishes and the process of State 4 is performed.

FIG. 51 shows an example of a calculation process concerning how far the light is attenuated by the reflection (diffuse reflection) which is obtained at the State 3. The following will describe the processing of the State 4 shown in FIG. 31.

At the State 40, an attenuation coefficient, mt_reflection, by the reflections on X- and Y-planes is given by the following equation (70) using the reflectivities (absolute values), Rp and Rs, of s-wave and p-wave calculated at the State 32. The level of the light, reflect_level, attenuated by the reflections on X- and Y-planes is given by the following equation (71).

$$mt\_reflection = (Rp + Rs)/2 \quad (70)$$

$$reflect\_level = cross\_data.level * mt\_reflection \quad (71)$$

The level of the light, reflect_level, of the equation (71) is given by multiplying the level of the light, cross_data, level, from emitted from the input light source, which is selected by the data, Cross_data, by the attenuation coefficient, mt_reflection.

FIG. 52 shows an example of a result of the calculation of the level by the reflection. At the above-mentioned State 40, the values of Cross_data, which are boxed with alternate long and short dashed lines in FIG. 52, are input and the values of Cross_data, which are boxed with a solid line in FIG. 52, are output.

At State 41 shown in FIG. 51, a signal, fix_level_cal, determining the processing is generated according to a situation whether or not the calculation has finished.

In a case of the set value, cross_type=1, in which the light emitted from the input light source intersects the side surface of the first optical waveguide portion 20A and the light is emitted from the first optical waveguide portion 20A to the outside, the calculation at the State 4 finishes and the process of the State 5 is performed.

It is to be noted that the calculation of attenuation at the State 4 is performed on the second optical waveguide portion 20B and on the side spreading structure 20C in the configuration in which the side spreading structure 20C is provided. If the light emitted from the input light source intersects the side surface of the second optical waveguide portion 20B and the light is emitted from the second optical waveguide portion 20B to the outside, the calculation at the State 4 finishes and the process of the State 5 is performed.

At the State 5, the calculations from the State 2 to the State 4 are repeated by times similar to numbers of divided light rays emitted from the input light source set at the State 10.

At the State 6, the items of data, Cross_data which are obtained from the State 2 to the State 5, are sorted.

At the State 6, the array of the data, Cross_data, returns on the basis of symmetry of the distribution of the output of the laser diode. The data, Cross_data, is sorted on the basis of the coordinates, Cross_address, of each point of the intersection so that it returns to the address on the outer circumference of the second optical waveguide portion 20B. This is because it is searched how many light rays are reached to the address on the outer circumference of the second optical waveguide portion 20B and how far the level thereof is.

At the State 7, a result of output obtained by the calculations from the State 2 to the State 6 is generated.

Based on the data, Cross_data, calculated by the above-mentioned calculations from the State 2 to the State 6, a position (x, y, z) of the light output from the first optical waveguide portion 20A, vector (i,j,k) of the light output from the first optical waveguide portion 20A and level of the light output from the first optical waveguide portion 20A are obtained between zero and $2\pi$ of the circumference of the first optical waveguide portion 20A as the output distribution level of the light that is output from the first optical waveguide portion 20A to the second optical waveguide portion 20B.

Based on the data, Cross_data, calculated by the calculations from the State 2 to the State 6, a position (x, y, z) of the light that is not output from the first optical waveguide portion 20A, vector (i,j,k) of the light that is not output from the first optical waveguide portion 20A and level of the light that is not output from the first optical waveguide portion 20A are obtained as a distribution level of loss of the light that is not output from the first optical waveguide portion 20A.

Thus, it is capable of calculate how many light rays reach each address between zero and $2\pi$ of the circumference direction of the first optical waveguide portion 20A, the level of each ray thereof, and the vector thereof.

Regarding the light that is output from the first optical waveguide portion 20A to the second optical waveguide portion 20B, a position (x, y, z) of the light output from the second optical waveguide portion 20B, vector (i,j,k) of the light output from the second optical waveguide portion 20B and level of the light output from the second optical waveguide portion 20B are obtained between zero and $2\pi$ of the circumference of the second optical waveguide portion 20B as the output distribution level of the light that is output from the second optical waveguide portion 20B to the outside.

Thus, it is capable of calculate how many light rays reach each address between zero and $2\pi$ of the circumference direction of the second optical waveguide portion 20B, the level of each ray thereof, and the vector thereof.

FIGS. 53A and 53B show an outline of the optical waveguide when calculating the directivities of the light by the reflection. The following will describe the calculation method of the directivities of the light by the reflection in the optical waveguide 2A more in detail.

The directivities of the light in the optical waveguide 2A are calculated by dividing the light that is incident to the first optical waveguide portion 20A from the laser diode 30 into M by N items of light and addressing them. An optical path relating to the light of each address is calculated and a position, a vector (direction) and a level of the light that is emitted from the outer circumference of the second optical waveguide portion 20B to the outside are obtained at a light-receiving region which is obtained by dividing the circumference of the optical waveguide 2A by n times. Further, a position, a vector (direction) and a level of the light that is not emitted from the first optical waveguide portion 20A to the outside are obtained.

It is to be noted that in this embodiment, the parallel light emitted from the laser diode 30 is incident to the first optical waveguide portion 20A. The optical waveguide material "A" constituting the first optical waveguide portion 20A is glass (BK7) and the optical waveguide material B constituting the second optical waveguide portion 20B is air.

Figure 54:
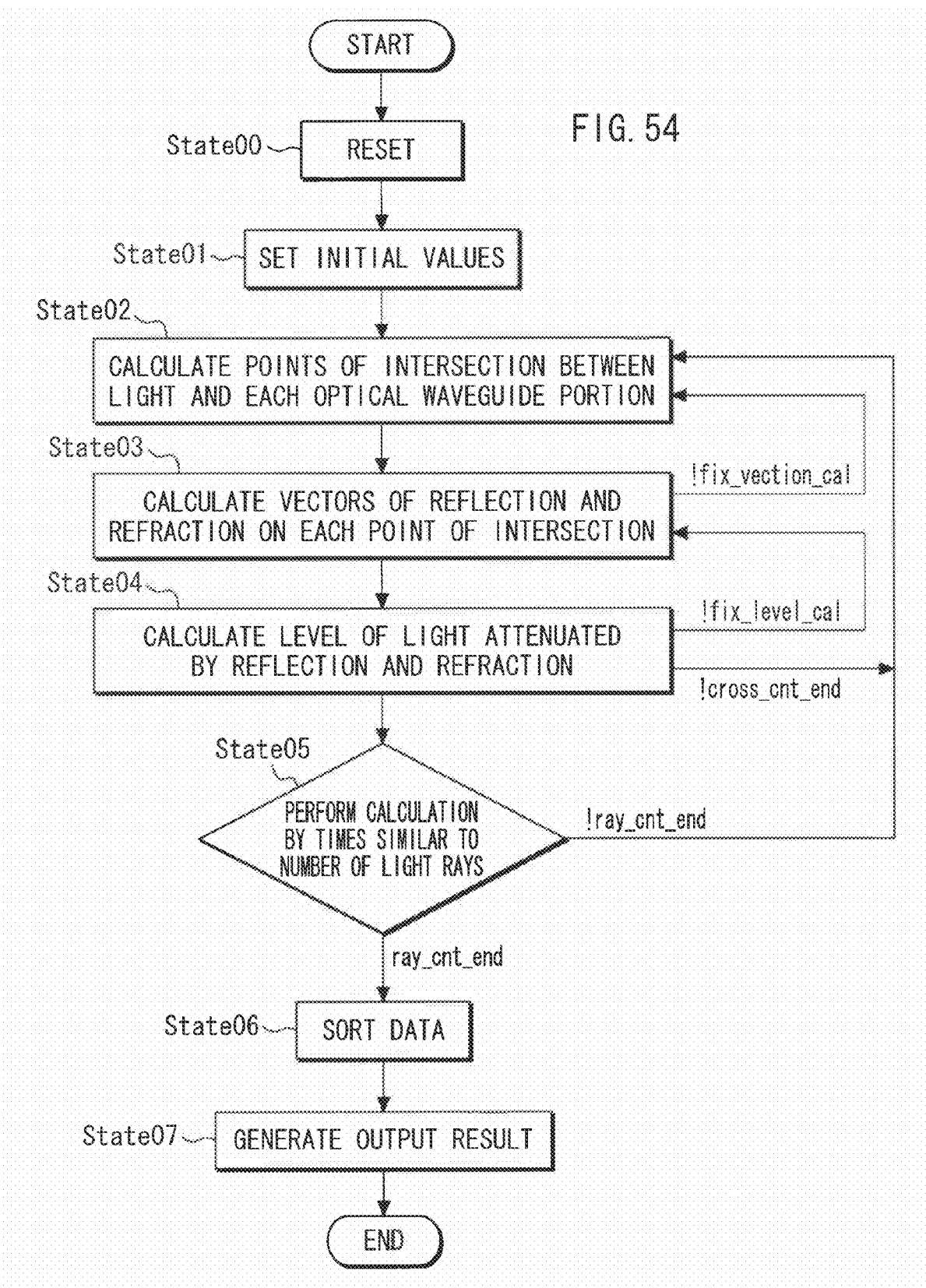
FIG. 54 is a flowchart showing an example of a calculation method of the directivities of the light in the optical waveguide.

FIG. 54 shows an example of the calculation method of the directivities of the light by the reflection in the optical waveguide. The following will describe a whole flow of the calculation method of the directivities of the light by the reflection in the optical waveguide 2A.

At State 00: any initial values that have been set are reset;

At State 01: initial values relating to properties of the laser diode 30, properties of the optical waveguide 2A and the like are set;

At State 02: points of intersection between the light that is incident to the optical waveguide 2A and each of the first and second optical waveguide portions 20A and 20B are calculated;

At State 03: vectors of the reflection and the refraction are calculated on each of the points of intersection calculated at the state 2;

At State 04: an amount of the attenuation of the light based on the reflection and the refraction calculated at the state 3 is calculated;

At State 05: the calculations from the state 2 to the state 4 are repeated by times similar to a number of light rays;

At State 06: an array of data obtained by the calculations from the state 2 to the state 5 is sorted; and At State 07: an output result is generated.

Figure 55:
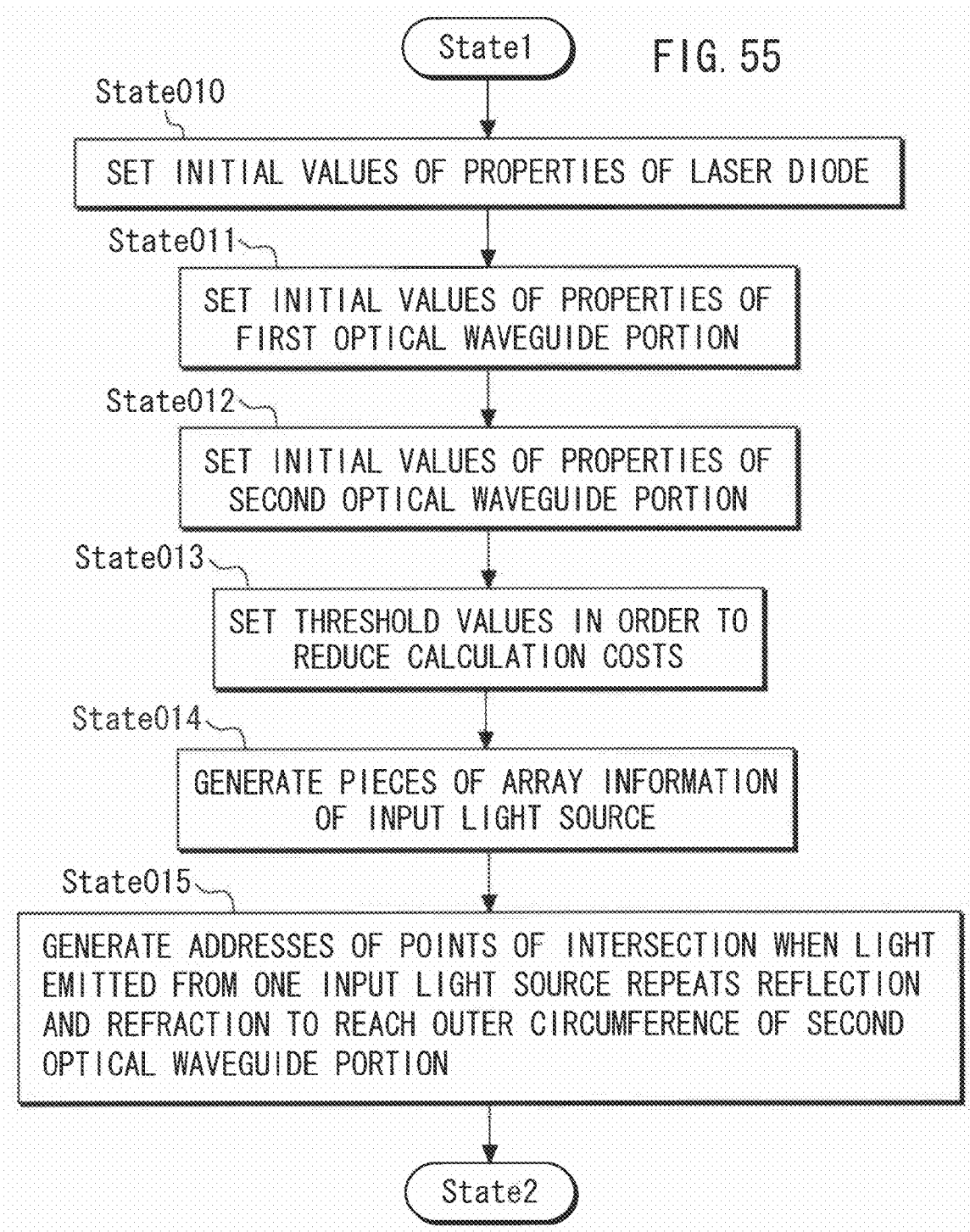
FIG. 55 is a flowchart showing an example of a setting process of initial values.

FIG. 55 shows an example of a setting process of initial values of the State 1 shown in FIG. 54, which will describe.

At State 010, the initial values of properties of the laser diode 3 are set. The initial values of properties of the laser diode 3 are set with reference to an example of set initial values shown in FIG. 33 and the table shown in FIG. 34.

At State 011 shown in FIG. 55, properties of the optical waveguide material A constituting the first optical waveguide portion 20A are set. FIG. 56 shows an example of set initial values relating to the properties of the first optical waveguide portion 20A to be set in the State 011.

At the State 011, for example, as shown in FIG. 56, a diameter, mt_a_r, of the first optical waveguide portion 20A, a thickness, mt_a_t, of the first optical waveguide portion 20A, and coordinates, mt_a_p, of a center of the first optical waveguide portion 20A are set.

A name of the material, mt_a, constituting the first optical waveguide portion 20A, and a refractive index, mt_a_refraction, of the material constituting the first optical waveguide portion 20A are also set.

Further, a name of reflecting material, mt_a_z, constituting the reflecting members provided on the first optical waveguide portion 20A and a reflectivity, mt_a_z_LUT, thereof are set. It is to be noted that numbers set in FIG. 56 are illustrated as examples. Such parameters set in the State 011 may be parameters that set an equation which is capable of expressing an outline of the first optical waveguide portion 20A. Parameters for setting a shape, a position of an origin and a material of the first optical waveguide portion 20A are set so that the parameter alters according to a shape of the first optical waveguide portion 20A.

FIGS. 57A and 57B show examples of relationships between optical waveguide materials and refractive indexes thereof. The table 02 shown in FIG. 57A is a lookup table (LUT) in which the refractive indexes of a predetermined material, for example, BK7 in this embodiment, with respect to respective wavelengths of the light source are indicated. The refractive index, mt_a_refraction, of the material constituting the first optical waveguide portion 20A is set based on the name, mt_a, of the material constituting the first optical waveguide portion 20A with referring to the table 02 shown in FIG. 57A.

Figure 58A:
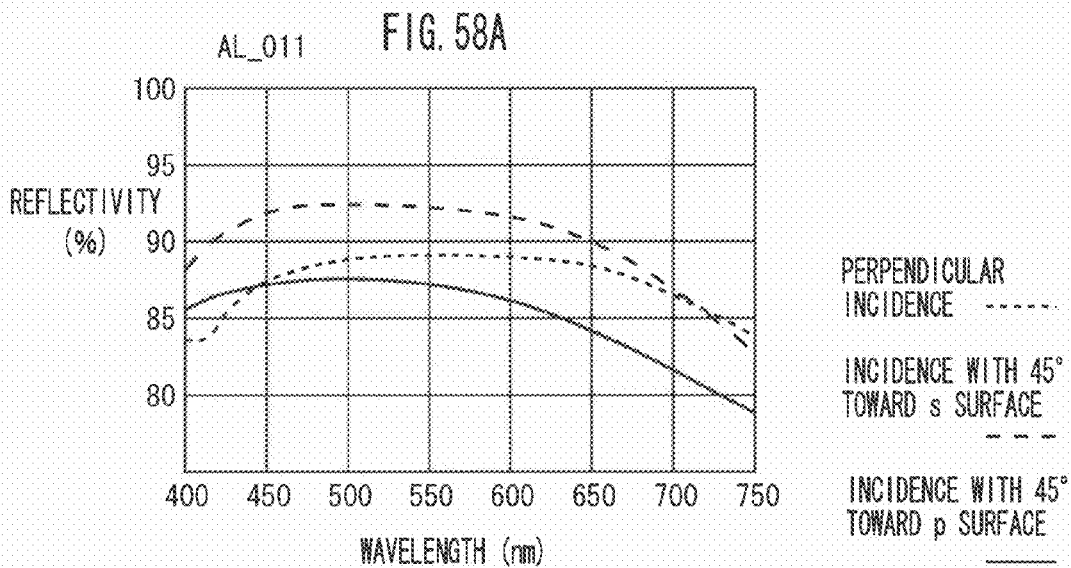
FIGS. 58A and 58B are graphs each for showing reflectivities of reflecting material.
Figure 58B:
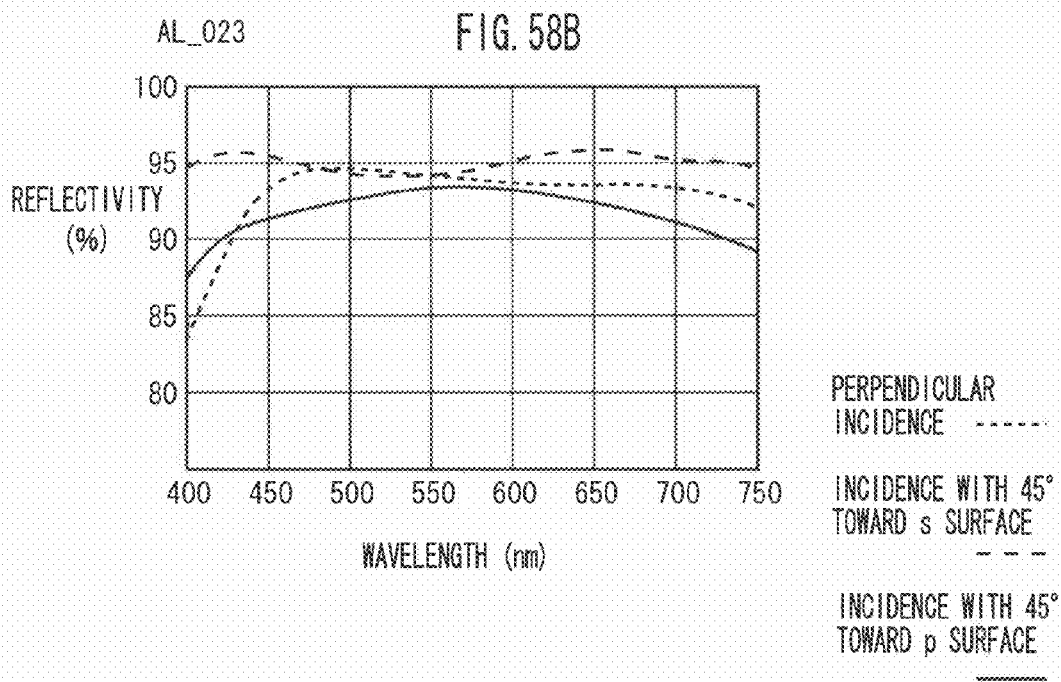

FIGS. 58A and 58B show reflectivities of reflecting materials. A graph shown in FIG. 58A shows reflectivities of a predetermined material, for example, a coating member on which aluminum is deposited, in this embodiment, with respect to each wavelength of the light emitted from the light source in cases of a perpendicular incidence, an incidence with 45 degrees toward S surface, and an incidence with 45 degrees toward P surface. The reflectivity, mt_a_z_LUT, of the reflecting material provided on the first optical waveguide portion 20A is set based on the name, mt_a_z, of the material of the reflecting member provided on the first optical waveguide portion 20A with referring to the graph shown in FIG. 58A.

It is to be noted that a graph shown in FIG. 58B shows reflectivities of an enhanced coating member on which aluminum is deposited with respect to each wavelength of the light emitted from the light source in cases of a perpendicular incidence, an incidence with 45 degrees toward S surface, and an incidence with 45 degrees toward P surface. The reflectivity, mt_a_z_LUT, of the reflecting material provided on the first optical waveguide portion 20A is set with referring to the graph shown in FIG. 58B when the name, mt_a_z, of the material of the reflecting member provided on the first optical waveguide portion 20A is AL_023 in this embodiment.

At State 012 shown in FIG. 55, initial values relating to properties of the optical waveguide material B constituting the second optical waveguide portion 20B are set. FIG. 59 shows an example of set initial values relating to the properties of the second optical waveguide portion 20B to be set in the State 012.

At the State 012, for example, as shown in FIG. 59, a diameter, mt_b_r, of the second optical waveguide portion 20B, a thickness, mt_b_t, of the second optical waveguide portion 20B, and coordinates, mt_b_p, of a center of the second optical waveguide portion 20B are set.

A name of the material, mt_b, constituting the second optical waveguide portion 20B, and a refractive index, mt_b_refraction, of the material constituting the second optical waveguide portion 20B are also set.

Further, a name of material, mt_b_z, constituting the reflecting members provided on the second optical waveguide portion 20B and a reflectivity, mt_b_z_LUT, thereof are set. It is to be noted that numbers set in FIG. 59 are illustrated as examples. Such parameters set in the State 12 may be parameters that set an equation which is capable of expressing an outline of the second optical waveguide portion 20B. Parameters for setting a shape, a position of an origin and a material of the second optical waveguide portion 20B are set so that the parameter alters according to a shape of the second optical waveguide portion 20B.

The table 03 shown in FIG. 57B is a lookup table (LUT) in which the refractive indexes of a predetermined material, for example, air in this embodiment with respect to each wavelength of the light emitted from the light source are indicated. The refractive index, mt_b_refraction, of the material constituting the second optical waveguide portion 20B is set based on the name of the material, mt_b, constituting the second optical waveguide portion 20B with referring to the table 03 shown in FIG. 57B.

The reflectivity, mt_b_z_LUT, of the reflecting material provided on the second optical waveguide portion 20B is set based on the name, mt_b_z, of the material of the reflecting member provided on the second optical waveguide portion 20B with referring to, for example, the graph shown in FIG. 58A.

At State 013 shown in FIG. 55, threshold values for decreasing an amount of the calculation to reduce calculation costs are set. At the State 013, for example, as shown in FIG. 38, an upper limit set value, ray_cnt_end, of the number of divided input light source, ld_no, maximum number, cross_cnt_end, of the reflection and the refraction, a resolution, circle_cnt_end, at a light-arrival point on an outermost circumference of the second optical waveguide portion 20B and a setting, Fresnel_on, on whether or not Fresnel calculations for P- and S-waves should be carried out are set.

At State 014 shown in FIG. 55, pieces of array information of light rays emitted from the input light source are generated. At the State 014, by calculating positional information (x1, y1 and z1) of the input light source, a unit vector (i, j and k) of the input light source, and a level for each light ray emitted from the input light source based on the numbers of divided input light source, ld_no, set at the State 010, the pieces of the array information of the light rays are generated as one shown in FIG. 39. In this embodiment, it is estimated that the unit vector is set to i=−1 in x-direction, and the laser diode 30 emits the light that is incident perpendicular to the optical waveguide 2A.

The level for each light ray emitted from the input light source is calculated by the following equation (72) based on the numbers of divided input light source, ld_no, set at the State 010 and the laser output, ld_power:

$$\text{Level}=ld\_\text{power}/(ld\_no+1) \tag{72}$$

where adding one to the numbers of divided input light source, ld_no, in the equation (72) is because an optical path of the light at a center of the input light source can be obtained. It is to be noted that the level and the vector can be set based on a comparative radiation table, not shown.

If the input light source has the spot diameter that is the same as the diameter of the first optical waveguide portion 20A, it is unnecessary to generate the array information of the light rays within a range from −1 to −50 of the light rays emitted from the input light source in the array information of the light rays shown in FIG. 39, taking into consideration a symmetry of the light rays emitted from the input light source.

In the other words, if the laser diode 30 emits the light that is incident perpendicular to the X-, Y- or Z-plane so that an output distribution of the laser diode 30 has symmetry, a mirror image portion of the array information of the light rays is not generated.

When the output distribution of the laser diodes has the mirror symmetry as shown in FIGS. 42A and 42B and the laser diodes are provided on one plane that is symmetrical to X- and Y-planes or Y- and Z-planes, steps of calculations are decreased to 50% thereof. Further, the light is spread or concentrated, shaded portions and solid-white portions are respectively equal to each other as shown in FIG. 42B so that when the laser diodes are provided on both planes that are symmetrical to X- and Y-planes or Y- and Z-planes, steps of calculations are decreased to 25% thereof.

On the other hand, when the output distribution of the laser diodes has the rotation symmetry as shown in FIG. 43A and the laser diodes are provided on one axis that is symmetrical to X-axis, steps of the calculations can be decreased utilizing the symmetry. Further, when the output distribution of the laser diodes has the rotation symmetry as shown in FIG. 43B, the output of the laser diode becomes denser following a center thereof and becomes thinner following an outer thereof so that the output distribution of the laser diodes has asymmetry. If so, the steps of the calculations remain 100%.

At State 015 shown in FIG. 55, the numbers (addresses) of divided optical paths are generated when the light emitted from one input light source repeats the reflection and the refraction to reach the outer circumference of the second optical waveguide portion 20B. FIGS. 60A and 60B show an example of the generation of the addresses to be assigned to the reflected light and the refracted light.

A part of the light that is incident to the first optical waveguide portion 20A from the outside is reflected by the beam splitter 23 provided on the outer circumference of the first optical waveguide portion 20A so that it reaches the outer circumference of the second optical waveguide portion 20B. Another part of the light that is incident to the first optical waveguide portion 20A from the outside is refracted by the beam splitter 23 so that it is incident to the first optical waveguide portion 20A.

A part of the light that is incident to the first optical waveguide portion 20A is refracted by the outer circumference of the first optical waveguide portion 20A to output it therefrom so that it reaches the outer circumference of the second optical waveguide portion 20B. Another part of the light that is incident to the first optical waveguide portion 20A is reflected by the outer circumference of the first optical waveguide portion 20A so that it returns to the first optical waveguide portion 20A.

The following is done according to the same way as the above so that based on a repetition of the reflection and the refraction, there are the light that is not output from the first optical waveguide portion 20A, which is enclosed by the dotted lines in FIG. 60A and the light that is output from the second optical waveguide portion 20B, which is enclosed by the chain double-dashed lines in FIG. 60A.

Thus, with respect to the light having an address, which is incident to the first optical waveguide portion 20A from the outside, items of the light caused by the reflection and the refraction are respectively addressed so that the data, Cross_data, having cross count addresses, cross_cnt_ad, composed of, for example, information of seven bits can be generated as shown in FIG. 60B.

In the Cross_data shown in FIG. 60B, a first bit of the address, cross_cnt_ad, indicates which the light is incident to the first optical waveguide portion 20A from the second optical waveguide portion 20B or the light is incident to the second optical waveguide portion 20B from the first optical waveguide portion 20A. A zero bit of the address, cross_cnt_ad, indicates either of the reflection or the refraction.

Into the Cross_data shown in FIG. 60B, the data, B→A_on, indicating whether or not the light is incident to the first optical waveguide portion 20A from the second optical waveguide portion 20B is added. Since this value is the same information as that of the first bit of the address, cross_cnt_ad, (B→A_on=cross_cnt_ad[1]), it may be omitted.

FIG. 61 shows an example of calculation process of points of intersection between the light that is incident to the optical waveguide and each of the first and second optical waveguide portions. The following will describe the processing of the State 02 shown in FIG. 54.

At State 020, points of intersection between the light that is emitted from the input light source and each of the first and second optical waveguide portions 20A and 20B are calculated. A shape of the first optical waveguide portion 20A is obtained by the following equation (73) using the diameter, mt_a_r, and the thickness, mt_a_t, of the first optical waveguide portion 20A set at the State 011. A shape of the second optical waveguide portion 20B is obtained by the following equation (74) using the diameter, mt_b_r, and the thickness, mt_b_t, of the second optical waveguide portion 20B set at the State 012. The selected input light source is obtained by the following equation (75) using the arrangement information of the light rays shown in FIG. 39 corresponding to the address of Cross_data shown in FIG. 60B.

$$x^2 + y^2 = (mt\_a\_r/2)^2 \quad (1)' \quad (73)$$
$$z = \pm mt\_a\_t^2 \quad (2)'$$

$$x^2 + y^2 = (mt\_b\_r/2)^2 \quad (3)' \quad (74)$$
$$z = \pm mt\_b\_t^2 \quad (4)'$$

$$(x - x1)/i = (y - y1)/j = (z - z1)/k \quad (5)' \quad (75)$$

Accordingly, a point of intersection between the light that is emitted from the input light source and the first optical waveguide portion 20A is calculated based on the equations (73) and (75) and a point of intersection between the light that is emitted from the input light source and the second optical waveguide portion 20B is calculated based on the equations (74) and (75).

At State 021 shown in FIG. 61, according to the calculation procedure similar to that of the State 020, absolute values of the points of intersection between the light that is emitted from the input light source and each of the first and second optical waveguide portions 20A and 20B are calculated so that a positional relationship between the points of intersection can be obtained.

At State 022 shown in FIG. 61, any multiple solutions are searched from the absolute value of each of the points of intersection obtained at the State 021. If the points of intersection between the light that is emitted from the input light source and the first optical waveguide portion 20A are obtained due to the equations (73) and (75), solution 1 and solution 2 shown in the FIG. 45 stay in this case.

At the State 022, items of data of the absolute values of the points of intersection including the multiple solutions are rearranged so that the solution 1, namely, the point of intersection between the light that is incident to the first optical waveguide portion 20A from the outside and the first optical waveguide portion 20A is obtained.

At State 023 shown in FIG. 61, it is obtained from the absolute values of the points of intersection excluding the multiple solutions obtained at the State 022 where the light emitted from the input light source intersects the first and second optical waveguide portions 20A and 20B.

At the State 023, if the absolute values of the points of intersection satisfy requirements of the following equation (76), it is determined that the light emitted from the input light source intersects a side surface of the first optical waveguide portion 20A and, at State 024, a value, cross_type=1, is set and maintained.

If the absolute values of the points of intersection satisfy requirements of the following equation (77), it is determined that the light emitted from the input light source intersects a bottom surface of the first optical waveguide portion 20A and, at the State 024, a value, cross_type=2, is set and maintained.

If the absolute values of the points of intersection satisfy requirements of the following equation (78), it is determined that the light emitted from the input light source intersects a side surface of the second optical waveguide portion 20B and, at the State 024, a value, cross_type=3, is set and maintained.

If the absolute values of the points of intersection satisfy requirements of the following equation (79), it is determined that the light emitted from the input light source intersects a bottom surface of the second optical waveguide portion 20B and, at the State 024, a value, cross_type=4, is set and maintained.

$$①'|xyz| < ②'③'④'|xyz| \quad (76)$$

$$②'|xyz| < ①'③'④'|xyz| \quad (77)$$

$$③'|xyz| < ①'②'④'|xyz| \quad (78)$$

$$④'|xyz| < ①'②'③'|xyz| \quad (79)$$

FIG. 62 shows a result of the calculation of the points of intersection between the light that is incident to the optical waveguide and each of the first and second optical waveguide portions. In the above-mentioned process at the State 020 through the State 024, the values of Cross_data, which are boxed with alternate long and short dashed lines in FIG. 62, are input and the values of Cross_data, which are boxed with a solid line in FIG. 62, are output.

FIG. 63 shows a process of calculating vectors of the reflection and the refraction at the points of intersection obtained at the State 02. The following will describe the processing at the State 03 shown in FIG. 54.

At State 030, it refers to which position of each of the first or second optical waveguide portion 20A, 20B the light emitted from the input light source intersects. In a case of the set value, cross_type=1, in which the light emitted from the input light source intersects the side surface of the first optical waveguide portion 20A, the process of State 031 is performed. In a case of the set value, cross_type=2 or 4, in which the light emitted from the input light source intersects the bottom surface of the first optical waveguide portion 20A or the bottom surface of the second optical waveguide portion 20B, the process of State 033 is performed. In a case of the set value, cross_type=3, in which the light emitted from the input light source intersects the side surface of the second optical waveguide portion 20B, the process of State 034 is performed.

At the State 031 shown in FIG. 63 which is performed in the case where the light emitted from the input light source intersects the side surface of the first optical waveguide portion 20A, reflection or refraction angle is calculated according to the above-mentioned equation (60).

FIG. 25 shows a result of the calculation of the reflection and refraction angles. In the processing at the State 031, the values of Cross_data, which are boxed with alternate long and short dashed lines in FIG. 64, are input and the values of Cross_data, which are boxed with a solid line in FIG. 64, are output.

At the State 032 shown in FIG. 63, ratios of the reflection and the refraction are calculated based on Fresnel equations on X- and Y-planes or Y- and Z-planes. Here, the following calculation is performed in a case of Fresnel_on=1 at the State 013 shown in FIG. 55.

Based on the relationship between incident light and reflection light or refraction light shown in FIG. 49, an amplitude reflectivity rp of S-wave (TE-wave, H-wave, horizontal polarization or orthogonal polarization) is given by the above-mentioned equation (61) and an amplitude transmissivity tp thereof is given by the above-mentioned equation (62). An amplitude reflectivity of P-wave (TM-wave, E-wave, vertical polarization or parallel polarization) is given by the above-mentioned equation (63) and an amplitude transmissivity ts thereof is given by the above-mentioned equation (18).

An absolute value Rp of the amplitude reflectivity rp of the s-wave is given by the above-mentioned equation (65) and an absolute value Tp of the amplitude transmissivity tp of the S-wave is given by the above-mentioned equation (66). An absolute value Rs of the amplitude reflectivity rs of the p-wave is given by the above-mentioned equation (67) and an absolute value Ts of the amplitude transmissivity ts of the p-wave is given by the above-mentioned equation (68). It is to be noted that since the equations, Rp+Tp=1 and Rs+Ts=1 are held, only one term may be obtained.

FIG. 27 shows an example of a result of the calculation of the ratios of the reflection and the refraction. In the above-mentioned processing at the State 032, the values of Cross_data, which are boxed with alternate long and short dashed lines in FIG. 65, are input and the values of Cross_data, which are boxed with a solid line in FIG. 65, are output.

It is to be noted that in a case of Fresnel_on=0 at the State 013 shown in FIG. 55, Schlich's approximation like the above-mentioned equation (69) is performed. This equation, however, is not highly precise so that the calculation based on the above-mentioned Fresnel equation is preferable.

At the State 033 shown in FIG. 63 performed in a case where the light emitted from the input light source intersects the bottom surface of the first optical waveguide portion 20A or the bottom surface of the second optical waveguide portion 20B, a calculation of the reflection on the Z-plane is performed.

At the State 033, Snell's equation (60) described at the State 031 is used as a calculation equation. Unit vector (i, j, and k) of the light emitted from the input light source is input and the calculation is performed by referring to the wavelength, sp_no, of the light emitted from the input light source set at the State 010 and, if the light emitted from the input light source intersects the bottom surface of the first optical waveguide portion 20A, the reflectivity, mt_a_z_LUT, of the reflecting member provided on the first optical waveguide portion 20A, which is set at the State 011. The calculation is performed by referring to the reflectivity, mt_b_z_LUT, of the reflecting member provided on the second optical waveguide portion 20B, which is set at the State 012 if the light emitted from the input light source intersects the bottom surface of the second optical waveguide portion 20B, so that a reflection vector is obtained and numbers of the reflection (hereinafter, referred to as "level reflectance loss numbers") are counted.

FIGS. 66A and 66B show an example of a result of the calculation of the reflection on Z-plane. In the processing at the above-mentioned State 033, the values of Cross_data, which are boxed with alternate long and short dashed lines in FIG. 66A, are input so as to generate the data (Z_Cross_data) shown in FIG. 66B in which the values, which are boxed with a solid line in FIG. 66B, are output.

The data, Z_Cross_data, maintains the address, the reflection vector and the level reflectance loss numbers. When the address alters, a row is added and when no address alters, the data is overwritten. In the data, Z_Cross_data, values of the level reflectance loss numbers, not the level of the light are maintained. This is because the level lost by the reflection is obtained by multiplying the level reflectance loss numbers by the loss if the level reflectance loss numbers can be obtained.

At State 034, a signal, fix_vection_cal, determining the processing is generated according to a situation whether or not the calculation has finished.

In a case of the set value, cross_type=2 or 4, in which the light emitted from the input light source intersects the bottom surface of the first optical waveguide portion 20A or the bottom surface of the second optical waveguide portion 20B, the signal, fix_vection_cal, is generated because the calculation has not yet finished and the process goes back to the State 02. In a case of the set value, cross_type=1, in which the light emitted from the input light source intersects the side surface of the first optical waveguide portion 20A or in a case of the set value, cross_type=3, in which the light emitted from the input light source intersects the side surface of the second optical waveguide portion 20B, the processing of State 4 is performed because the calculation has finished.

Figures 67, 68:
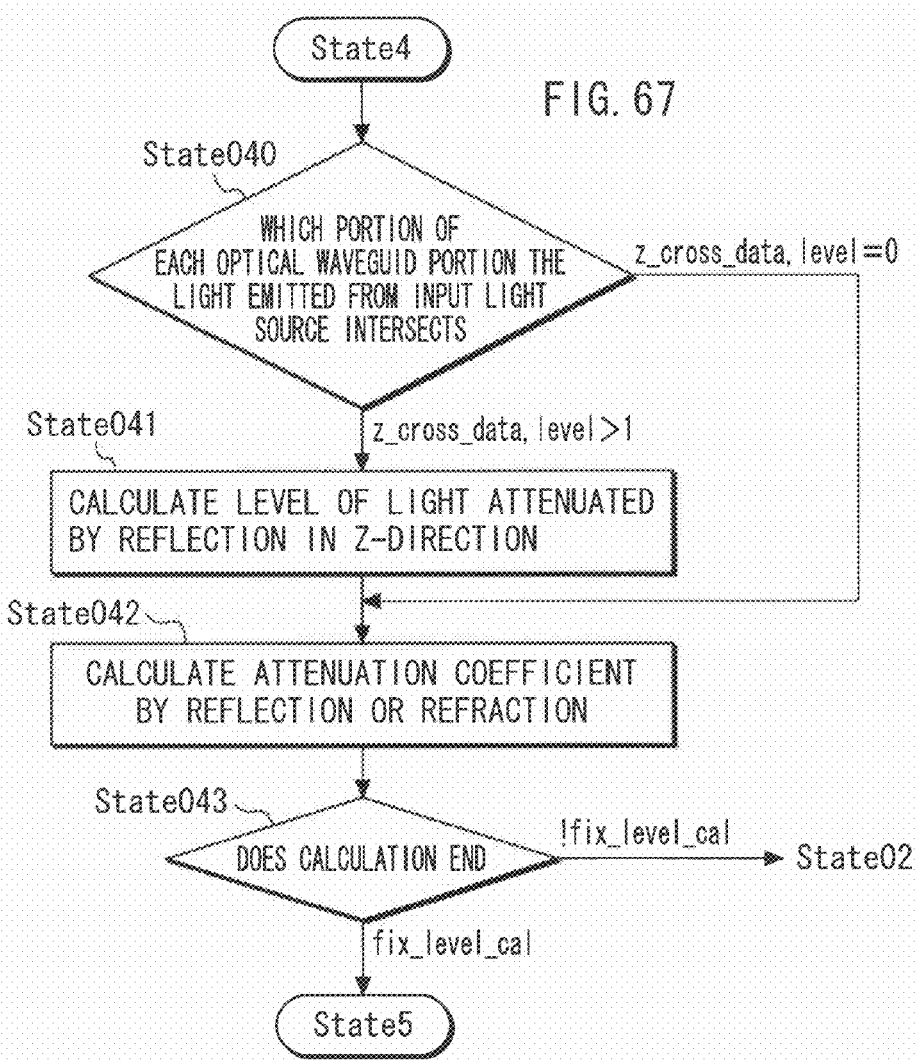
FIG. 67 is a flowchart showing an example of a calculation process concerning how far the light is attenuated by the reflection and the refraction.
FIG. 68 is a table showing an example of a result of the calculation of the level by the reflection and the refraction on X- and Y-planes.

FIG. 67 shows an example of a calculation process concerning how far the light is attenuated by the reflection and the refraction which are obtained at the State 03. The following will describe the processing of the State 04 shown in FIG. 54.

At State 040, it is referred which position of the first or second optical waveguide portion 20A, 20B the light emitted from the input light source intersects.

In a case of the set value, cross_type=2 or 4, in which the data, z_cross_data, level>0 is held because the light emitted from the input light source intersects the bottom surface of the first optical waveguide portion 20A or the bottom surface of the second optical waveguide portion 20B so that the level reflectance loss numbers can be maintained in the data, Z_Cross_data, shown in FIG. 66B at the State 03, processing at State 041 is performed.

In a case of the set value, cross_type=1 or 3, in which the data, z_cross_data, level=0 is held because the light emitted from the input light source intersects the side surface of the first optical waveguide portion 20A or the side surface of the second optical waveguide portion 20B, processing at State 042 is performed.

At the State 041 shown in FIG. 67, a level of the light, z_level, which is attenuated by the reflection in the Z-direction is given by the following equation (80).

$$z\_level = cross\_data,level * mt\_z\_LUT^{z\_cross\_data,level} \qquad (80)$$

The level of the light, z_level, of the equation (80) is given by multiplying the level, cross_data, level, of the light from emitted from the input light source, which is selected by the data, Cross_data shown in FIG. 66A, by the value obtained by exponentiating the reflectivity, mt_z_LUT, with the level reflectance loss numbers, z_cross_data, level, of the data, Z_Cross_data, shown in FIG. 66B and is given by multiplying an amount of the attenuation based on the reflection numbers.

Since the reflection in the Z-direction occurs at any of the reflecting members, the calculation regarding the reflectivity, mt_z_LUT, is performed by referring to the reflectivity, mt_a_z_LUT, of the reflecting members of the first optical waveguide portion 20A set at the State 011 in a case of the set value, cross_type=2 in which the light emitted from the input light source intersects the bottom surface of the first optical waveguide portion 20A. In the cases excluding the above-mentioned case in this embodiment, particularly, in a case of the set value, cross_type=4 in which the light emitted from the input light source intersects the bottom surface of the second optical waveguide portion 20B, the calculation is performed by referring to the reflectivity, mt_b_z_LUT, of the reflecting members of the second optical waveguide portion 20B set at the State 012.

At State 042 shown in FIG. 67, an attenuation coefficient, mt_reflection, by the reflections on X- and Y-planes is given by the following equation (81) using the reflectivities (absolute values), Rp and Rs, of s-wave and p-wave calculated at the State 032. The level of the light, reflect_level, attenuated by the reflections on X- and Y-planes is given by the following equation (82). An attenuation coefficient, mt_refraction, by the refractions on X- and Y-planes is given by the following equation (83) using the transmissivities (absolute values), Tp and Ts, of s-wave and p-wave calculated at the State 032. The level of the light, refract_level, attenuated by the refractions on X- and Y-planes is given by the following equation (84).

$$mt\_reflection = (Rp+Rs)/2 \quad (81)$$

$$reflect\_level = cross\_data, level * mt\_reflection \quad (82)$$

$$mt\_refraction = (Tp+Ts)/2 \quad (83)$$

$$refract\_level = cross\_data, level * mt\_refraction \quad (84)$$

The level of the light, reflect_level, of the equation (82) is given by multiplying the level of the light, cross_data, level, emitted from the input light source, which is selected by the data, Cross_data, by the attenuation coefficient, mt_reflection. The level of the light, refract_level, of the equation (84) is given by multiplying the level of the light, cross_data, level, emitted from the input light source, which is selected by the data, Cross_data, by the attenuation coefficient, mt_refraction.

FIG. 68 shows an example of a result of the calculation of the level by the reflection and the refraction on X- and Y-planes. At the above-mentioned State 042, the values of Cross_data, which are boxed with alternate long and short dashed lines in FIG. 68, are input and the values of Cross_data, which are boxed with a solid line in FIG. 1568, are output.

At State 043 shown in FIG. 67, a signal, fix_level_cal, determining the processing is generated according to a situation whether or not the calculation has finished.

In a case of the set value, cross_type=3, in which the light emitted from the input light source intersects the side surface of the second optical waveguide portion 20B and the light outputs from the second optical waveguide portion 20B, processing at the State 05 is performed because the calculation has finished. In cases other than that, in this embodiment, in cases of the set value, cross_type=1, in which the light emitted from the input light source intersects the side surface of the first optical waveguide portion 20A and the set value, cross_type=2 and 4, in which the light emitted from the input light source intersects the bottom surface of the first optical waveguide portion 20A and the bottom surface of the second optical waveguide portion 20B, the signal, fix_level_cal, is generated because the calculation has not yet finished and the process goes back to the State 03.

At the State 05, the calculations from the State 02 to the State 04 are repeated by times similar to numbers of divided light rays emitted from the input light source set at the State 010.

At the State 06, the items of data, Cross_data and Z_Cross_data, which are obtained the calculations from the State 02 to the State 05, are sorted.

At the State 06, the array of the data, Cross_data, returns on the basis of symmetry of the distribution of the output of the laser diode. The data, Cross_data, is sorted on the basis of the coordinates, Cross_address, of each point of the intersection so that it returns to the address on the outer circumference of the second optical waveguide portion 20B. This is because it is searched how many light rays are reached to the address on the outer circumference of the second optical waveguide portion 20B and how far the level thereof is. Further, the data, Z_Cross_data, is sorted on the basis of the coordinates, Z_Cross_address, of each point of the intersection on Z-direction and the light that is output from the second optical waveguide portion 20B and the light that is not output from the second optical waveguide portion 20B are distinguished.

At the State 07, a result of output obtained by the calculations from the State 02 to the State 06 is generated.

By extracting address, cross_cnt_ad, of the data, Cross_data, calculated by the calculations from the State 02 to the State 06 at the address, cross_cnt_ad[1]=0 and the address, cross_cnt_ad[0]=1, the data, Cross_cnt_data,x1,y1,z1 indicates a position (x, y, z) of the light output from the second optical waveguide portion 20B between zero and 2π of the circumference direction of the second optical waveguide portion 20B as a distribution level of the output of the light output from the second optical waveguide portion 20B. The data, Cross_cnt_data,i,j,k indicates vector (i,j,k) of the light output from the second optical waveguide portion 20B. The data, Cross_cnt_data, level indicates a level of the light output from the second optical waveguide portion 20B.

By extracting address, cross_cnt_ad, of the data, Cross_data, calculated by the calculations from the State 02 to the State 06 at the maximum address, cross_cnt_ad and the address, cross_cnt_ad[0]=0, the data, Cross_cnt_data,x1,y1,z1 indicates a position (x, y, z) of the light that is not output from the first optical waveguide portion 20A as a distribution level of loss of the light that is not output from the first optical waveguide portion 20A. The data, Cross_cnt_data,i,j,k indicates vector (i,j,k) of the light that is not output from the first optical waveguide portion 20A. The data, Cross_cnt_data, level indicates a level of the light that is not output from the first optical waveguide portion 20A.

Thus, it is capable of calculate how many light rays reach each address between zero and 2π of the circumference direction of the second optical waveguide portion 20B, the level of each ray thereof, and the vector thereof so that the directivity of the light on the circumference direction of the optical waveguide 2A can be obtained.

It is to be noted that at the State 041 shown in FIG. 67, the level of the light, z_level, attenuated by the reflection on the Z-direction is calculated using the level reflectance loss numbers. On the other hand, by substituting the following equation (85) for the above-mentioned equation (80), the level of the light lost by the reflection can be obtained as z_cross_data, level. Here, the processing at the State 041 may be performed by selecting either the calculation of the above-mentioned equation (80) or the calculation of the equation (85).

$$z\_level = cross\_data, level*(1-mt\_z\_LUT)^{z\_cross\_data,level}$$

$$z\_cross\_data, level = z\_level \quad (85)$$

It should be understood by those skilled in the art that various modifications, combinations, sub-combinations and alternations may occur depending on design requirements and other coefficients insofar as they are within the scope of the appended claims or the equivalents thereof.

The present application contains subject matter related to that disclosed in Japanese Priority Patent Applications JP 2008-084764 and JP 2008-234012 filed in the Japanese Patent Office on Mar. 27, 2008 and Sep. 11, 2008, the entire contents of which is hereby incorporated by reference.

What is claimed is:

1. A method of obtaining directivity in an optical waveguide, the method comprising the steps of:
   falling incident light on at least one of diffuse reflection members that are opposed with each other and are arranged at a center portion of the optical waveguide into which the light is propagated;
   generating a first table relative to an amount of emitted light that is acquired at a circumference of the optical waveguide by controlling at least one of an image control factor that is used for changing an image of the light which is incident to the diffuse reflection members and a coordinate control factor that is used for changing coordinates of the light which is incident to the diffuse reflection member with at least one of the image and the coordinates of the light which is incident to the diffuse reflection members of the optical waveguide being changed; and generating a second table relative to a pattern of the light which is incident to the diffuse reflection member in the optical waveguide by seeking for a combination of the image and the coordinates of the light based on the generated first table, the combination presenting a desired distribution of the amount of the emitted light at the circumference of the optical waveguide.

2. The method according to claim 1 wherein plural items of incident light having a predetermined array are fallen on the diffuse reflection member by controlling the image control factor and the coordinate control factor of the light which is incident to the diffuse reflection member of the optical waveguide to generate the first table relative to an amount of emitted light that is acquired at the circumference of the optical waveguide, so that the combination of the images by the plural items of light is sought based on the generated first table, the combination presenting the desired distribution of the amount of the emitted light at the circumference of the optical waveguide.

3. The method according to claim 2 wherein plural items of incident light having a predetermined array in which the images of the adjacent items of light are overlapped are fallen on the diffuse reflection member by controlling the image control factor and the coordinate control factor of the light which is incident to the diffuse reflection member from plural light-emitting units to generate the first table relative to an amount of emitted light that is acquired at the circumference of the optical waveguide.

4. The method according to claim 3 wherein the first table relative to an amount of emitted light that is acquired at the circumference of the optical waveguide is generated by subtracting an amount of light corresponding to a region where the images of the adjacent items of light that are incident to the diffuse reflection member of the optical waveguide are overlapped.

5. The method according to claim 2 wherein plural items of incident light having a squared array are fallen on the diffuse reflection member to generate the first table relative to an amount of emitted light that is acquired at the circumference of the optical waveguide, with respect to four optical images arrayed in a square.

6. The method according to claim 2 wherein plural items of incident light having a honeycomb array are fallen on the diffuse reflection member to generate the first table relative to an amount of emitted light that is acquired at the circumference of the optical waveguide, with respect to three optical images arrayed in a triangular shape.

7. The method according to claim 2 wherein the first table relative to an amount of emitted light that is acquired at the circumference of the optical waveguide is generated by dividing the amount of emitted light at the circumference of the optical waveguide by a number of the images of the light, the amount of emitted light being obtained by falling incident light on the diffuse reflection member.

8. The method according to claim 2 wherein the first table relative to an amount of emitted light that is acquired at the circumference of the optical waveguide is generated by controlling the image control factor and the coordinate control factor of the light which is incident to the diffuse reflection member of the optical waveguide to approximate plural images of the light incident to the diffuse reflection member by a single image of the light.

9. The method according to claim 2 wherein the first table relative to an amount of emitted light that is acquired at the circumference of the optical waveguide is generated by controlling the image control factor of the light which is incident to the diffuse reflection member of the optical waveguide with respect to the images of the light in which a distribution of the emitted light at the circumference of the optical waveguide is approximated to a uniformity.

10. The method according to claim 1 wherein the light is incident from an outer circumference of the optical waveguide at an incident angle by which the incident light is directly irradiated onto any one of the diffuse reflection members by controlling the image control factor and the coordinate control factor of the light which is incident to the optical waveguide.

11. The method according to claim 1 wherein the light is incident from an outer circumference of the optical waveguide to any one of the diffuse reflection members at an incident angle by which the incident light is reflected at least one time and irradiated onto the diffuse reflection member in the optical waveguide by controlling the image control factor and the coordinate control factor of the light which is incident to the optical waveguide based on the incident angle and number of the reflections.

12. An apparatus of obtaining directivity in an optical waveguide, the apparatus comprising:

the optical waveguide in which diffuse reflection members are opposed with each other and are arranged at a center portion of the optical waveguide into which the light is propagated, the optical waveguide emitting light from a circumference thereof by diffusely reflecting the light incident to the diffuse reflection members;

a light-emitting unit that falls incident light on at least one of the diffuse reflection members of the optical waveguide and is controlled on the basis of an image control factor that is used for changing an image of the light which is incident to the diffuse reflection member and a coordinate control factor that is used for changing coordinates of the light which is incident to the diffuse reflection member; and a light-receiving unit that receives light emitted from the optical waveguide at a circumference of the optical waveguide, wherein a first table is generated relative to an amount of light received by the light-receiving unit at the circumference of the optical waveguide by controlling at least one of the image control factor and the coordinate control factor of the light which is incident to the diffuse reflection member from the light-emitting unit with at least one of the image and the coordinates of the light which is incident to the diffuse reflection member of the optical waveguide being changed; and wherein a second table is generated relative to a pattern of the light which is incident to the diffuse reflection member in the optical waveguide by seeking for a combination of the image and the coordinates of the light based on the generated first table, the combination presenting a desired distribution of the amount of the emitted light at the circumference of the optical waveguide.

13. The apparatus according to claim 12 wherein the light-emitting unit includes as an image-adjusting mechanism at least any one of a collimation portion that changes a diameter of the light to be emitted, a diffusion/condensation portion that diffuses or condenses the light, and a reflection-adjustment portion that adjusts the image of the light by a combination of plural reflection surfaces.

14. The apparatus according to claim 12 wherein the light-emitting unit includes an image-adjusting mechanism which selects at least one out of a collimation portion that changes a diameter of the light to be emitted, a diffusion/condensation portion that diffuses or condenses the light, and a reflection-adjustment portion that adjusts the image of the light by a combination of plural reflection surfaces.

15. The apparatus according to claim 13 wherein the collimation portion includes at least any one of an enlargement collimation portion that enlarges a diameter of the light to be emitted and a reduction collimation portion that reduces the diameter of the light to be emitted.

16. The apparatus according to claim 14 wherein the collimation portion includes an enlargement collimation portion that enlarges a diameter of the light to be emitted and a reduction collimation portion that reduces the diameter of the light to be emitted, the enlargement collimation portion and the reduction collimation portion being selectable.

17. The apparatus according to claim 13 wherein the diffusion/condensation portion includes any one of a concave lens that diffuses the light to be emitted and a convex lens that condenses the light to be emitted.

18. The apparatus according to claim 14 wherein the diffusion/condensation portion includes a concave lens that diffuses the light to be emitted and a convex lens that condenses the light to be emitted, the concave lens and the convex lens being selectable.

19. The apparatus according to claim 13 wherein the reflection-adjustment portion contains a first reflection mirror that reflects the incident light at 90 degrees to at least two directions and a second reflection mirror having a reflection surface angle θ that reflects the incident light from the first reflection mirror at 90 degrees plus or minus θ.

20. The apparatus according to claim 14 wherein the reflection-adjustment portion contains a first reflection mirror that reflects the incident light at 90 degrees to at least two directions and a second reflection mirror having a reflection surface angle θ that reflects the incident light from the first reflection mirror at 90 degrees plus or minus θ.

21. The apparatus according to claim 13 wherein the collimation portion, the diffusion/condensation portion or the reflection-adjustment portion contains a curvature-adjustment mechanism that adjusts a curvature of a portion which is constituted of a lens or a reflection surface.

22. The apparatus according to claim 14 wherein the collimation portion, the diffusion/condensation portion and the reflection-adjustment portion respectively contain a curvature-adjustment mechanism that adjusts a curvature of a portion which is constituted of a lens or a reflection surface.

23. The apparatus according to claim 13 wherein the collimation portion, the diffusion/condensation portion or the reflection-adjustment portion contains an optical-waveguide-distance-adjustment mechanism that adjusts a distance from the optical waveguide separately.

24. The apparatus according to claim 14 wherein the collimation portion, the diffusion/condensation portion and the reflection-adjustment portion respectively contain an optical-waveguide-distance-adjustment mechanism that adjusts a distance from the optical waveguide separately.

25. A recording medium that stores a second table relative to a pattern of light which is incident to at least one of diffuse reflection members that are opposed with each other and are arranged at a center portion of an optical waveguide into which the light is propagated, the second table presenting a desired distribution of the amount of the light emitted at a circumference of the optical waveguide, by using steps of:
    falling incident light on the diffuse reflection member;
    generating a first table relative to an amount of the emitted light that is acquired at a circumference of the optical waveguide by controlling at least one of an image control factor that is used for changing an image of the light which is incident to the diffuse reflection member and a coordinate control factor that is used for changing coordinates of the light which is incident to the diffuse reflection member with at least one of the image and the coordinates of the light which is incident to the diffuse reflection members of the optical waveguide being changed; and
    generating the second table by seeking for a combination of the image and the coordinates of the light based on the generated first table, the combination presenting the desired distribution of the amount of the emitted light at the circumference of the optical waveguide.

* * * * *